(12) United States Patent
Tanaka et al.

(10) Patent No.: US 12,498,549 B2
(45) Date of Patent: Dec. 16, 2025

(54) ZOOM LENS AND IMAGING APPARATUS

(71) Applicant: FUJIFILM Corporation, Tokyo (JP)

(72) Inventors: Takuya Tanaka, Saitama (JP);
Masanao Kawana, Saitama (JP);
Motoari Ota, Saitama (JP); Daiki Komatsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 724 days.

(21) Appl. No.: 17/748,548

(22) Filed: May 19, 2022

(65) Prior Publication Data
US 2022/0390726 A1  Dec. 8, 2022

(30) Foreign Application Priority Data

May 28, 2021  (JP) ................. 2021-090402

(51) Int. Cl.
*G02B 15/14* (2006.01)
*G02B 13/00* (2006.01)
*G02B 15/20* (2006.01)

(52) U.S. Cl.
CPC .......... *G02B 15/20* (2013.01); *G02B 13/009* (2013.01); *G02B 15/1431* (2019.08)

(58) Field of Classification Search
CPC ............. G02B 15/20; G02B 15/1431; G02B 15/1461; G02B 15/1451; G02B 15/1441; G02B 13/009; G02B 15/145101; G02B 15/145103; G02B 15/145105; G02B 15/145107; G02B 15/145109; G02B 15/145111; G02B 15/145113; G02B 15/145117; G02B 15/145119; G02B 15/145121; G02B 15/145123; G02B 15/145125; G02B 15/145127; G02B 15/145129; G02B 15/144101;
(Continued)

(56) References Cited

U.S. PATENT DOCUMENTS 6,718,132 B2 * 4/2004 Nishina .......... G02B 15/145129
359/764
8,842,209 B2 * 9/2014 Matsumura ........ G02B 15/1461
359/683
10,095,010 B2  10/2018 Takemoto
(Continued)

FOREIGN PATENT DOCUMENTS

JP  2012-255895 A  12/2012
JP  2013-083930 A   5/2013
(Continued)

OTHER PUBLICATIONS

"Notice of Reasons for Refusal" Office Action issued in JP 2021-090402; mailed by the Japanese Patent Office on Nov. 5, 2024.

*Primary Examiner* — Zachary W Wilkes
*Assistant Examiner* — Elizabeth M Hall
(74) *Attorney, Agent, or Firm* — Studebaker Brackett PLLC

(57) ABSTRACT

A zoom lens consists of, in order from the object side, a first lens group that has a positive refractive power, a middle group that includes a plurality of lens groups in which the spacings between adjacent lens groups change during zooming, and the final lens group. The focusing group that moves during focusing is disposed in the middle group. The zoom lens satisfies predetermined conditional expressions.

20 Claims, 22 Drawing Sheets

(58) Field of Classification Search
CPC .... G02B 15/144103; G02B 15/144105; G02B 15/143101; G02B 15/143105
USPC ........................................................ 359/695
See application file for complete search history.

(56) References Cited

U.S. PATENT DOCUMENTS

| | | | |
|---|---|---|---|
| 10,656,399 B2 | 5/2020 | Fujikura et al. | |
| 2003/0206736 A1* | 11/2003 | Nishina | G02B 13/009 396/72 |
| 2010/0321791 A1* | 12/2010 | Hayakawa | G02B 15/173 359/683 |
| 2013/0242184 A1* | 9/2013 | Matsumura | G02B 13/001 359/683 |
| 2013/0258130 A1 | 10/2013 | Mihara et al. | |
| 2014/0118605 A1 | 5/2014 | Kawamura | |
| 2018/0113288 A1 | 4/2018 | Sakuma | |
| 2021/0349293 A1* | 11/2021 | Uehara | G02B 15/1441 |

FOREIGN PATENT DOCUMENTS

| | | |
|---|---|---|
| JP | 2014-089297 A | 5/2014 |
| JP | 2015-206893 A | 11/2015 |
| JP | 2016-057387 A | 4/2016 |
| JP | 2017-191128 A | 10/2017 |
| JP | 2017-198843 A | 11/2017 |
| JP | 2018-025624 A | 2/2018 |
| JP | 2018-072367 A | 5/2018 |
| JP | 2018-155818 A | 10/2018 |
| JP | 2018-185390 A | 11/2018 |
| JP | 2020-109430 A | 7/2020 |
| JP | 2020-134735 A | 8/2020 |
| WO | 2019/116563 A1 | 6/2019 |
| WO | 2019/116565 A1 | 6/2019 |
| WO | 2021/220579 A1 | 11/2021 |

* cited by examiner

EXAMPLE 1

EXAMPLE 2

EXAMPLE 2

EXAMPLE 3

FIG. 7
EXAMPLE 3
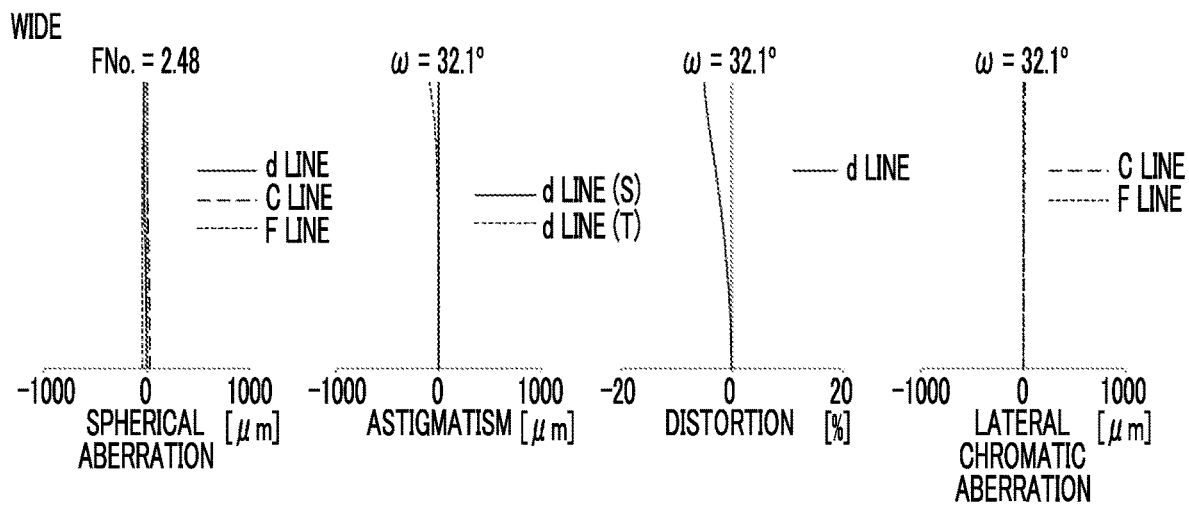
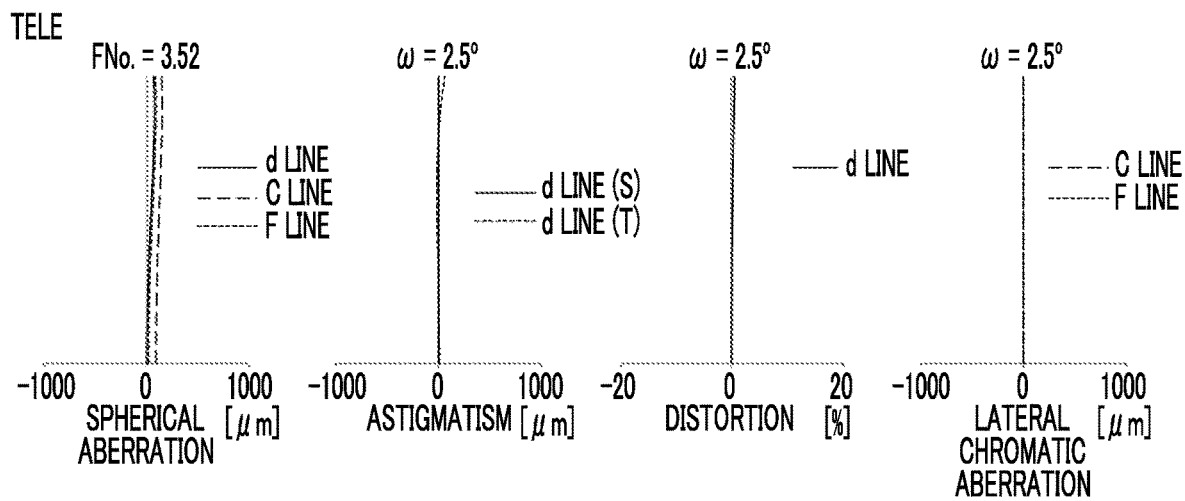
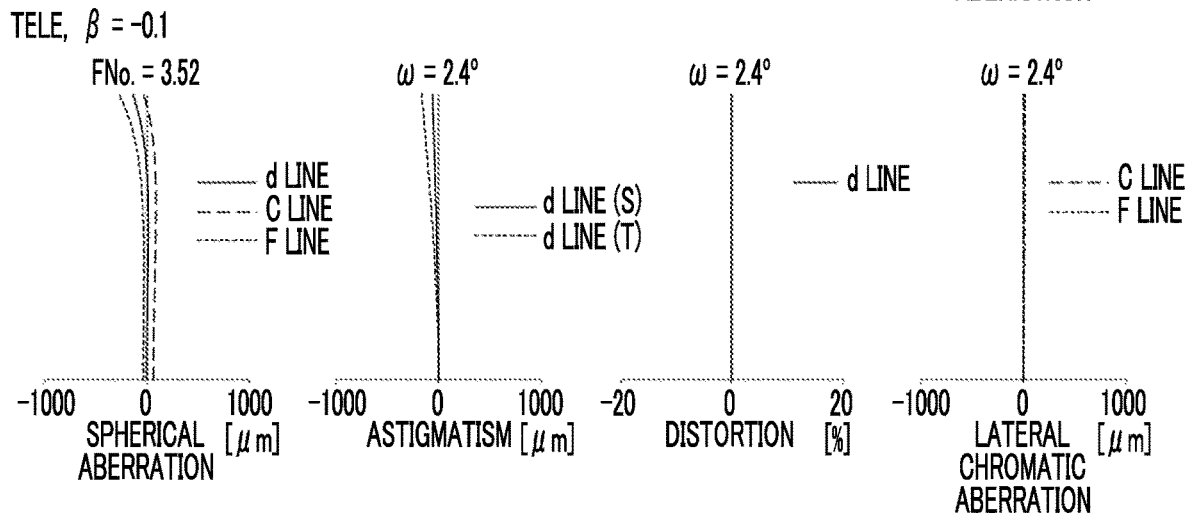

EXAMPLE 4

FIG. 9
EXAMPLE 4
WIDE
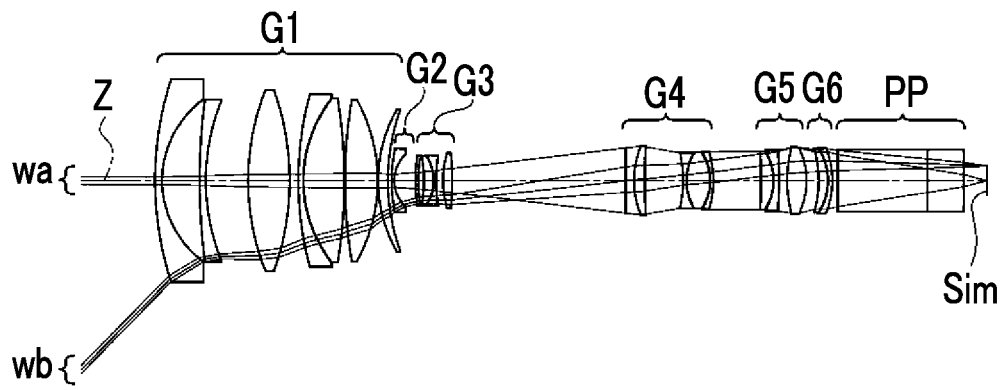
TELE
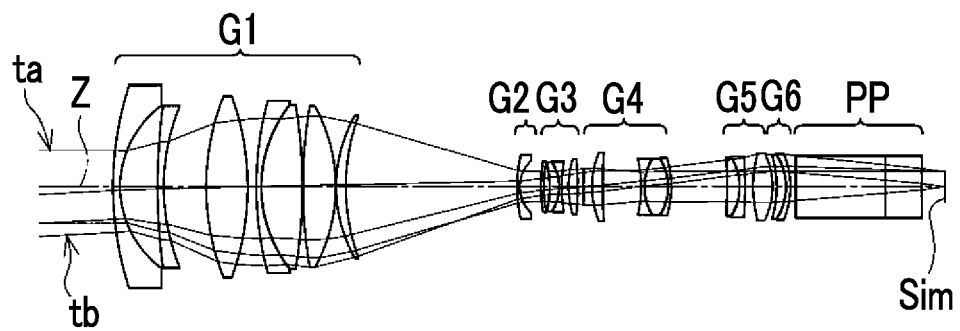
TELE, β = −0.1
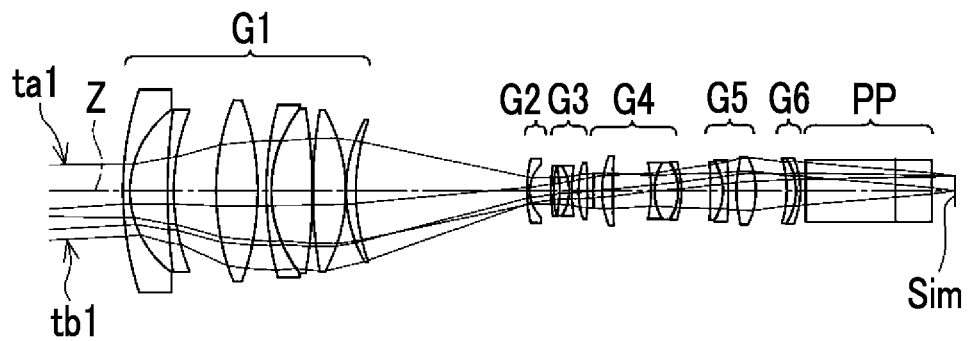

EXAMPLE 4

EXAMPLE 5

EXAMPLE 5

EXAMPLE 6

EXAMPLE 6

EXAMPLE 7

EXAMPLE 7

EXAMPLE 8

FIG. 18
EXAMPLE 8
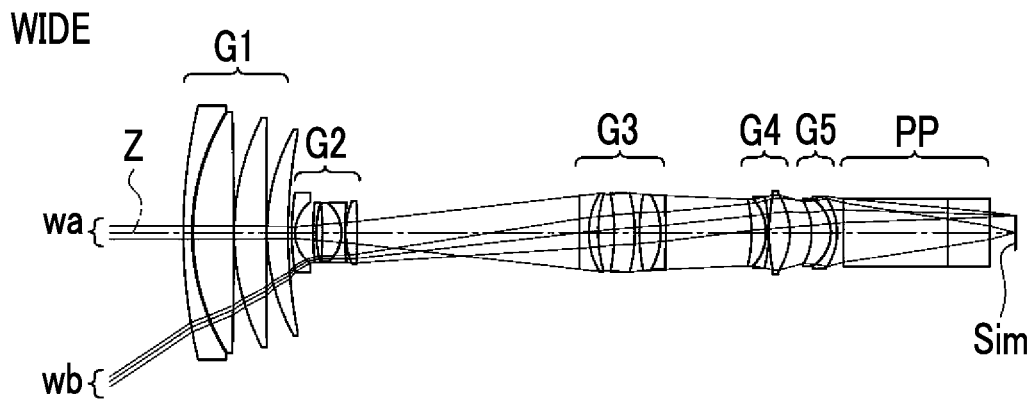
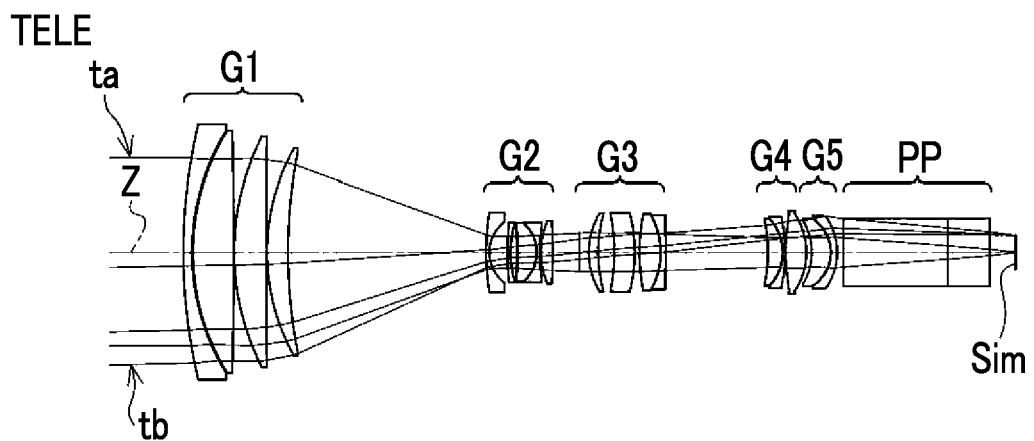
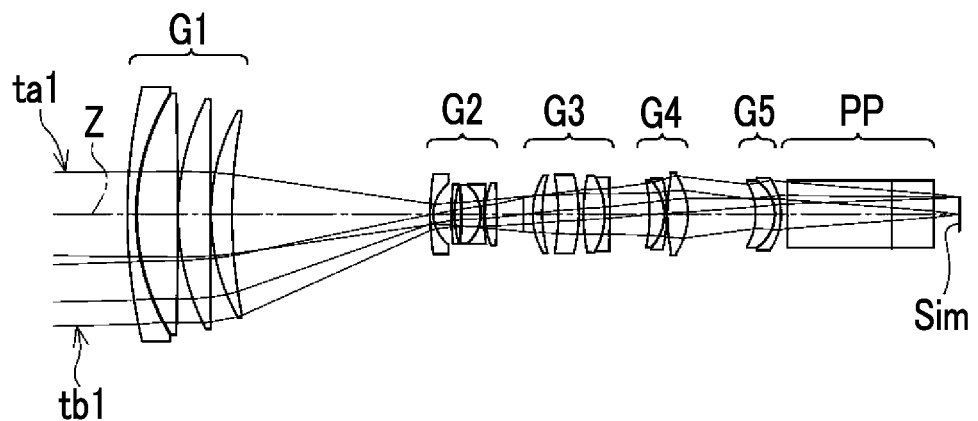

EXAMPLE 8

EXAMPLE 9

FIG. 21
EXAMPLE 9
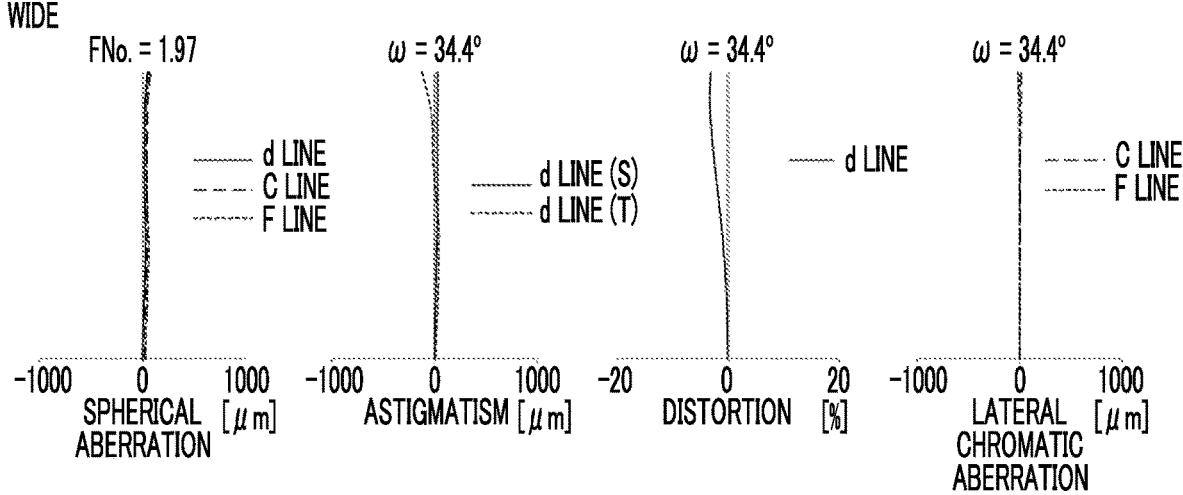
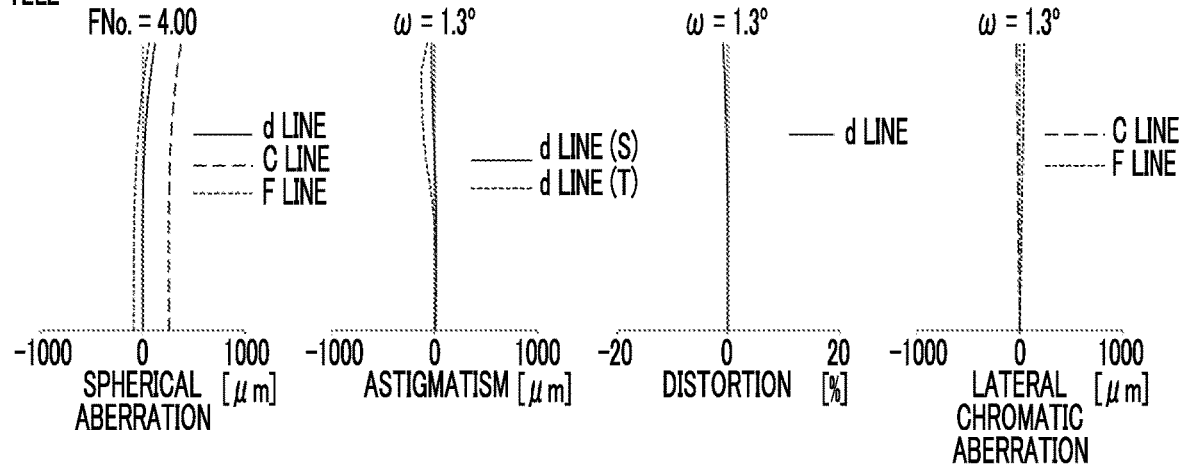
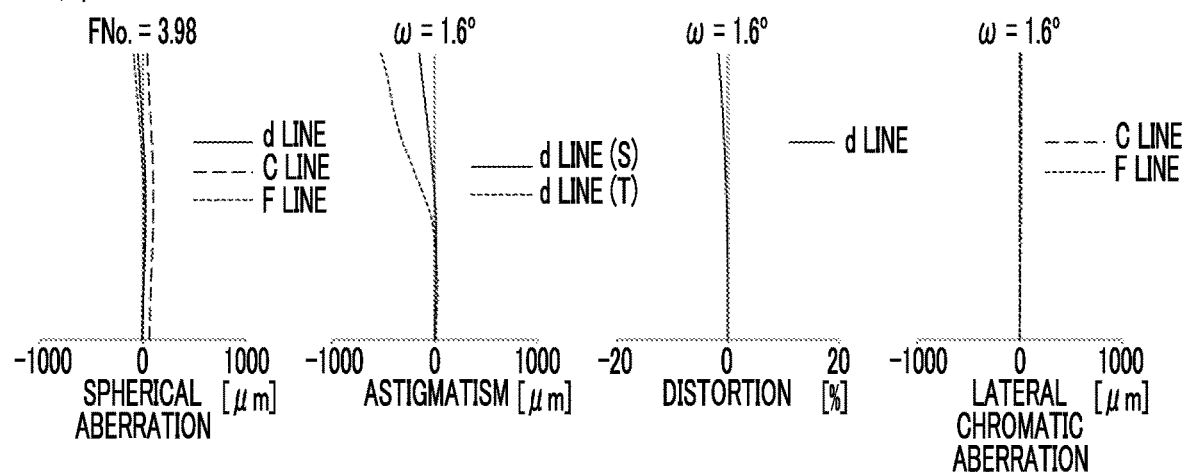

ZOOM LENS AND IMAGING APPARATUS

CROSS-REFERENCE TO RELATED APPLICATIONS

The present application claims priority under 35 U.S.C. § 119 to Japanese Patent Application No. 2021-090402, filed on May 28, 2021. The above application is hereby expressly incorporated by reference, in its entirety, into the present application.

BACKGROUND

Technical Field

The technology of the present disclosure relates to a zoom lens and an imaging apparatus.

Related Art

In the related art, as a zoom lens applicable to an imaging apparatus such as a digital camera and a video camera, for example, the lens systems described in WO2019/116563A and WO2019/116565A are known.

There is a demand for a zoom lens that is configured to have a small size, has a high magnification, and is advantageous for autofocus.

SUMMARY

The present disclosure has been made in view of the above-mentioned circumstances, and an object of the present invention is to provide a zoom lens which is reduced in size and has a high magnification and is advantageous for autofocus, and an imaging apparatus comprising the zoom lens.

According to a first aspect of the present disclosure, there is provided a zoom lens consisting of, in order from an object side to an image side: a first lens group that has a positive refractive power; a middle group that includes a plurality of lens groups in which a spacing between adjacent lens groups changes during zooming; and a final lens group. A focusing group that moves during focusing is disposed in the middle group. Assuming that a difference in an optical axis direction between a position of the focusing group in a state in which an infinite distance object is in focus at a telephoto end and a position of the focusing group in a state in which a lateral magnification of a whole system at the telephoto end is −0.1 times is DF, and a focal length of the whole system in a state in which the infinite distance object is in focus at the telephoto end is ft, Conditional Expression (1) is satisfied, which is represented by $$0.04 < DF/ft < 0.4 \qquad (1).$$

In the zoom lens according to the first aspect, it is preferable that Conditional Expression (1-1) is satisfied, which is represented by $$0.05 < DF/ft < 0.2 \qquad (1\text{-}1).$$

In the zoom lens according to the first aspect, it is preferable that a difference in the optical axis direction between a position of each lens group in the middle group in a state in which the infinite distance object is in focus at a wide angle end and a position thereof in a state in which the infinite distance object is in focus at a telephoto end is set as an amount of zooming movement. Assuming that the amount of zooming movement of a lens group, of which the amount of zooming movement is maximum, among the lens groups in the middle group is DV, and a focal length of the whole system in a state in which the infinite distance object is in focus at the wide angle end is fw, it is preferable that Conditional Expression (2) is satisfied, which is represented by $$2 < DV/fw < 18 \qquad (2).$$

According to a second aspect of the present disclosure, there is provided a zoom lens consisting of, in order from an object side to an image side: a first lens group that has a positive refractive power; a middle group that includes a plurality of lens groups in which a spacing between adjacent lens groups changes during zooming; and a final lens group. A focusing group that moves during focusing is disposed in the middle group, a difference in the optical axis direction between a position of each lens group in the middle group in a state in which the infinite distance object is in focus at a wide angle end and a position thereof in a state in which the infinite distance object is in focus at the telephoto end is set as an amount of zooming movement. Assuming that the amount of zooming movement of a lens group, of which the amount of zooming movement is maximum, among the lens groups in the middle group is DV, and a focal length of the whole system in a state in which the infinite distance object is in focus at the wide angle end is fw, Conditional Expression (2) is satisfied, which is represented by $$2 < DV/fw < 18 \qquad (2).$$

In the zoom lens according to the second aspect, it is preferable that Conditional Expression (2-1), which is represented by $$3.5 < DV/fw < 15 \qquad (2\text{-}1).$$

Hereinafter, in this term, the zoom lenses according to the first and second aspects are collectively referred to as the zoom lenses of the above-mentioned aspects. Assuming that a lateral magnification of the focusing group in a state in which the infinite distance object is in focus at the telephoto end is βFt, and a combined lateral magnification of all lenses closer to the image side than the focusing group in a state in which the infinite distance object is in focus at the telephoto end is βRt, it is preferable that the zoom lens of the above-mentioned aspect satisfies Conditional Expression (3), which is represented by $$0.5 < (1-\beta Ft^2) \times \beta Rt^2 < 5 \qquad (3).$$

It is preferable that the middle group includes at least one negative movable lens group, which is a lens group that has a negative refractive power and moves during zooming. In the configuration in which the zoom lens of the above-mentioned aspect includes at least one negative movable lens group, assuming that in a case where a plurality of the negative movable lens groups are continuously disposed in the middle group, a combined lateral magnification of the plurality of the negative movable lens groups continuously disposed in a state in which the infinite distance object is in focus at a wide angle end is βMnw, and a combined lateral magnification of the plurality of negative movable lens groups continuously disposed in a state in which the infinite distance object is in focus at the telephoto end is βMnt, in a case where the plurality of negative movable lens groups are not continuously disposed in the middle group, a lateral magnification of any one of the negative movable lens groups in a state in which the infinite distance object is in focus at the wide angle end is βMnw, and a lateral magnification of any one of the negative movable lens groups in a state in which the infinite distance object is in focus at the telephoto end is βMnt, a focal length of the negative movable lens group that has a strongest refractive power among the negative movable lens groups in the middle group is fMn1, and a focal length of the final lens group is fE, it is preferable that the zoom lens of the above-mentioned aspect satisfies Conditional Expressions (4), (5), and (6), which are represented by $$-0.5<\beta Mnw<-0.05 \quad (4),$$

$$-24<\beta Mnt<-2 \quad (5), \text{and}$$

$$0.02<|fMn1/fE|<0.2 \quad (6).$$

Assuming that a focal length of the focusing group is fF, and a focal length of the final lens group is fE, it is preferable that the zoom lens of the above-mentioned aspect satisfies Conditional Expression (7), which is represented by $$0.04<|fF/fE|<0.4 \quad (7).$$

It is preferable that the middle group includes at least one negative movable lens group, which is a lens group that has a negative refractive power and moves during zooming. In a configuration in which the zoom lens of the above-mentioned aspect includes at least one negative movable lens group, assuming that in a case where a plurality of the negative movable lens groups are continuously disposed in the middle group, a combined lateral magnification of the plurality of the negative movable lens groups continuously disposed in a state in which the infinite distance object is in focus at a wide angle end is βMnw, and a combined lateral magnification of the plurality of negative movable lens groups continuously disposed in a state in which the infinite distance object is in focus at the telephoto end is βMnt, in a case where the plurality of negative movable lens groups are not continuously disposed in the middle group, a lateral magnification of any one of the negative movable lens groups in a state in which the infinite distance object is in focus at the wide angle end is βMnw, and a lateral magnification of any one of the negative movable lens groups in a state in which the infinite distance object is in focus at the telephoto end is βMnt, a focal length of the focusing group is fF, and a focal length of the final lens group is fE, it is preferable that the zoom lens of the above-mentioned aspect satisfies Conditional Expressions (4), (5), and (7), which are represented by $$-0.5<\beta Mnw<-0.05 \quad (4),$$

$$-24<\beta Mnt<-2 \quad (5), \text{and}$$

$$0.04<|fF/fE|<0.4 \quad (7).$$

Assuming that a sum of a back focal length of the whole system at an air conversion distance and a distance on an optical axis from a lens surface closest to the object side in the first lens group to a lens surface closest to the image side in the final lens group in a state in which the infinite distance object is in focus at the telephoto end is TTL, and a focal length of the whole system in a state in which the infinite distance object is in focus at the telephoto end is ft, it is preferable that the zoom lens of the above-mentioned aspect satisfies Conditional Expression (8), which is represented by $$0.5<TTL/ft<3 \quad (8).$$

In the zoom lens of the above-mentioned aspect, it is preferable that the first lens group remains stationary with respect to an image plane during zooming.

In the zoom lens of the above-mentioned aspect, it is preferable that the first lens group includes at least two positive lenses.

It is preferable that a difference in the optical axis direction between a position of each lens group in the middle group in a state in which the infinite distance object is in focus at a wide angle end and a position thereof in a state in which the infinite distance object is in focus at the telephoto end is set as an amount of zooming movement. Assuming that the amount of zooming movement of a lens group, of which the amount of zooming movement is maximum, among the lens groups in the middle group is DV, a maximum image height is Ymax, a focal length of the whole system in a state in which the infinite distance object is in focus at the telephoto end is ft, and a focal length of the whole system in a state in which the infinite distance object is in focus at the wide angle end is fw, it is preferable that the zoom lens of the above-mentioned aspect satisfies Conditional Expression (9), which is represented by $$5<DV/\{Ymax\times\log(ft/fw)\}<15 \quad (9).$$

Assuming that a difference in an optical axis direction between a position of the focusing group in a state in which an infinite distance object is in focus at a telephoto end and a position of the focusing group in a state in which a lateral magnification of a whole system at the telephoto end is −0.1 times is DF, and a focal length of the focusing group is fF, it is preferable that the zoom lens of the above-mentioned aspect satisfies Conditional Expression (10), which is represented by $$0.1<|DF/fF|<1 \quad (10).$$

In the zoom lens of the above-mentioned aspect, it is preferable that the focusing group is disposed closest to the image side in the middle group.

In the zoom lens of the above-mentioned aspect, a lens group that moves during zooming is set as a movable lens group, and a movable lens group closest to the object side among movable lens groups in the middle group is set as a leading movable lens group. Assuming that a combined focal length of a movable lens group line in a state in which the infinite distance object is in focus at a wide angle end is fMVw, in a case where the middle group includes the movable lens group line consisting of a plurality of movable lens groups that include the leading movable lens group and are continuously disposed, a focal length of the leading movable lens group is fMVw, in a case where the middle group does not include the movable lens group line, and a focal length of the first lens group is f1, it is preferable that the zoom lens of the above-mentioned aspect satisfies Conditional Expression (11), which is represented by $$-0.4<fMVw/ft<-0.03 \quad (11).$$

In the zoom lens of the above-mentioned aspect, a lens group that moves during zooming is set as a movable lens group, and a movable lens group closest to the object side among movable lens groups in the middle group is set as a leading movable lens group. Assuming that a combined lateral magnification of a movable lens group line in a state in which the infinite distance object is in focus at the telephoto end is βMVt, in a case where the middle group includes the movable lens group line consisting of a plurality of movable lens groups that include the leading movable lens group and are continuously disposed, and a lateral magnification of the leading movable lens group in a state in which the infinite distance object is in focus at the telephoto end is βMVt, in a case where the middle group does not include the movable lens group line, it is preferable that the zoom lens of the above-mentioned aspect satisfies Conditional Expression (12), which is represented by $$-20<\beta MVt<-1.1 \quad (12).$$

It is preferable that the middle group includes at least one stationary lens group which is a lens group remaining stationary with respect to an image plane during zooming. In the configuration in which the zoom lens of the above-mentioned aspect includes at least one stationary lens group, assuming that a lateral magnification of the final lens group in a state in which the infinite distance object is in focus at the telephoto end is βE, and a lateral magnification of the stationary lens group closest to the image side among the stationary lens groups in the middle group in a state in which the infinite distance object is in focus at the telephoto end is βMS, it is preferable that Conditional Expressions (13) and (14) are satisfied, which are represented by $$1<\beta E<2 \quad (13), \text{ and}$$

$$-1.8<1/\beta MS<1.4 \quad (14).$$

Assuming that a lateral magnification of the focusing group in a state in which the infinite distance object is in focus at a wide angle end is βFw, a combined lateral magnification of all lenses closer to the image side than the focusing group in a state in which the infinite distance object is in focus at the wide angle end is βRw, $\gamma=(1-\beta Fw^2)\times\beta Rw^2$, a focal length of the focusing group is fF, a combined focal length of all lenses closer to the image side than the focusing group in a state in which the infinite distance object is in focus at the wide angle end is fRw, a distance from an exit pupil position to an image plane in a state in which the infinite distance object is in focus at the wide angle end is De, a sign of De is positive in a case where the exit pupil position is closer to the object side than the image plane, and is negative in a case where the exit pupil position is closer to the image side than the image plane, and a maximum image height is Ymax, it is preferable that the zoom lens of the above-mentioned aspect satisfies Conditional Expression (15), which is represented by $$-0.1<\{\beta Fw/(fF\times\gamma)-1/(\beta Rw\times fRw)-(1/De)\}\times Y\max<0.1 \quad (15).$$

The imaging apparatus according to another aspect of the present disclosure includes a zoom lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "~group that has a positive refractive power" in the present specification means that the group has a positive refractive power as a whole. Similarly, the term "~group that has a negative refractive power" means that the group has a negative refractive power as a whole. The term "a lens that has a positive refractive power" and the term "a positive lens" are synonymous. The term "a lens that has a negative refractive power" and the term "negative lens" are synonymous. The terms "~lens group" and "focusing group" in the present specification are not limited to a configuration consisting of a plurality of lenses, but may be a configuration consisting of only one lens.

A compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power of the lens including the aspherical surface will be used in terms of the paraxial region unless otherwise specified.

The term "whole system" in the present specification refers to a zoom lens. The "back focal length" is a distance on the optical axis from the lens surface closest to the image side in the zoom lens to the image plane. The "focal length" used in a conditional expression is a paraxial focal length. Unless otherwise specified, the values used in the conditional expressions are values based on the d line.

The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide a zoom lens which is reduced in size and has a high magnification and is advantageous for autofocus, and an imaging apparatus comprising the zoom lens.

BRIEF DESCRIPTION OF THE DRAWINGS

FIG. 7 is a diagram illustrating aberrations of the zoom lens of Example 3.

FIG. 9 is a diagram illustrating a configuration and luminous flux in each state of the zoom lens of Example 4.

FIG. 18 is a diagram illustrating a configuration and luminous flux in each state of the zoom lens of Example 8.

FIG. 21 is a diagram illustrating aberrations of the zoom lens of Example 9.

DESCRIPTION OF EMBODIMENTS

Hereinafter, embodiments of the present disclosure will be described with reference to the accompanying drawings.

Figure 1:
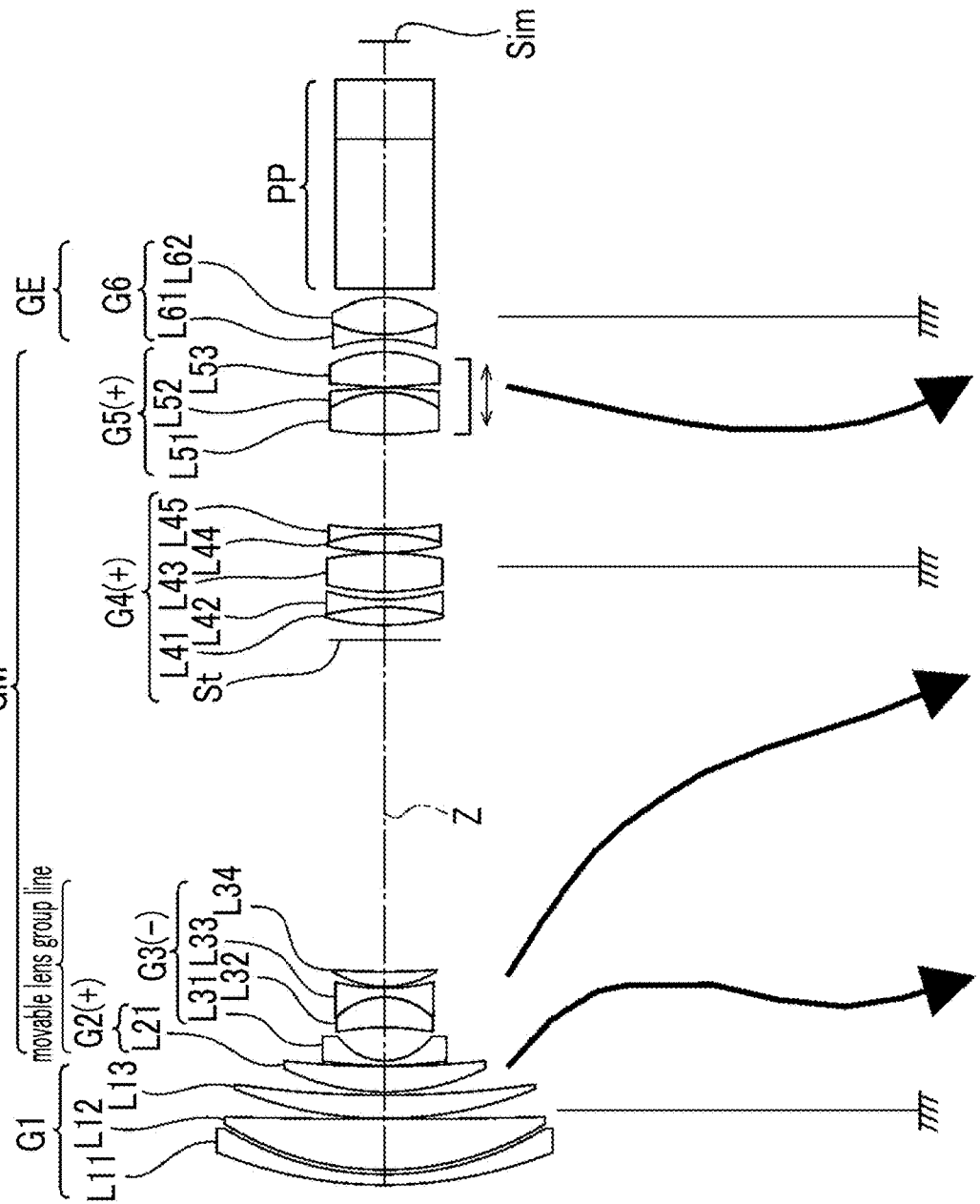
FIG. 1 is a cross-sectional view illustrating a configuration of a zoom lens according to an embodiment and a diagram illustrating movement loci thereof, the zoom lens corresponding to a zoom lens of Example 1.
Figure 2:
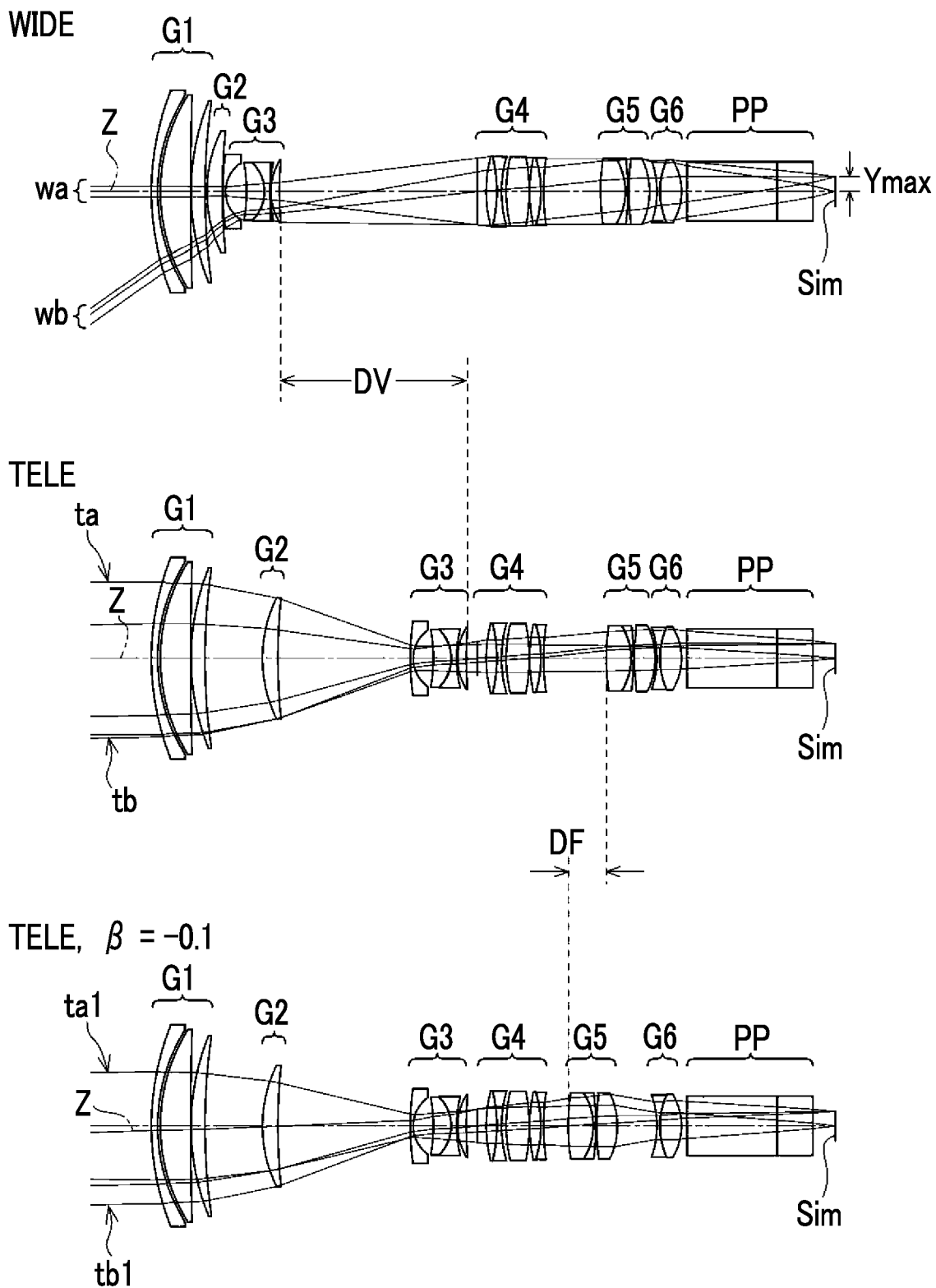
FIG. 2 is a diagram illustrating a configuration and luminous flux in each state of the zoom lens of FIG. 1.

FIG. 1 shows a cross-sectional view of a configuration and movement loci of a zoom lens according to an embodiment of the present disclosure at a wide angle end. Further, FIG. 2 shows a cross-sectional view and a luminous flux of the configuration of the zoom lens of FIG. 1 in each state. In FIG. 2, the upper part labeled "WIDE" shows a state in which the infinite distance object is in focus at the wide angle end, the middle part labeled "TELE" shows a state in which the infinite distance object is in focus at the telephoto end, and the lower part labeled "TELE, β=−0.1" shows a state in which the lateral magnification of the zoom lens at the telephoto end is −0.1 times. In FIG. 2, as the luminous flux, the upper part shows the on-axis luminous flux wa and the luminous flux with the maximum image height wb, the middle part shows the on-axis luminous flux to and the luminous flux with the maximum image height tb, and the lower part shows the on-axis luminous flux ta1 and the luminous flux with the maximum image height tb1. The examples shown in FIGS. 1 and 2 correspond to a zoom lens of Example 1 to be described later. In FIGS. 1 and 2, the left side is the object side and the right side is the image side. Hereinafter, the zoom lens according to the embodiment of the present disclosure will be described mainly with reference to FIG. 1.

FIG. 1 shows an example in which an optical member PP of which the incident surface and emission surface are parallel is disposed between the zoom lens and an image plane Sim under the assumption that the zoom lens is applied to an imaging apparatus. The optical member PP is a member that assumes a protective cover glass, various filters according to the use of an imaging apparatus, a prism, and the like. The various filters include, for example, a low pass filter, an infrared cut filter, and a filter that cuts a specific wavelength region. The optical member PP is a member that has no refractive power. It is also possible to configure the imaging apparatus by removing the optical member PP.

The zoom lens according to the present embodiment consists of a first lens group G1 having a positive refractive power, a middle group GM, and a final lens group GE in order from the object side to the image side. By forming the first lens group G1 closest to the object side as a lens group that has a positive refractive power, there is an advantage in achieving reduction in total length of the lens system. During zooming, the spacing between the first lens group G1 and the middle group GM changes, and the spacing between the middle group GM and the final lens group GE changes.

The middle group GM includes a plurality of lens groups in which the spacings between the adjacent lens groups change during zooming. It should be noted that the term "lens group" in the present specification refers to a part including the at least one lens, which is a constituent part of the zoom lens and is divided by an air spacing that changes during zooming. During zooming, the lens groups move or remain stationary, and the mutual spacing between the lenses in one lens group does not change. That is, in the present specification, one lens group is a group in which the spacing between adjacent groups changes during zooming and the total spacing between adjacent lenses does not change within itself.

For example, the zoom lens in FIG. 1 consists of, in order from the object side to the image side, a first lens group G1, a second lens group G2, a third lens group G3, a fourth lens group G4, a fifth lens group G5, and a sixth lens group G6. In the example of FIG. 1, the middle group GM consists of a second lens group G2, a third lens group G3, a fourth lens group G4, and a fifth lens group G5. In FIG. 1, '(+)' and '(−)' indicate the sign of the refractive power of each lens group.

For example, each lens group in the example of FIG. 1 is composed of the lenses described below. The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side. The aperture stop St shown in FIG. 1 does not indicate the shape and size, but indicates the position in the optical axis direction.

In the example of FIG. 1, during zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. In FIG. 1, during zooming from the wide angle end to the telephoto end, the curved arrow under each movable lens group indicates a schematic movement locus thereof, and a ground symbol is shown under each movable lens group which remains stationary with respect to the image plane Sim.

As in the example of FIG. 1, it is preferable that the first lens group G1 remains stationary with respect to the image plane Sim during zooming. In such a case, since the total length of the lens system does not change even in a case where the magnification is changed, change in centroid during zooming can be suppressed. This is particularly effective because it is possible to suppress change in centroid during zooming while the zoom lens is attached to the gimbal. Further, in such a case, it is preferable that the lens group closest to the object side in the middle group GM moves during zooming.

In the zoom lens according to the present embodiment, the focusing group that moves during focusing is disposed in the middle group GM. The focusing group includes at least one lens and is a group that performs focusing by moving along the optical axis Z. By disposing the focusing group in the middle group GM closer to the image side than the first lens group G1, the effective diameter of the focusing group can be reduced. As a result, there is an advantage in achieving reduction in size. In the example of FIG. 1, the focusing group consists of the fifth lens group G5. The parentheses below the fifth lens group G5 and the horizontal arrow in FIG. 1 indicate that the fifth lens group G5 is the focusing group.

Next, preferable and possible configurations about the conditional expressions of the zoom lens of the present disclosure will be described. Hereinafter, the lens group that moves during zooming is referred to as a "movable lens group", and the lens group remaining stationary with respect to the image plane Sim during zooming is referred to as a "stationary lens group". In the following description of preferable and possible configurations, the "zoom lens of the present disclosure" is also simply referred to as a "zoom lens" in order to avoid redundancy.

Regarding an amount of movement of the focusing group, it is preferable that the zoom lens satisfies Conditional Expression (1). Here, it is assumed that a difference in an optical axis direction between a position of the focusing group in a state in which an infinite distance object is in focus at a telephoto end and a position of the focusing group in a state in which a lateral magnification of a whole system at the telephoto end is −0.1 times is DF. Further, it is assumed that a focal length of the whole system in a state in which the infinite distance object is in focus at the telephoto end is ft. For example, DF is shown in FIG. 2. By not allowing the corresponding value of Conditional Expression (1) to be equal to or less than the lower limit, it is possible to suppress fluctuation in aberrations during focusing. Therefore, it is easy to achieve both high optical performance and an increase in magnification. By not allowing the corresponding value of Conditional Expression (1) to be equal to or greater than the upper limit, it is possible to suppress an increase in total length of the lens system. Therefore, it is easy to achieve both an increase in magnification and reduction in size and weight. Further, by not allowing the corresponding value of Conditional Expression (1) to be equal to or greater than the upper limit, the lens system advantageous for autofocus can be obtained. In order to obtain more favorable characteristics, it is more preferable that the zoom lens satisfies Conditional Expression (1-1), and it is yet more preferable that the zoom lens satisfies Conditional Expression (1-2).

$$0.04 < DF/ft < 0.4 \quad (1)$$

$$0.05 < DF/ft < 0.2 \quad (1\text{-}1)$$

$$0.05 < DF/ft < 0.15 \quad (1\text{-}2)$$

In a case where a difference in the optical axis direction between a position of each lens group in the middle group GM in a state in which the infinite distance object is in focus at the wide angle end and a position thereof in a state in which the infinite distance object is in focus at the telephoto end is set as an amount of zooming movement, it is preferable that the zoom lens satisfies Conditional Expression (2). Here, it is assumed that the amount of zooming movement of a lens group, of which the amount of zooming movement is maximum, among the lens groups in the middle group GM is DV. Further, it is assumed that a focal length of the whole system in a state in which the infinite distance object is in focus at the wide angle end is fw. In the example of FIG. 1, the lens group that has the maximum amount of zooming movement is the third lens group. For example, DV is shown in FIG. 2. By not allowing the corresponding value of Conditional Expression (2) to be equal to or less than the lower limit, the refractive power of the movable lens group in the middle group GM is prevented from becoming excessively strong. Therefore, it is easy to achieve both an increase in magnification and suppression of fluctuation in aberrations such as lateral chromatic aberration, field curvature, and distortion during zooming. Further, by not allowing the corresponding value of Conditional Expression (2) to be equal to or less than the lower limit, there is an advantage in reducing the diameter of the lens in the focusing group. As a result, it is possible to obtain a lens system advantageous for autofocus. By not allowing the corresponding value of Conditional Expression (2) to be equal to or greater than the upper limit, the amount of zooming movement of the movable lens group can be suppressed. As a result, there is an advantage in achieving reduction in total length of the lens system and it is easy to achieve reduction in size. In order to obtain more favorable characteristics, it is more preferable that the zoom lens satisfies Conditional Expression (2-1), and it is yet more preferable that the zoom lens satisfies Conditional Expression (2-2).

$$2 < DV/fw < 18 \quad (2)$$

$$3.5 < DV/fw < 15 \quad (2\text{-}1)$$

$$5 < DV/fw < 12 \quad (2\text{-}2)$$

Assuming that a lateral magnification of the focusing group in a state in which the infinite distance object is in focus at the telephoto end is $\beta Ft$, and a combined lateral magnification of all lenses closer to the image side than the focusing group in a state in which the infinite distance object is in focus at the telephoto end is $\beta Rt$, it is preferable that the zoom lens satisfies Conditional Expression (3). $(1-\beta Ft^2) \times \beta Rt^2$ is a ratio of the amount of image plane movement to the unit amount of movement of the focusing group in a state in which the infinite distance object is in focus at the telephoto end, that is, a so-called shape magnification. By not allowing the corresponding value of Conditional Expression (3) to be equal to or less than the lower limit, it is possible to suppress an increase in total length of the lens system. Therefore, it is easy to achieve reduction in size and weight. By not allowing the corresponding value of Conditional Expression (3) to be equal to or greater than the upper limit, it is possible to suppress fluctuation in aberrations during focusing. Therefore, it is easy to achieve both high optical performance and an increase in magnification. In order to obtain more favorable characteristics, it is more preferable that the zoom lens satisfies Conditional Expression (3-1), and it is yet more preferable that the zoom lens satisfies Conditional Expression (3-2).

$$0.5 < (1-\beta Ft^2) \times \beta Rt^2 < 5 \quad (3)$$

$$0.6 < (1-\beta Ft^2) \times \beta Rt^2 < 3 \quad (3\text{-}1)$$

$$0.7 < (1-\beta Ft^2) \times \beta Rt^2 < 2 \quad (3\text{-}2)$$

It is preferable that the middle group GM includes at least one movable lens group that has a negative refractive power. Hereinafter, the movable lens group that has a negative refractive power is referred to as a "negative movable lens group". In a configuration in which the middle group GM includes at least one negative movable lens group, it is preferable that the zoom lens satisfies Conditional Expression (4). Here, $\beta Mnw$ is defined as follows depending on the case. In a case where a plurality of the negative movable lens groups are continuously disposed in the middle group GM, it is assumed that a combined lateral magnification of the plurality of the negative movable lens groups continuously disposed in a state in which the infinite distance object is in focus at the wide angle end is βMnw. In a case where the plurality of negative movable lens groups are not continuously disposed in the middle group GM, it is assumed that a lateral magnification of any one of the negative movable lens groups in a state in which the infinite distance object is in focus at the wide angle end is βMnw. That is, in a case where a plurality of negative movable lens groups are not continuously disposed in the middle group GM, it is preferable that at least one negative movable lens group in the middle group GM satisfies Conditional Expression (4). By not allowing the corresponding value of Conditional Expression (4) to be equal to or less than the lower limit, the amount of movement of the negative movable lens group relating to Conditional Expression (4) during zooming can be suppressed. As a result, there is an advantage in achieving reduction in total length of the lens system and it is easy to achieve reduction in size. By not allowing the corresponding value of Conditional Expression (4) to be equal to or greater than the upper limit, it is easy to correct distortion, lateral chromatic aberration, and the like at the wide angle end. In order to obtain more favorable characteristics, it is more preferable that the zoom lens satisfies Conditional Expression (4-1), and it is yet more preferable that the zoom lens satisfies Conditional Expression (4-2).

$$-0.5<\beta Mnw<-0.05 \quad (4)$$

$$-0.4<\beta Mnw<-0.1 \quad (4\text{-}1)$$

$$-0.3<\beta Mnw<-0.15 \quad (4\text{-}2)$$

For example, in the example of FIG. 1, the negative movable lens group in the middle group GM is only the third lens group G3, and there is no plurality of negative movable lens groups continuously disposed in the middle group GM. Therefore, in the example of FIG. 1, the lateral magnification of the third lens group G3 in a state in which the infinite distance object is in focus at the wide angle end is βMnw. On the other hand, in Example 4 to be described later, the negative movable lens group in the middle group GM is the second lens group G2 and the third lens group G3, and the two lens groups are continuously disposed. Therefore, in Example 4, the combined lateral magnification of the second lens group G2 and the third lens group G3 in a state in which the infinite distance object is in focus at the wide angle end is βMnw. The βMnt of Conditional Expression (5) described below can be considered in the same manner.

In a configuration in which the middle group GM includes at least one negative movable lens group, it is preferable that the zoom lens satisfies Conditional Expression (5). Here, βMnt is defined as follows depending on the case. In a case where a plurality of negative movable lens groups are continuously disposed in the middle group GM, a combined lateral magnification of the plurality of negative movable lens groups continuously disposed in a state in which the infinite distance object is in focus at the telephoto end is βMnt. In a case where the plurality of negative movable lens groups are not continuously disposed in the middle group GM, a lateral magnification of any one of the negative movable lens groups in a state in which the infinite distance object is in focus at the telephoto end is βMnt. That is, in a case where a plurality of negative movable lens groups are not continuously disposed in the middle group GM, it is preferable that at least one negative movable lens group in the middle group GM satisfies Conditional Expression (5). By not allowing the corresponding value of Conditional Expression (5) to be equal to or less than the lower limit, the amount of movement of the negative movable lens group relating to Conditional Expression (5) during zooming can be suppressed. As a result, there is an advantage in achieving reduction in total length of the lens system and it is easy to achieve reduction in size. By not allowing the corresponding value of Conditional Expression (5) to be equal to or greater than the upper limit, the zoom magnification carried by the negative movable lens group relating to Conditional Expression (5) is prevented from becoming excessively large. Therefore, the refractive power of the negative movable lens group relating to Conditional Expression (5) is prevented from becoming excessively strong. Therefore, it is easy to correct spherical aberration, longitudinal chromatic aberration, and the like, especially at the telephoto end. In order to obtain more favorable characteristics, it is more preferable that the zoom lens satisfies Conditional Expression (5-1), and it is yet more preferable that the zoom lens satisfies Conditional Expression (5-2).

$$-24<\beta Mnt<-2 \quad (5)$$

$$-18<\beta Mnt<-2.5 \quad (5\text{-}1)$$

$$-12<\beta Mnt<-3.3 \quad (5\text{-}2)$$

In a configuration in which the middle group GM includes at least one negative movable lens group, it is preferable that the zoom lens satisfies Conditional Expression (6). Here, it is assumed that a focal length of the negative movable lens group that has a strongest refractive power among the negative movable lens groups in the middle group GM is fMn1. Further, it is assumed that a focal length of the final lens group GE is fE. By not allowing the corresponding value of Conditional Expression (6) to be equal to or less than the lower limit, the refractive power of the final lens group GE is prevented from becoming excessively weak. Therefore, it is easy to correct distortion and lateral chromatic aberration. By not allowing the corresponding value of Conditional Expression (6) to be equal to or greater than the upper limit, it is possible to suppress the amount of movement during zooming of the negative movable lens group that has the strongest refractive power among the negative movable lens groups in the middle group GM. Therefore, there is an advantage in achieving reduction in total length of the lens system and it is easy to achieve reduction in size. In order to obtain more favorable characteristics, it is more preferable that the zoom lens satisfies Conditional Expression (6-1), and it is yet more preferable that the zoom lens satisfies Conditional Expression (6-2).

$$0.02<|fMn1/fE|<0.2 \quad (6)$$

$$0.025<|fMn1/fE|<0.15 \quad (6\text{-}1)$$

$$0.03<|fMn1/fE|<0.1 \quad (6\text{-}2)$$

It is preferable that the zoom lens satisfies Conditional Expressions (4), (5), and (6) at the same time. It is more preferable that the zoom lens satisfies at least one of Conditional Expressions (4), (5), or (6) at the same time and further satisfies Conditional Expressions (4-1), (4-2), (5-1), (5-2), (6-1), and (6-2).

Assuming that a focal length of the focusing group is fF, and a focal length of the final lens group GE is fE, it is preferable that the zoom lens satisfies Conditional Expression (7). By not allowing the corresponding value of Conditional Expression (7) to be equal to or less than the lower limit, the refractive power of the final lens group GE is prevented from becoming excessively weak. Therefore, it is easy to correct distortion and lateral chromatic aberration. By not allowing the corresponding value of Conditional Expression (7) to be equal to or greater than the upper limit, the amount of movement of the focusing group during focusing can be suppressed. As a result, there is an advantage in achieving reduction in total length of the lens system and it is easy to achieve reduction in size. In order to obtain more favorable characteristics, it is more preferable that the zoom lens satisfies Conditional Expression (7-1), and it is yet more preferable that the zoom lens satisfies Conditional Expression (7-2).

$$0.04<|fF/fE|<0.4 \quad (7)$$

$$0.05<|fF/fE|<0.3 \quad (7\text{-}1)$$

$$0.07<|fF/fE|<0.2 \quad (7\text{-}2)$$

It is preferable that the zoom lens satisfies Conditional Expressions (4), (5), and (7) at the same time. It is more preferable that the zoom lens satisfies at least one of Conditional Expressions (4), (5), or (7) at the same time and further satisfies Conditional Expressions (4-1), (4-2), (5-1), (5-2), (7-1), and (7-2).

Regarding the total length of the lens system, it is preferable that the zoom lens satisfies Conditional Expression (8). Here, it is assumed that a sum of a back focal length of the whole system at an air conversion distance and a distance on an optical axis from a lens surface closest to the object side in the first lens group G1 to a lens surface closest to the image side in the final lens group GE in a state in which the infinite distance object is in focus at the telephoto end is TTL. Further, it is assumed that a focal length of the whole system in a state in which the infinite distance object is in focus at the telephoto end is ft. By not allowing the corresponding value of Conditional Expression (8) to be equal to or less than the lower limit, it is possible to suppress an increase in field curvature. Therefore, it is easy to suppress fluctuation in aberrations during zooming and reduce the size and weight. By not allowing the corresponding value of Conditional Expression (8) to be equal to or greater than the upper limit, it is possible to suppress an increase in total length of the lens system. Therefore, it is easy to achieve both an increase in magnification and reduction in size and weight. In order to obtain more favorable characteristics, it is more preferable that the zoom lens satisfies Conditional Expression (8-1), and it is yet more preferable that the zoom lens satisfies Conditional Expression (8-2).

$$0.5<TTL/ft<3 \quad (8)$$

$$0.5<TTL/ft<1.8 \quad (8\text{-}1)$$

$$0.5<TTL/ft<1.2 \quad (8\text{-}2)$$

In a case where a difference in the optical axis direction between a position of each lens group in the middle group GM in a state in which the infinite distance object is in focus at the wide angle end and a position thereof in a state in which the infinite distance object is in focus at the telephoto end is set as an amount of zooming movement, it is preferable that the zoom lens satisfies Conditional Expression (9). Here, it is assumed that the amount of zooming movement of a lens group, of which the amount of zooming movement is maximum, among the lens groups in the middle group GM is DV, and a maximum image height is Ymax. It is assumed that a focal length of the whole system in a state in which the infinite distance object is in focus at the telephoto end is ft, and a focal length of the whole system in a state in which the infinite distance object is in focus at the wide angle end is fw. ft/fw corresponds to the maximum zoom magnification. By not allowing the corresponding value of Conditional Expression (9) to be equal to or less than the lower limit, the refractive power of the lens group that has the maximum amount of zooming movement among the lens groups in the middle group GM is prevented from becoming excessively strong. Therefore, it is easy to suppress fluctuation in aberrations such as lateral chromatic aberration, field curvature, and distortion during zooming. By not allowing the corresponding value of Conditional Expression (9) to be equal to or greater than the upper limit, it is possible to suppress the amount of zooming movement of the lens group that has the maximum amount of zooming movement among the lens groups in the middle group GM. Therefore, there is an advantage in achieving reduction in total length of the lens system and it is easy to achieve reduction in size. In order to obtain more favorable characteristics, it is more preferable that the zoom lens satisfies Conditional Expression (9-1), and it is yet more preferable that the zoom lens satisfies Conditional Expression (9-2).

$$5<DV/\{Ymax\times\log(ft/fw)\}<15 \quad (9)$$

$$5.5<DV/\{Ymax\times\log(ft/fw)\}<12 \quad (9\text{-}1)$$

$$6<DV/\{Ymax\times\log(ft/fw)\}<10 \quad (9\text{-}2)$$

Regarding the amount of movement of the focusing group, it is preferable that the zoom lens satisfies Conditional Expression (10). Here, it is assumed that a difference in an optical axis direction between a position of the focusing group in a state in which an infinite distance object is in focus at a telephoto end and a position of the focusing group in a state in which a lateral magnification of a whole system at the telephoto end is −0.1 times is DF. Further, it is assumed that a focal length of the focusing group is fF. By not allowing the corresponding value of Conditional Expression (10) to be equal to or less than the lower limit, the refractive power of the focusing group is prevented from becoming excessively weak. Therefore, it is possible to suppress an increase in amount of movement of the focusing group in a case where the object distance changes, especially at the telephoto end. As a result, there is an advantage in achieving reduction in size. By not allowing the corresponding value of Conditional Expression (10) to be equal to or greater than the upper limit, the refractive power of the focusing group is prevented from becoming excessively strong. Therefore, it is possible to suppress fluctuation in spherical aberration and field curvature occur especially in a case where the object distance changes at the telephoto end. As a result, there is an advantage in achieving an increase in magnification. Alternatively, by not allowing the corresponding value of Conditional Expression (10) to be equal to or greater than the upper limit, the amount of movement of the focusing group in a case where the object distance changes at the telephoto end is prevented from becoming excessively large. As a result, there is an advantage in achieving reduction in size. The term "object distance" in the present specification is a distance on the optical axis between the zoom lens and the object that is a subject of the zoom lens. In order to obtain more favorable characteristics, it is more preferable that the zoom lens satisfies Conditional Expression (10-1), and it is yet more preferable that the zoom lens satisfies Conditional Expression (10-2).

$$0.1<|DF/fF|<1 \quad (10)$$

$$0.12<|DF/fF|<0.9 \quad (10\text{-}1)$$

$$0.15<|DF/fF|<0.8 \quad (10\text{-}2)$$

In a case where a movable lens group closest to the object side among movable lens groups in the middle group GM is set as a leading movable lens group, it is preferable that the zoom lens satisfies Conditional Expression (11). Here, it is assumed that a focal length of the first lens group G1 is f1. fMVw is defined as follows depending on the case. It is assumed that a combined focal length of a movable lens group line in a state in which the infinite distance object is in focus at the wide angle end is fMVw, in a case where the middle group GM includes the movable lens group line consisting of a plurality of movable lens groups that include the leading movable lens group and are continuously disposed. It is assumed that a focal length of the leading movable lens group is fMVw, in a case where the middle group GM does not include the movable lens group line. By not allowing the corresponding value of Conditional Expression (11) to be equal to or less than the lower limit, the refractive power of the first lens group G1 is prevented from becoming excessively strong. Therefore, it is easy to suppress spherical aberration and longitudinal chromatic aberration especially at the telephoto end. Further, by not allowing the corresponding value of Conditional Expression (11) to be equal to or less than the lower limit, the refractive power of the movable lens group relating to Conditional Expression (11) is prevented from becoming excessively weak. As a result, it is possible to suppress the amount of movement of the movable lens group during zooming. By not allowing the corresponding value of Conditional Expression (11) to be equal to or greater than the upper limit, the refractive power of the first lens group G1 is prevented from becoming excessively weak. Therefore, there are advantages in suppressing an increase in effective diameter of the first lens group G1 and suppressing an increase in total length of the lens system. As a result, it is easy to achieve reduction in size and weight. Further, by not allowing the corresponding value of Conditional Expression (11) to be equal to or greater than the upper limit, the refractive power of the movable lens group relating to Conditional Expression (11) is prevented from becoming excessively strong. Therefore, it is easy to suppress fluctuation in aberrations such as field curvature, distortion, and lateral chromatic aberration during zooming. From the above, by satisfying Conditional Expression (11), there is an advantage in suppressing fluctuation in aberrations during zooming, and it is easy to achieve both an increase in magnification and reduction in size and weight. In order to obtain more favorable characteristics, it is more preferable that the zoom lens satisfies Conditional Expression (11-1), and it is yet more preferable that the zoom lens satisfies Conditional Expression (11-2).

$$-0.4 < fMVw/f1 < -0.03 \qquad (11)$$

$$-0.25 < fMVw/f1 < -0.03 \qquad (11\text{-}1)$$

$$-0.16 < fMVw/f1 < -0.03 \qquad (11\text{-}2)$$

For example, in the example of FIG. 1, the second lens group G2 closest to the object side in the middle group GM is a movable lens group, the third lens group G3 continuously disposed in the second lens group G2 is a movable lens group, and the fourth lens group G4 continuously disposed in the third lens group G3 is a stationary lens group. Therefore, in the example of FIG. 1, the leading movable lens group is the second lens group G2, and a movable lens group line consists of the second lens group G2 and the third lens group G3. In the example of FIG. 1, the combined focal length of the second lens group G2 and the third lens group G3 in a state in which the infinite distance object is in focus at the wide angle end is fMVw.

Unlike the example of FIG. 1, the middle group GM consists of the second lens group G2, the third lens group G3, the fourth lens group G4, and the fifth lens group G5. In a lens system in which the second lens group G2, the third lens group G3, and the fourth lens group G4 are movable lens groups and the fifth lens group G5 is a stationary lens group, the movable lens group line consists of the second lens group G2, the third lens group G3, and the fourth lens group G4. That is, the "movable lens group line" in the present specification includes the leading movable lens group and consists of the largest number of movable lens groups continuously disposed.

In Example 8 to be described later, the second lens group G2 closest to the object side in the middle group GM is a movable lens group, and the third lens group G3 disposed continuous to the second lens group G2 is a stationary lens group. Therefore, in Example 8, the middle group GM is a lens system that does not include the movable lens group line, and in Example 8, the focal length of the second lens group G2, which is the leading movable lens group, is fMVw. The movable lens group line can be similarly considered in Conditional Expression (12) described below.

In a case where the movable lens group closest to the object side is the leading movable lens group among the movable lens groups in the middle group GM, it is preferable that the zoom lens satisfies Conditional Expression (12). Here, βMVt is defined as follows depending on the case. It is assumed that a combined lateral magnification of a movable lens group line in a state in which the infinite distance object is in focus at the telephoto end is βMVt, in a case where the middle group GM includes the movable lens group line consisting of a plurality of movable lens groups that include the leading movable lens group and are continuously disposed. It is assumed that a lateral magnification of the leading movable lens group in a state in which the infinite distance object is in focus at the telephoto end is βMVt, in a case where the middle group GM does not include the movable lens group line. By not allowing the corresponding value of Conditional Expression (12) to be equal to or less than the lower limit, the zoom magnification carried by the movable lens group relating to Conditional Expression (12) is prevented from becoming excessively small. Therefore, it is easy to achieve an increase in magnification. By not allowing the corresponding value of Conditional Expression (12) to be equal to or greater than the upper limit, the zoom magnification carried by the movable lens group relating to Conditional Expression (12) is prevented from becoming excessively large. Therefore, the refractive power of the movable lens group relating to Conditional Expression (12) is prevented from becoming excessively strong. Therefore, it is easy to correct spherical aberration, longitudinal chromatic aberration, and the like, especially at the telephoto end. From the above, by satisfying Conditional Expression (12), it is easy to achieve both suppression of fluctuation in aberrations during zooming and an increase in magnification at the same time. In order to obtain more favorable characteristics, it is more preferable that the zoom lens satisfies Conditional Expression (12-1), and it is yet more preferable that the zoom lens satisfies Conditional Expression (12-2).

$$-20 < \beta MVt < -1.1 \qquad (12)$$

$$-15 < \beta MVt < -2.5 \qquad (12\text{-}1)$$

$$-12 < \beta MVt < -4 \qquad (12\text{-}2)$$

It is preferable that the middle group GM includes at least one stationary lens group. In a configuration in which the middle group GM includes at least one stationary lens group, it is preferable that the zoom lens satisfies Conditional Expression (13). Here, it is assumed that a lateral magnification of the final lens group GE in a state in which the infinite distance object is in focus at the telephoto end is $\beta E$. By satisfying Conditional Expression (13), it is easy to correct the distortion and lateral chromatic aberration. In order to obtain more favorable characteristics, it is more preferable that the zoom lens satisfies Conditional Expression (13-1), and it is yet more preferable that the zoom lens satisfies Conditional Expression (13-2).

$$1<\beta E<2 \tag{13}$$

$$1<\beta E<1.7 \tag{13-1}$$

$$1<\beta E<1.4 \tag{13-2}$$

In a configuration in which the middle group GM includes at least one stationary lens group, it is preferable that the zoom lens satisfies Conditional Expression (14). Here, it is assumed that a lateral magnification of the stationary lens group closest to the image side among the stationary lens groups in the middle group GM in a state in which the infinite distance object is in focus at the telephoto end is $\beta MS$. By not allowing the corresponding value of Conditional Expression (14) to be equal to or less than the lower limit, it is possible to suppress aberrations generated in the stationary lens group. As a result, there is an advantage in reducing spherical aberration and longitudinal chromatic aberration. By not allowing the corresponding value of Conditional Expression (14) to be equal to or greater than the upper limit, it is possible to suppress an increase in diameter of the luminous flux incident on the lens group closer to the image side than the stationary lens group. As a result, there is an advantage in reducing the diameter of the lens. In order to obtain more favorable characteristics, it is more preferable that the zoom lens satisfies Conditional Expression (14-1), and it is yet more preferable that the zoom lens satisfies Conditional Expression (14-2).

$$-1.8<1/\beta MS<1.4 \tag{14}$$

$$-1.2<1/\beta MS<1 \tag{14-1}$$

$$-0.8<1/\beta MS<0.6 \tag{14-2}$$

It is preferable that the zoom lens satisfies Conditional Expressions (13) and (14) at the same time. Then, it is more preferable that the zoom lens satisfies Conditional Expressions (13) and (14) at the same time and further satisfies at least one of Conditional Expressions (13-1), (13-2), (14-1), or (14-2).

Further, at the wide angle end, it is preferable that the zoom lens satisfies Conditional Expression (15). Here, each symbol is defined as follows. It is assumed that a lateral magnification of the focusing group in a state in which the infinite distance object is in focus at the wide angle end is $\beta Fw$. It is assumed that a combined lateral magnification of all lenses closer to the image side than the focusing group in a state in which the infinite distance object is in focus at the wide angle end is $\beta Rw$. $\gamma=(1-\beta Fw^2)\times \beta Rw^2$. $\gamma$ is a ratio of the amount of image plane movement to the unit amount of movement of the focusing group in a state in which the infinite distance object is in focus at the wide angle end, that is, a so-called shape magnification. Further, it is assumed that a focal length of the focusing group is fF. It is assumed that a combined focal length of all lenses closer to the image side than the focusing group in a state in which the infinite distance object is in focus at the wide angle end is fRw. It is assumed that a distance from an exit pupil position to an image plane Sim in a case where the infinite distance object is in focus at the wide angle end is De. A sign of De is positive in a case where the exit pupil position is closer to the object side than the image plane Sim, and is negative in a case where the exit pupil position is closer to the image side than the image plane Sim. It is assumed that a maximum image height is Ymax. By not allowing the corresponding value of Conditional Expression (15) to be equal to or less than the lower limit, there is an advantage in suppressing fluctuation in aberrations during focusing while maintaining reduction in size. By not allowing the corresponding value of Conditional Expression (15) to be equal to or greater than the upper limit, there is an advantage in suppressing fluctuation in size of the image during focusing. From the above, by satisfying Conditional Expression (15), there is an advantage in achieving both reduction in size and suppression of fluctuation in aberrations during focusing. In order to obtain more favorable characteristics, it is more preferable that the zoom lens satisfies Conditional Expression (15-1), and it is yet more preferable that the zoom lens satisfies Conditional Expression (15-2).

$$-0.1<\{\beta Fw/(fF\times\gamma)-1/(\beta Rw\times fRw)-(1/De)\}\times Y\max<0.1 \tag{15}$$

$$-0.075<\{\beta Fw/(fF\times\gamma)-1/(\beta Rw\times fRw)-(1/De)\}\times Y\max<0.075 \tag{15-1}$$

$$-0.05<\{\beta Fw/(fF\times\gamma)-1/(\beta Rw\times fRw)-(1/De)\}\times Y\max<0.05 \tag{15-2}$$

Assuming that the refractive index of the negative lens in the first lens group G1 at the d line is Nd1n, it is preferable that the first lens group G1 includes at least one negative lens satisfying Conditional Expression (16). By satisfying Conditional Expression (16), there is an advantage in achieving reduction in size of the first lens group G1. It is more preferable that at least one negative lens in the first lens group G1 satisfies Conditional Expression (16-1). By not allowing the corresponding value of Conditional Expression (16-1) to be equal to or greater than the upper limit, the specific gravity of the material of the negative lens is prevented from becoming excessively large. As a result, there is an advantage in weight reduction. In order to obtain more favorable characteristics, it is yet more preferable that the zoom lens satisfies Conditional Expression (16-2).

$$1.9<Nd1n \tag{16}$$

$$1.9<Nd1n<2.1 \tag{16-1}$$

$$1.92<Nd1n<2.06 \tag{16-2}$$

It is preferable that the first lens group G1 includes at least two positive lenses. In such a case, it is easy to correct spherical aberration at the telephoto end.

It is preferable that the focusing group is disposed closest to the image side in the middle group GM. In such a case, the diameter of the luminous flux incident on the focusing group can be reduced. As a result, there is an advantage in achieving reduction in size.

Two preferred embodiments in which the above-mentioned configuration and conditional expression are considered are described below. The first aspect is a zoom lens that consists of, in order from the object side to the image side, a first lens group G1 having a positive refractive power, a middle group GM including and a plurality of lens groups in which the spacings between adjacent lens groups change during zooming, and a final lens group GE, where a focusing group that moves during focusing is disposed in the middle group GM and satisfies Conditional Expression (1).

The second aspect is a zoom lens that consists of, in order from the object side to the image side, a first lens group G1 having a positive refractive power, a middle group GM including and a plurality of lens groups in which the spacings between adjacent lens groups change during zooming, and a final lens group GE, where a focusing group that moves during focusing is disposed in the middle group GM and satisfies Conditional Expression (2).

The example shown in FIG. 1 is an example, and various modifications can be made without departing from the scope of the technology of the present disclosure. For example, the number of lenses included in each lens group may be different from the number shown in FIG. 1. Further, in the example of FIG. 1, the middle group GM consists of four lens groups. However, the number of lens groups included in the middle group GM can be arbitrarily set. For example, the middle group GM may be configured to consist of three lens groups.

In the following description, three configuration examples of the middle group GM and the final lens group GE of the zoom lens of the present disclosure will be given. In the following description, a movable lens group that has a positive refractive power is referred to as a "positive movable lens group", a movable lens group that has a negative refractive power is referred to as a "negative movable lens group", a stationary lens group that has a positive refractive power is referred to as a "positive stationary lens group", and a stationary lens group that has a negative refractive power is referred to as a "negative stationary lens group".

In the first configuration example, the middle group GM consists of, in order from the object side to the image side, a positive movable lens group, a negative movable lens group, a positive stationary lens group, and a positive movable lens group, and the final lens group GE consists of a group of negative stationary lens groups. In the first configuration example, the negative movable lens group has a function of the main zooming effect. By disposing a positive movable lens group between the negative movable lens group and the first lens group G1 and moving the positive movable lens group during zooming, there is an advantage in suppressing fluctuation in spherical aberration during zooming.

In the second configuration example, the middle group GM consists of, in order from the object side to the image side, a negative movable lens group, a negative movable lens group, a positive stationary lens group, and a positive movable lens group, and the final lens group GE consists of a group of positive stationary lens groups. In the second configuration example, the two negative movable lens groups share the main zooming effect and move during zooming. Therefore, fluctuation in field curvature due to the zooming can be suppressed.

In the third configuration example, the middle group GM consists of, in order from the object side to the image side, a negative movable lens group, a positive stationary lens group, and a positive movable lens group, and the final lens group GE consists of a group of positive stationary lens groups. In the third configuration example, zooming is performed by the negative movable lens group, and focusing is performed by the positive movable lens group correcting fluctuation in image plane position during zooming.

The above-mentioned preferred configurations and available configurations may be optional combinations, and it is preferable to selectively adopt the configurations in accordance with required specification. It should be noted that the conditional expressions that the zoom lens of the present disclosure preferably satisfies are not limited to the conditional expressions described in the form of the expression, and the lower limit and the upper limit are selected from the preferable and more preferable, more preferable, and yet more preferable conditional expressions. The conditional expressions may include all conditional expressions obtained through optional combinations.

Next, examples of the zoom lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 shows a configuration and movement loci of a zoom lens of Example 1, and an illustration method and a configuration thereof are as described above. Therefore, some description is not repeated herein. The zoom lens of Example 1 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The middle group GM consists of a second lens group G2, a third lens group G3, a fourth lens group G4, and a fifth lens group G5. The final lens group GE consists of a sixth lens group G6. The focusing group consists of a fifth lens group G5.

Regarding the zoom lens of Example 1, Table 1 shows basic lens data, Table 2 shows specifications and variable surface spacings, and Table 3 shows aspherical coefficients thereof.

The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of νd shows an Abbe number of each constituent element based on the d line. The column of θgF shows a partial dispersion ratio of each constituent element between the g line and the F line. It should be noted that the partial dispersion ratio θgF of a certain lens between the g line and the F line is defined by θgF=(Ng−NF)/(NF−NC), where Ng, NF, and NC are the refractive indexes of the lens at the g line, the F line, and the C line.

In the table of basic lens data, the sign of the curvature radius of the convex surface facing toward the object side is positive and the sign of the curvature radius of the convex surface facing toward the image side is negative. In a cell of a surface number of a surface corresponding to the aperture stop St, the surface number and a term of (St) are noted. The table of basic lens data also shows the optical member PP. A value at the bottom cell of the column of D in the table indicates a spacing between the image plane Sim and the surface closest to the image side in the table. The symbol DD[ ] is used for each variable surface spacing during zooming, and the object side surface number of the spacing is given in [ ] and is noted in the column of D.

Table 2 shows the maximum zoom magnification Zr, the focal length f, the open F number FNo., the maximum total angle of view 2ω, the maximum image height Ymax, and the variable surface spacing, based on the d line. (°) in the cell of 2ω indicates that the unit thereof is a degree. In Table 2, the column labeled "WIDE" shows values in a state in which the infinite distance object is in focus at the wide angle end, the column labeled "TELE" shows values in a state in which the infinite distance object is in focus at the telephoto end, and the column labeled "TELE, β=−0.1" shows values in a state in which the lateral magnification of the zoom lens at the telephoto end is −0.1 times.

In basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am show numerical values of the aspherical coefficients for each aspherical surface. It should be noted that m of Am is an integer from 3 to 20. The "E±n" (n: an integer) in numerical values of the aspherical coefficients of Table 3 indicates "×10$^{\pm n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of a paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | νd | θgF |
|---|---|---|---|---|---|
| 1 | 104.84418 | 2.280 | 1.99377 | 27.12 | 0.60601 |
| 2 | 70.15853 | 1.000 | | | |
| 3 | 70.02345 | 11.198 | 1.43875 | 94.94 | 0.53433 |
| 4 | 1461.67725 | 0.120 | | | |
| 5 | 92.39314 | 5.148 | 1.79560 | 50.81 | 0.54549 |
| 6 | 243.92932 | DD[6] | | | |

TABLE 1-continued

Example 1

| Sn | R | D | Nd | νd | θgF |
|---|---|---|---|---|---|
| 7 | 52.63911 | 5.711 | 1.43307 | 91.26 | 0.49249 |
| 8 | 231.04931 | DD[8] | | | |
| 9 | 106.15396 | 1.028 | 2.07433 | 21.45 | 0.64115 |
| 10 | 13.15798 | 7.437 | | | |
| 11 | −62.01983 | 6.688 | 2.02278 | 14.33 | 0.68314 |
| 12 | −−15.46075 | 1.992 | 1.90223 | 37.00 | 0.57807 |
| 13 | 45.88654 | 0.353 | | | |
| 14 | 22.39312 | 3.254 | 1.44238 | 67.57 | 0.52604 |
| 15 | 171.42179 | DD[15] | | | |
| 16(St) | ∞ | 3.253 | | | |
| 17 | 53.92293 | 3.915 | 1.85522 | 23.07 | 0.62591 |
| 18 | −55.13137 | 1.714 | 1.79641 | 43.54 | 0.56469 |
| 19 | 47.21786 | 1.732 | | | |
| 20 | 56.22673 | 8.496 | 1.50308 | 80.52 | 0.53776 |
| 21 | −69.76230 | 0.146 | | | |
| 22 | 59.36350 | 4.176 | 1.49708 | 63.19 | 0.53569 |
| 23 | −42.74006 | 1.002 | 1.79844 | 25.58 | 0.61592 |
| 24 | 90.35618 | DD[24] | | | |
| 25 | 83.97862 | 9.242 | 1.50308 | 80.52 | 0.53776 |
| 26 | −23.44413 | 0.950 | 1.79844 | 34.92 | 0.58698 |
| 27 | −99.37718 | 0.242 | | | |
| *28 | 65.39779 | 7.695 | 1.58313 | 59.38 | 0.54237 |
| *29 | −29.01762 | DD[29] | | | |
| 30 | −35.22578 | 1.107 | 1.79213 | 48.79 | 0.55322 |
| 31 | 29.54173 | 7.913 | 1.52413 | 50.48 | 0.56014 |
| 32 | −23.43103 | 2.000 | | | |
| 33 | ∞ | 33.000 | 1.60859 | 46.44 | 0.56664 |
| 34 | ∞ | 13.200 | 1.51633 | 64.05 | 0.53463 |
| 35 | ∞ | 8.376 | | | |

TABLE 2

Example 1

| | WIDE | TELE | TELE, β = −0.1 |
|---|---|---|---|
| Zr | 1.0 | 35.0 | 35.0 |
| f | 7.898 | 276.418 | 244.437 |
| FNo. | 1.98 | 4.84 | 4.01 |
| 2ω(°) | 71.8 | 2.2 | 2.4 |
| Ymax | 5.5 | 5.5 | 5.5 |
| DD[6] | 0.687 | 20.991 | 20.991 |
| DD[8] | 0.163 | 48.830 | 48.830 |
| DD[15] | 73.029 | 4.059 | 4.059 |
| DD[24] | 20.989 | 23.071 | 9.045 |
| DD[29] | 2.764 | 0.682 | 14.708 |

TABLE 3

Example 1

| Sn | 28 | 29 |
|---|---|---|
| KA | 1.0000000E+00 | 1.0000000E+00 |
| A3 | 0.0000000E+00 | 0.0000000E+00 |
| A4 | −9.1122076E−06 | 3.2360030E−06 |
| A5 | 5.8779053E−08 | 3.6185421E−08 |
| A6 | −3.7405788E−08 | −3.1165470E−08 |
| A7 | −1.831848 1E−10 | −7.6495966E−10 |
| A8 | −1.6194216E−11 | 3.5025757E−11 |
| A9 | −5.8791329E−12 | −6.4441992E−12 |
| A10 | −3.5918534E−13 | −8.8750709E−14 |
| A11 | −1.2336475E−14 | −2.2572283E−14 |
| A12 | −2.502033 1E−16 | −3.0144018E−16 |
| A13 | 5.7927095E−17 | 4.8517775E−18 |
| A14 | −9.0842839E−18 | 2.1557781E−18 |
| A15 | 4.9574136E−20 | 2.7053475E−19 |
| A16 | −5.9834320E−20 | −3.6361288E−20 |
| A17 | 4.4363718E−21 | −2.3676962E−21 |
| A18 | 2.8659492E−22 | −2.0388194E−22 |

TABLE 3-continued

| | Example 1 | |
|---|---|---|
| Sn | 28 | 29 |
| A19 | −5.7173664E−23 | 9.9654016E−24 |
| A20 | −8.7496819E−25 | −3.1709320E−25 |

Figure 3:
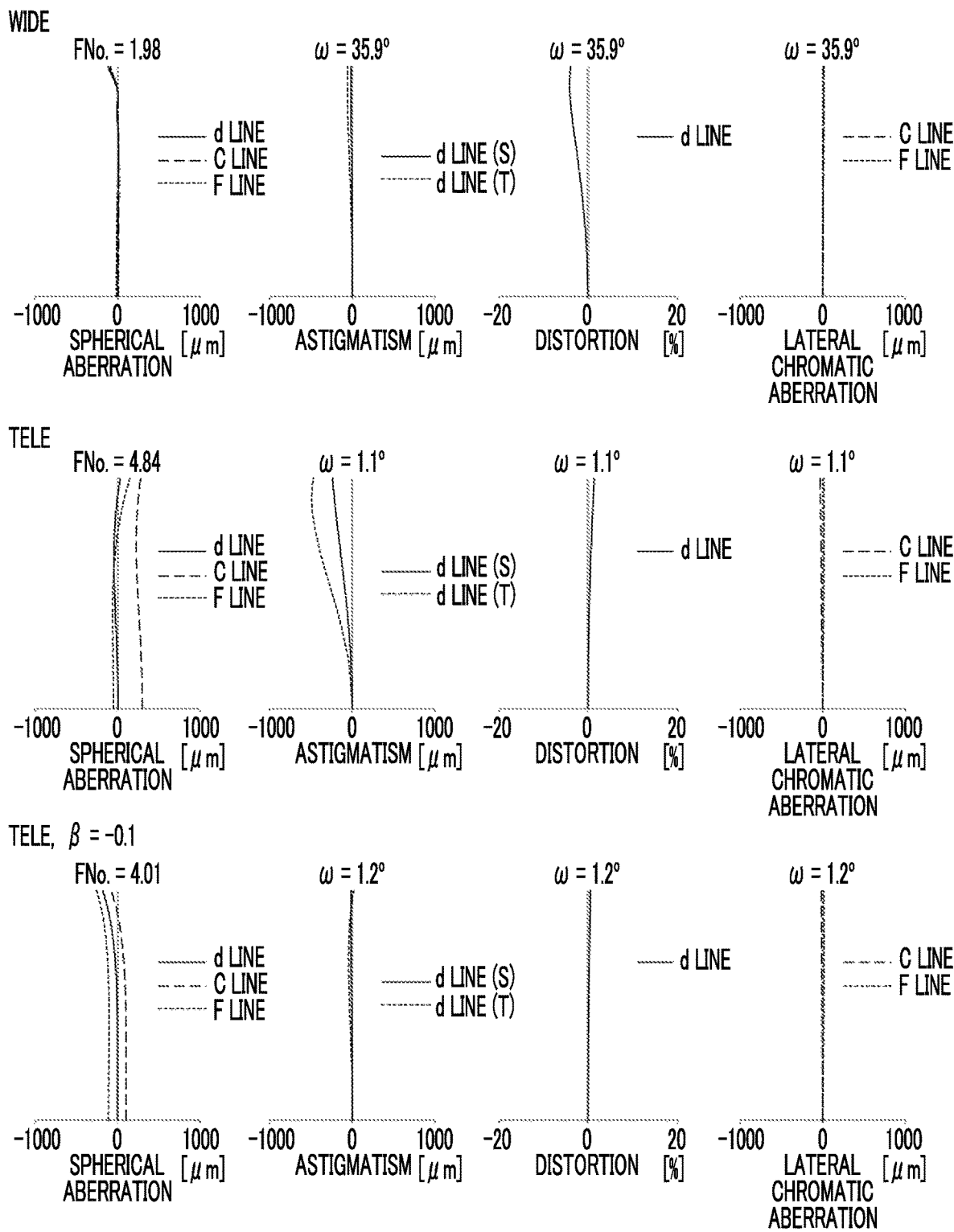
FIG. 3 is a diagram illustrating aberrations of the zoom lens of Example 1.

FIG. 3 shows a diagram of aberrations of the zoom lens of Example 1. In FIG. 3, in order from the left side, spherical aberration, astigmatism, distortion, and lateral chromatic aberration are shown. In FIG. 3, the upper part labeled "WIDE" shows aberrations in a state in which the infinite distance object is in focus at the wide angle end, the middle part labeled "TELE" shows aberrations in a state in which the infinite distance object is in focus at the telephoto end, and the lower part labeled "TELE, β=−0.1" shows aberrations in a state in which the lateral magnification of the zoom lens at the telephoto end is −0.1 times. The object distance in a state where the lateral magnification of the zoom lens is −0.1 times is 1.6 m (meters). In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In the lateral chromatic aberration diagram, aberrations at the C line, and the F line are respectively indicated by the long broken line, and the short broken line. In the spherical aberration diagram, the value of the open F number is shown after FNo.=. In other aberration diagrams, the value of the maximum half angle of view is shown after ω=.

Symbols, meanings, description methods, and illustration methods of the respective data pieces according to Example 1 are the same as those in the following examples unless otherwise specified. Therefore, in the following description, repeated description will be omitted.

Example 2

Figure 4:
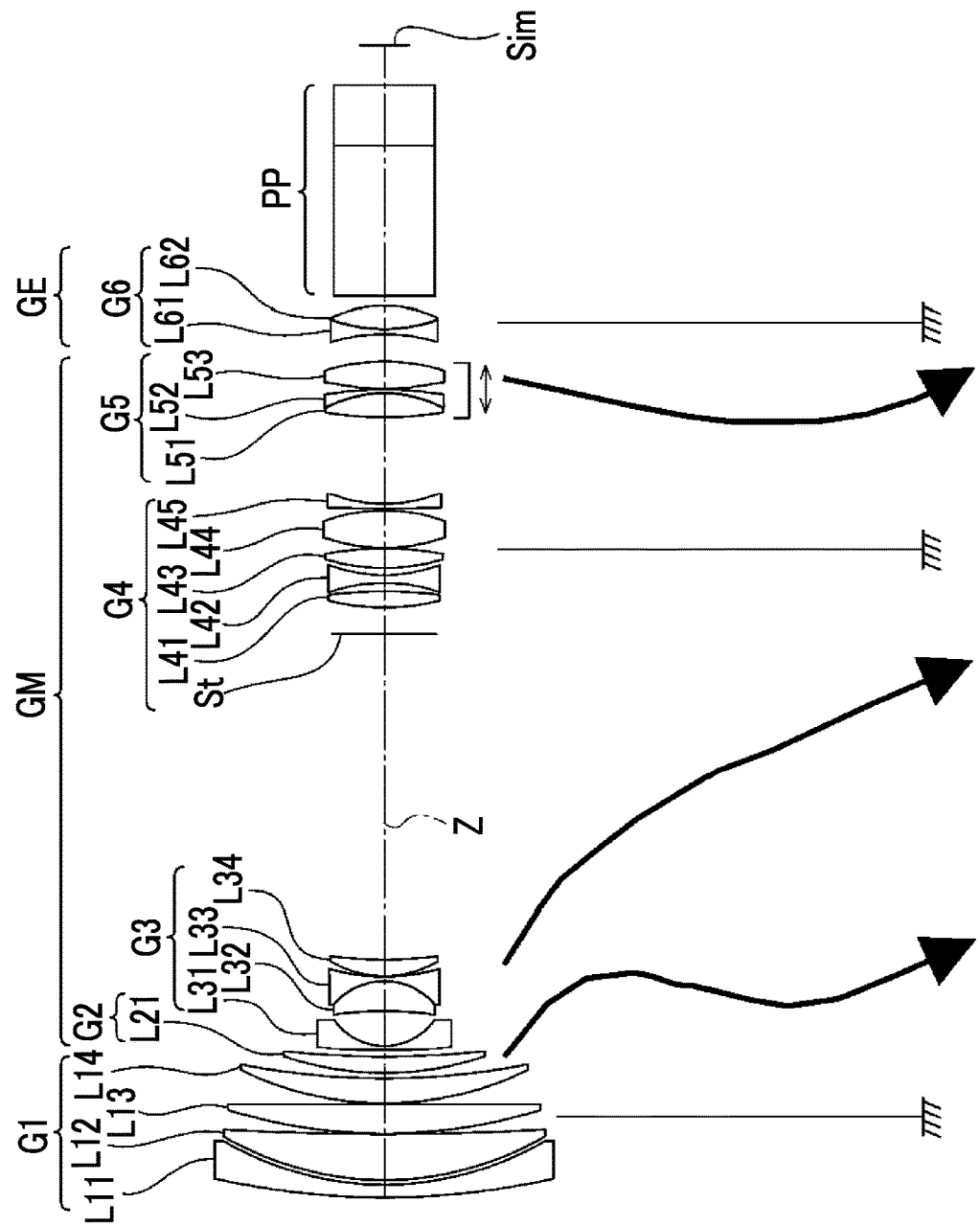
FIG. 4 is a cross-sectional view of a configuration of a zoom lens of Example 2 and a diagram illustrating movement loci thereof.

FIG. 4 shows a configuration and movement loci of the zoom lens of Example 2. The zoom lens of Example 2 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The middle group GM consists of a second lens group G2, a third lens group G3, a fourth lens group G4, and a fifth lens group G5. The final lens group GE consists of a sixth lens group G6. The focusing group consists of a fifth lens group G5.

The first lens group G1 consists of four lenses L11 to L14 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Figure 5:
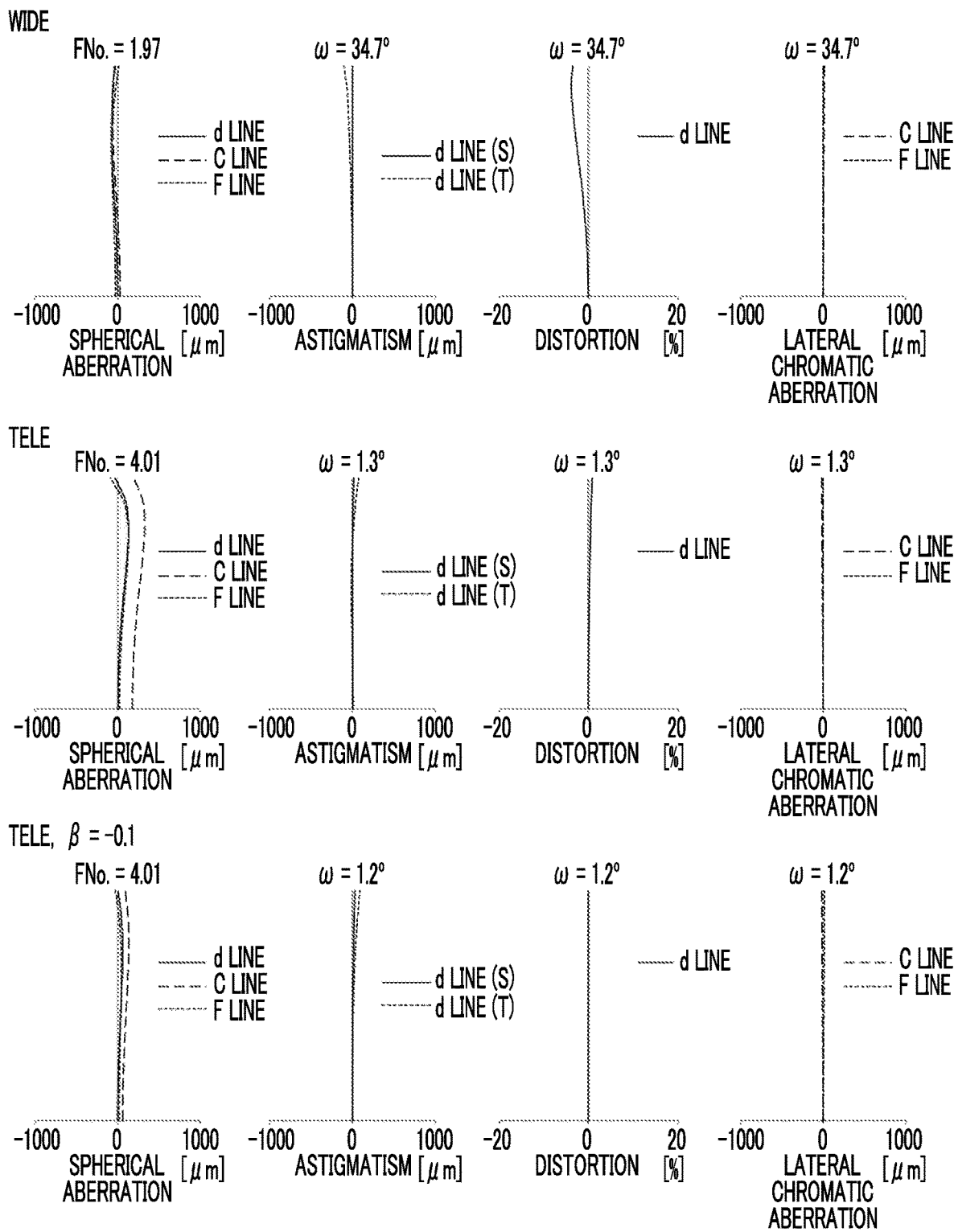
FIG. 5 is a diagram illustrating aberrations of the zoom lens of Example 2.

Regarding the zoom lens of Example 2, Table 4 shows basic lens data, Table 5 shows specifications and variable surface spacings, and Table 6 shows aspherical coefficients thereof. FIG. 5 shows aberration diagrams. The object distance in a state where the lateral magnification of the zoom lens is −0.1 times is 1.6 m (meters).

TABLE 4

| | Example 2 | | | | |
|---|---|---|---|---|---|
| Sn | R | D | Nd | νd | θgF |
| 1 | 177.68796 | 2.800 | 1.85883 | 30.00 | 0.59793 |
| 2 | 73.18677 | 1.000 | | | |
| 3 | 73.18677 | 10.009 | 1.43875 | 94.94 | 0.53433 |
| 4 | 658.04596 | 0.120 | | | |
| 5 | 122.36861 | 6.458 | 1.43875 | 94.94 | 0.53433 |
| 6 | −8597.22391 | 0.120 | | | |
| 7 | 74.60476 | 5.452 | 1.81680 | 46.32 | 0.55793 |
| 8 | 169.49126 | DD[8] | | | |
| 9 | 72.43647 | 3.591 | 1.55032 | 75.50 | 0.54170 |
| 10 | 220.01653 | DD[10] | | | |
| 11 | 158.44265 | 1.000 | 2.00100 | 27.90 | 0.60338 |
| 12 | 14.07192 | 7.704 | | | |
| 13 | −78.01643 | 6.498 | 1.94595 | 17.98 | 0.65460 |
| 14 | −15.15951 | 0.970 | 1.90043 | 37.37 | 0.57720 |
| 15 | 47.15596 | 0.120 | | | |
| 16 | 24.33689 | 3.628 | 1.57761 | 40.45 | 0.57852 |
| 17 | 99.09638 | DD[17] | | | |
| 18(St) | ∞ | 5.750 | | | |
| 19 | 50.79214 | 3.519 | 1.85896 | 22.73 | 0.62844 |
| 20 | −96.64659 | 1.885 | | | |
| 21 | −38.47540 | 1.673 | 1.80000 | 48.00 | 0.55473 |
| 22 | 36.30227 | 1.593 | | | |
| 23 | 47.58788 | 4.268 | 1.51708 | 78.17 | 0.53841 |
| 24 | −72.53234 | 0.120 | | | |
| 25 | 42.05408 | 8.163 | 1.49701 | 55.56 | 0.55152 |
| 26 | −39.60207 | 0.500 | | | |
| 27 | 685.96000 | 0.900 | 1.80000 | 25.00 | 0.61743 |
| 28 | 34.51010 | DD[28] | | | |
| 29 | 83.33334 | 5.255 | 1.51708 | 78.17 | 0.53841 |
| 30 | −28.57526 | 0.800 | 1.85000 | 28.53 | 0.60495 |
| 31 | −80.13641 | 0.120 | | | |
| *32 | 52.51090 | 5.979 | 1.58313 | 59.38 | 0.54237 |
| *33 | −47.41804 | DD[33] | | | |
| 34 | −43.26011 | 1.100 | 1.80000 | 46.86 | 0.55732 |
| 35 | 36.04142 | 5.000 | 1.56530 | 42.76 | 0.57422 |
| 36 | −29.59894 | 2.000 | | | |
| 37 | ∞ | 33.000 | 1.60859 | 46.44 | 0.56664 |
| 38 | ∞ | 13.200 | 1.51633 | 64.05 | 0.53463 |
| 39 | ∞ | 8.735 | | | |

TABLE 5

| | Example 2 | | |
|---|---|---|---|
| | WIDE | TELE | TELE, β = −0.1 |
| Zr | 1.0 | 30.0 | 30.0 |
| f | 8.250 | 247.493 | 229.575 |
| FNo. | 1.97 | 4.01 | 4.01 |
| 2ω(°) | 69.4 | 2.6 | 2.4 |
| Ymax | 5.5 | 5.5 | 5.5 |
| DD[8] | 1.214 | 28.054 | 28.054 |
| DD[10] | 1.365 | 40.935 | 40.935 |
| DD[17] | 70.932 | 4.522 | 4.522 |
| DD[28] | 19.033 | 23.528 | 7.872 |
| DD[33] | 5.945 | 1.450 | 17.106 |

TABLE 6

Example 2

| Sn | 32 | 33 |
|---|---|---|
| KA | 1.0000000E+00 | 1.0000000E+00 |
| A3 | 0.0000000E+00 | 0.0000000E+00 |
| A4 | −3.0760279E−06 | 1.1306977E−06 |
| A5 | 2.0812588E−09 | 1.6201762E−08 |
| A6 | −9.8483222E−09 | −1.0645349E−08 |
| A7 | 2.4295213E−10 | 1.2627966E−10 |
| A8 | −1.8325750E−11 | −1.2952721E−12 |
| A9 | −2.5091629E−12 | −2.9581299E−12 |
| A10 | −1.3213030E−13 | −5.5736599E−14 |
| A11 | −5.3440011E−15 | −1.0600492E−14 |
| A12 | 5.1575574E−16 | 1.6181290E−16 |
| A13 | 4.7963535E−18 | −4.1497886E−17 |
| A14 | −5.6358635E−18 | 1.9112706E−18 |
| A15 | 2.0339815E−19 | 2.2375299E−19 |
| A16 | −3.6599702E−20 | 1.9948034E−21 |
| A17 | 1.1107915E−22 | −1.6968432E−21 |
| A18 | 5.6219111E−22 | −5.0282649E−23 |
| A19 | −2.2779067E−23 | 1.5712362E−23 |
| A20 | −8.4919578E−25 | −1.0465125E−24 |

Example 3

Figure 6:
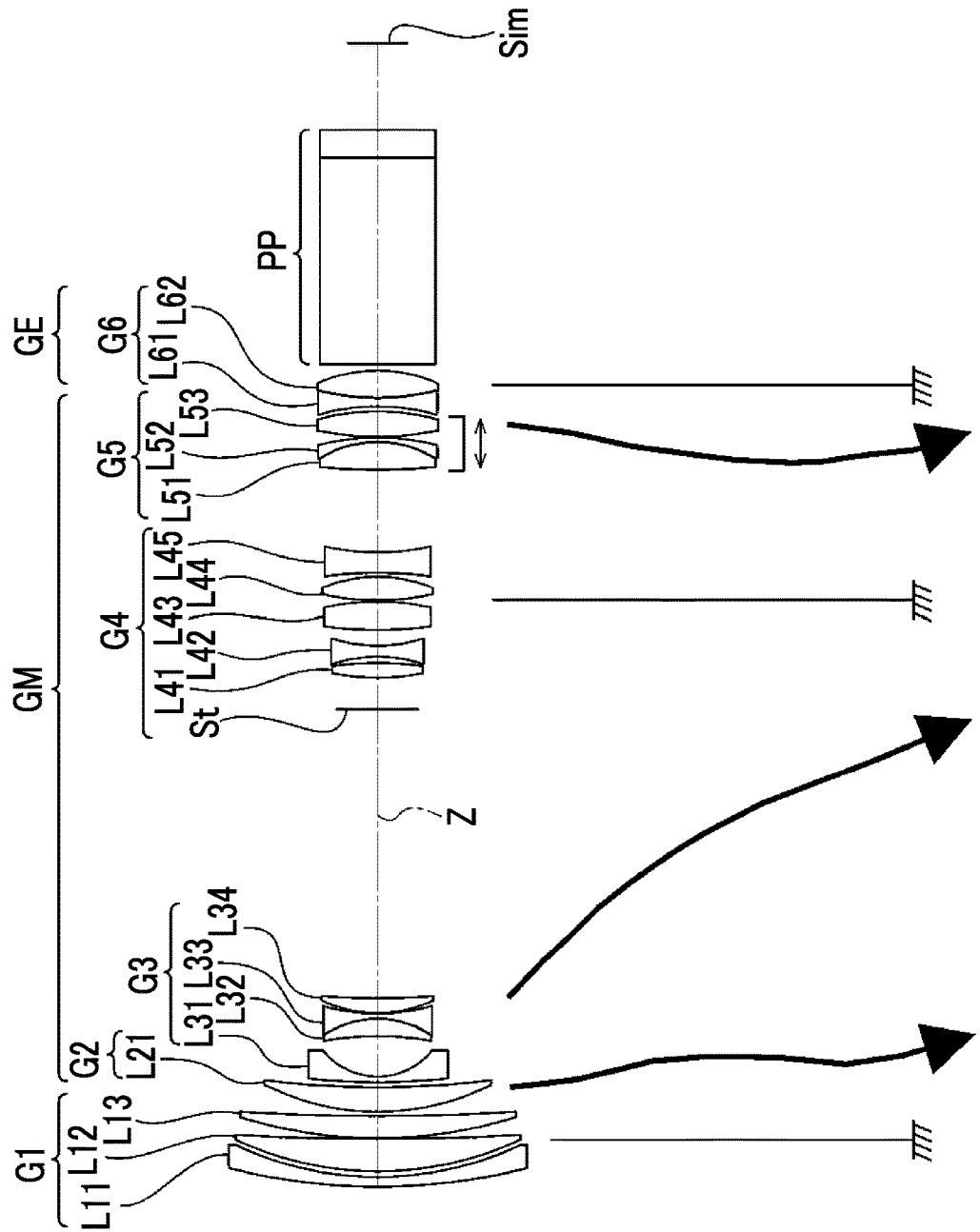
FIG. 6 is a cross-sectional view of a configuration of a zoom lens of Example 3 and a diagram illustrating movement loci thereof.

FIG. 6 shows a configuration and movement loci of the zoom lens of Example 3. The zoom lens of Example 3 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The middle group GM consists of a second lens group G2, a third lens group G3, a fourth lens group G4, and a fifth lens group G5. The final lens group GE consists of a sixth lens group G6. The focusing group consists of a fifth lens group G5.

The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 3, Table 7 shows basic lens data, Table 8 shows specifications and variable surface spacings, and Table 9 shows aspherical coefficients thereof. FIG. 7 shows aberration diagrams. The object distance in a state where the lateral magnification of the zoom lens is −0.1 times is 1.6 m (meters).

TABLE 7

Example 3

| Sn | R | D | Nd | νd | θgF |
|---|---|---|---|---|---|
| 1 | 192.31394 | 3.000 | 1.92205 | 25.92 | 0.61249 |
| 2 | 107.05086 | 1.682 | | | |
| 3 | 107.05086 | 9.890 | 1.43875 | 94.94 | 0.53433 |
| 4 | 792.14037 | 0.200 | | | |
| 5 | 146.81144 | 6.750 | 1.74602 | 53.40 | 0.54464 |
| 6 | 705.44701 | DD[6] | | | |
| 7 | 79.63596 | 7.513 | 1.55032 | 75.50 | 0.54170 |
| 8 | 292.13211 | DD[8] | | | |
| 9 | 204.98728 | 1.682 | 1.95266 | 32.73 | 0.58899 |
| 10 | 22.47554 | 12.509 | | | |
| 11 | −101.93005 | 5.322 | 1.94595 | 17.98 | 0.65460 |
| 12 | −30.84394 | 1.632 | 1.90047 | 37.37 | 0.57720 |
| 13 | 67.56456 | 0.120 | | | |
| 14 | 42.01885 | 4.578 | 1.79630 | 27.17 | 0.61064 |
| 15 | 283.56783 | DD[15] | | | |
| 16(St) | ∞ | 9.671 | | | |
| 17 | 75.63268 | 4.548 | 1.85001 | 23.29 | 0.62416 |
| 18 | −108.35267 | 1.862 | | | |
| 19 | −46.64287 | 3.364 | 1.73732 | 54.27 | 0.54495 |
| 20 | 49.03088 | 4.774 | | | |
| 21 | 127.12893 | 8.391 | 1.52739 | 75.79 | 0.53848 |
| 22 | −78.19098 | 0.441 | | | |
| 23 | 83.46802 | 7.139 | 1.54329 | 59.14 | 0.54404 |
| 24 | −45.10520 | 1.165 | | | |
| 25 | −129.16164 | 6.187 | 1.79999 | 25.47 | 0.61623 |
| 26 | 76.38443 | DD[26] | | | |
| 27 | 215.76509 | 8.472 | 1.52739 | 75.79 | 0.53848 |
| 28 | −35.09158 | 1.349 | 1.84943 | 31.99 | 0.59421 |
| 29 | −75.98436 | 0.202 | | | |
| *30 | 88.15752 | 7.750 | 1.58313 | 59.38 | 0.54237 |
| *31 | −72.33137 | DD[31] | | | |
| 32 | −66.79491 | 2.533 | 1.79987 | 48.01 | 0.55470 |
| 33 | 75.63543 | 8.351 | 1.55339 | 44.99 | 0.57005 |
| 34 | −48.18918 | 2.000 | | | |
| 35 | ∞ | 63.000 | 1.60863 | 46.60 | 0.56787 |
| 36 | ∞ | 8.500 | 1.51633 | 64.14 | 0.53531 |
| 37 | ∞ | DD[37] | | | |

TABLE 8

Example 3

| | WIDE | TELE | TELE, β = −0.1 |
|---|---|---|---|
| Zr | 1.0 | 13.6 | 13.6 |
| f | 15.511 | 210.176 | 212.065 |
| FNo. | 2.48 | 3.52 | 3.52 |
| 2ω(°) | 64.2 | 5.0 | 4.8 |
| Ymax | 9.25 | 9.25 | 9.25 |
| DD[6] | 1.283 | 16.319 | 16.319 |
| DD[8] | 1.513 | 70.419 | 70.419 |
| DD[15] | 88.027 | 4.085 | 4.085 |
| DD[26] | 25.393 | 23.201 | 9.357 |
| DD[31] | 1.548 | 3.740 | 17.584 |
| DD[37] | 26.368 | 26.368 | 26.368 |

TABLE 9

Example 3

| Sn | 30 | 31 |
|---|---|---|
| KA | 1.0000000E+00 | 1.0000000E+00 |
| A3 | 0.0000000E+00 | 0.0000000E+00 |
| A4 | −6.4662618E−07 | 2.3768924E−07 |
| A5 | 2.6014178E−10 | 2.0250990E−09 |
| A6 | 7.3192615E−10 | −7.9116108E−10 |
| A7 | −1.0736104E−11 | 5.5803242E−12 |
| A8 | −4.8151386E−13 | −3.4033612E−14 |
| A9 | −3.9200977E−14 | −4.6215246E−14 |
| A10 | −1.2274151E−15 | −5.1776120E−16 |

TABLE 9-continued

Example 3

| Sn | 30 | 31 |
|---|---|---|
| A11 | −2.9517296E−17 | −5.8551233E−17 |
| A12 | 1.6938506E−18 | 5.3142771E−19 |
| A13 | 9.3661957E−21 | −8.1036004E−20 |
| A14 | −6.543 8527E−21 | 2.2191938E−21 |
| A15 | 1.4042391E−22 | 1.5447667E−22 |
| A16 | −1.5024243E−23 | 8.1887037E−25 |
| A17 | 2.7112441E−26 | −4.1416918E−25 |
| A18 | 8.1590771E−26 | −7.2975187E−27 |
| A19 | −1.9656854E−27 | 1.3558746E−27 |
| A20 | −4.3571940E−29 | −5.3696190E−29 |

Example 4

Figure 8:
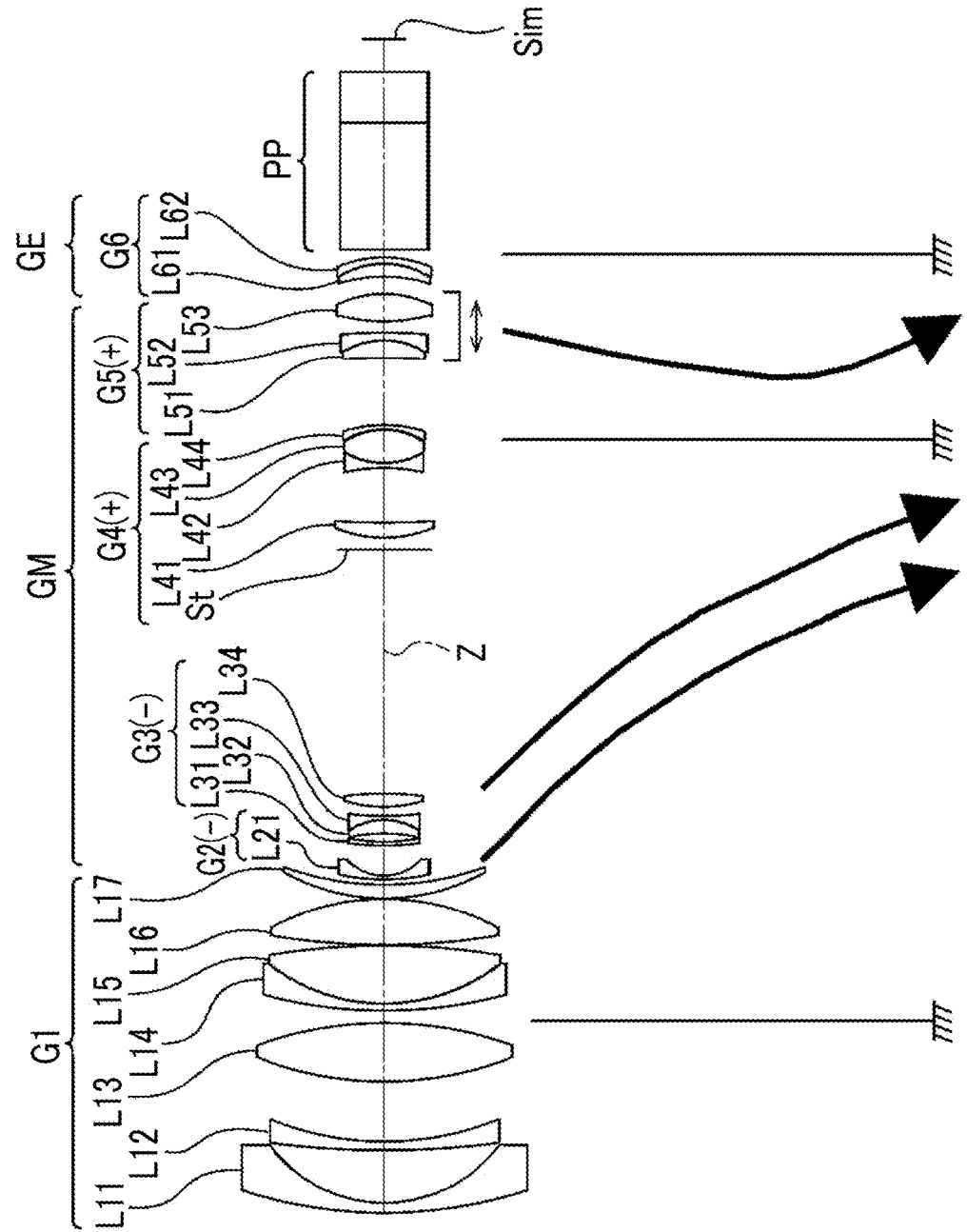
FIG. 8 is a cross-sectional view of a configuration of a zoom lens of Example 4 and a diagram illustrating movement loci thereof.

FIG. 8 shows a configuration and movement loci of the zoom lens of Example 4. Further, FIG. 9 shows a configuration and a luminous flux in each state of the zoom lens of Example 4. Since the illustration method of FIG. 9 is the same as that of FIG. 2, repeated description will not be given. The zoom lens of Example 4 consists of, in order from the object side to the image side, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and a sixth lens group G6 having a positive refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The middle group GM consists of a second lens group G2, a third lens group G3, a fourth lens group G4, and a fifth lens group G5. The final lens group GE consists of a sixth lens group G6. The focusing group consists of a fifth lens group G5.

The first lens group G1 consists of seven lenses L11 to L17 in order from the object side to the image side. The second lens group G2 consists of one lens L21. The third lens group G3 consists of four lenses L31 to L34 in order from the object side to the image side. The fourth lens group G4 consists of an aperture stop St and four lenses L41 to L44 in order from the object side to the image side. The fifth lens group G5 consists of three lenses L51 to L53 in order from the object side to the image side. The sixth lens group G6 consists of two lenses L61 and L62 in order from the object side to the image side.

Figure 10:
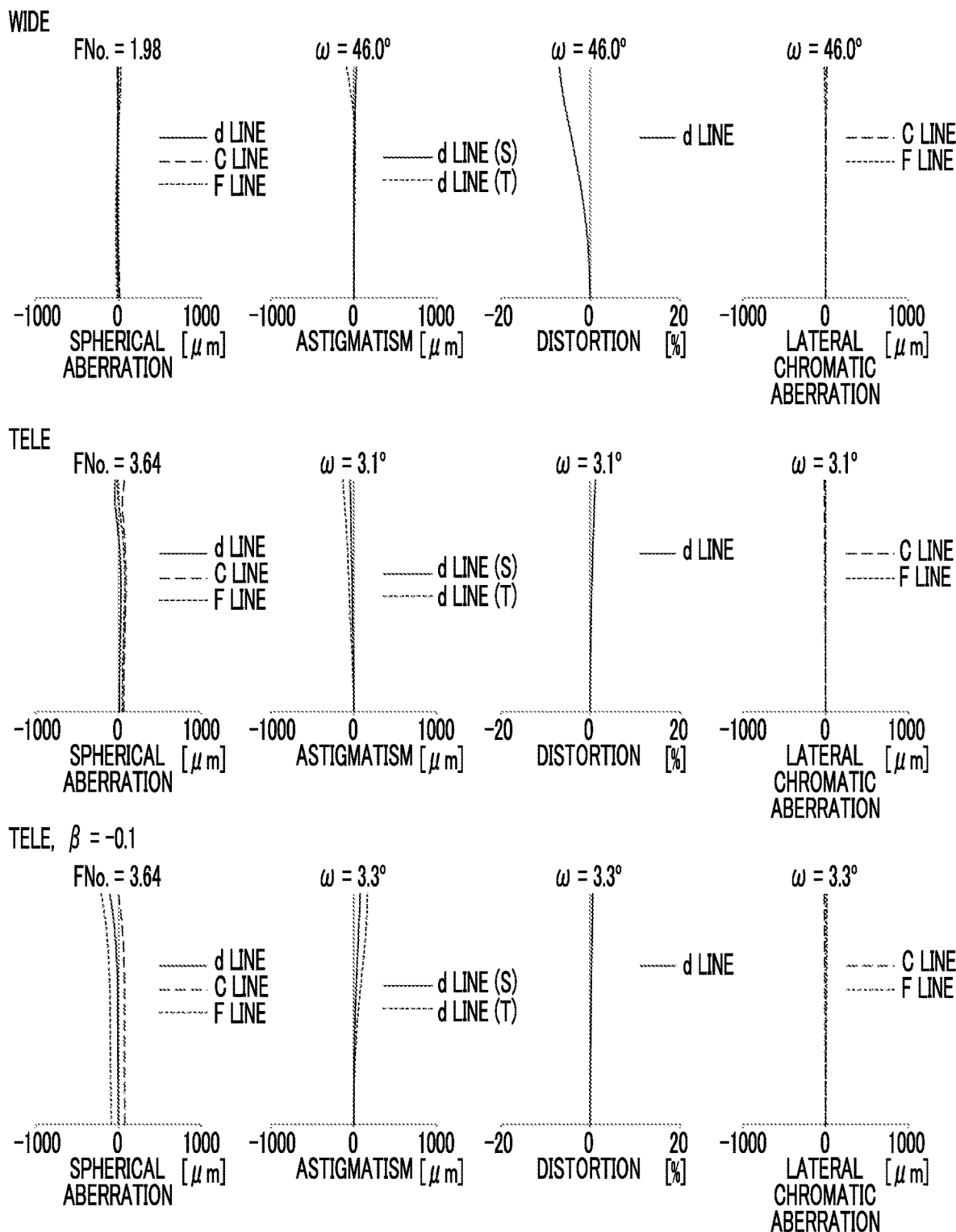
FIG. 10 is a diagram illustrating aberrations of the zoom lens of Example 4.

Regarding the zoom lens of Example 4, Table 10A and 10B show basic lens data, Table 11 shows specifications and variable surface spacings, and Table 12 shows aspherical coefficients thereof. FIG. 10 shows aberration diagrams. The object distance in a state where the lateral magnification of the zoom lens is −0.1 times is 0.7 m (meters). The table of basic lens data is divided into two tables in order to prevent one table from lengthening.

TABLE 10A

Example 4

| Sn | R | D | Nd | V6 | θgF |
|---|---|---|---|---|---|
| 1 | 125.79931 | 2.600 | 1.90001 | 38.00 | 0.57547 |
| 2 | 38.33321 | 13.740 | | | |

TABLE 10A-continued

Example 4

| Sn | R | D | Nd | V6 | θgF |
|---|---|---|---|---|---|
| 3 | 233.72468 | 2.300 | 1.77542 | 50.46 | 0.55043 |
| 4 | 81.96091 | 15.535 | | | |
| 5 | 94.37345 | 15.205 | 1.55965 | 53.26 | 0.55541 |
| 6 | −102.52948 | 3.214 | | | |
| 7 | 127.71158 | 1.799 | 1.89367 | 38.63 | 0.57391 |
| 8 | 50.72822 | 15.077 | 1.43875 | 94.94 | 0.53433 |
| 9 | −191.74903 | 0.200 | | | |
| 10 | 185.01278 | 12.035 | 1.46619 | 88.68 | 0.53565 |
| 11 | −63.79509 | 0.120 | | | |
| 12 | 55.38385 | 3.558 | 1.65386 | 58.81 | 0.54268 |
| 13 | 78.23266 | DD[13] | | | |
| 14 | 54.52950 | 1.000 | 1.84666 | 43.33 | 0.56341 |
| 15 | 13.78912 | DD[15] | | | |
| 16 | 76.27115 | 1.000 | 1.89918 | 38.08 | 0.57527 |
| 17 | 51.26891 | 2.106 | | | |
| 18 | −43.86926 | 3.538 | 1.94595 | 17.98 | 0.65460 |
| 19 | −17.25213 | 0.970 | 1.89487 | 38.51 | 0.57420 |
| 20 | 70.52104 | 2.435 | | | |
| 21 | 35.69588 | 3.402 | 1.53434 | 50.28 | 0.56014 |
| 22 | −98.90462 | DD[22] | | | |

TABLE 10B

Example 4

| Sn | R | D | Nd | υd | θgF |
|---|---|---|---|---|---|
| 23 (St) | ∞ | 3.120 | | | |
| 24 | 34.90940 | 3.937 | 1.85451 | 25.15 | 0.61031 |
| 25 | 235.09387 | 14.151 | | | |
| 26 | −50.18512 | 1.275 | 1.70947 | 34.97 | 0.58927 |
| 27 | 21.13312 | 8.631 | 1.49700 | 81.54 | 0.53748 |
| 28 | −19.49552 | 0.120 | | | |
| 29 | −20.43050 | 1.091 | 1.74669 | 53.33 | 0.54630 |
| 30 | −37.40235 | DD[30] | | | |
| 31 | −221.65596 | 4.620 | 1.49700 | 81.54 | 0.53748 |
| 32 | −20.88063 | 2.000 | 1.81484 | 46.52 | 0.55757 |
| 33 | −142.37388 | 2.940 | | | |
| *34 | 44.48795 | 7.140 | 1.58313 | 59.38 | 0.54237 |
| *35 | −28.45684 | DD[35] | | | |
| 36 | −42.67766 | 3.380 | 1.61257 | 60.67 | 0.54297 |
| 37 | −22.84034 | 1.604 | 1.91799 | 25.00 | 0.61767 |
| 38 | −32.95059 | 2.000 | | | |
| 39 | ∞ | 33.000 | 1.60859 | 46.44 | 0.56664 |
| 40 | ∞ | 13.200 | 1.51633 | 64.05 | 0.53463 |
| 41 | ∞ | 8.632 | | | |

TABLE 11

Example 4

| | WIDE | TELE | TELE, β = −0.1 |
|---|---|---|---|
| Zr | 1.0 | 17.5 | 17.5 |
| f | 5.703 | 99.794 | 99.750 |
| FNo. | 1.98 | 3.64 | 3.64 |
| 2ω(°) | 92.0 | 6.2 | 6.6 |
| Ymax | 5.5 | 5.5 | 5.5 |
| DD[13] | 1.370 | 62.467 | 62.467 |
| DD[15] | 7.823 | 7.823 | 7.823 |
| DD[22] | 63.208 | 2.111 | 2.111 |
| DD[30] | 17.492 | 20.436 | 10.645 |
| DD[35] | 4.470 | 1.526 | 11.317 |

TABLE 12

Example 4

| Sn | 34 | 35 |
|---|---|---|
| KA | 2.1145907E+00 | 8.6814397E-01 |
| A3 | 2.8969408E-06 | 3.0905930E-06 |
| A4 | -7.0854107E-06 | 6.3295003E-06 |
| A5 | -3.3975655E-07 | -1.3658604E-07 |
| A6 | -1.0180059E-08 | -1.9461993E-08 |
| A7 | 3.3987752E-09 | 1.8531974E-09 |
| A8 | -1.1570367E-10 | 2.4802176E-11 |
| A9 | -2.0526664E-11 | -8.9226184E-12 |
| A10 | 1.3713999E-12 | -8.9558529E-13 |
| A11 | -6.0038870E-14 | 4.2039892E-14 |
| A12 | -5.1666735E-15 | -1.0081277E-15 |
| A13 | 6.8672852E-16 | 2.5112295E-16 |
| A14 | -1.0079409E-17 | 1.9390325E-17 |
| A15 | 8.0579895E-19 | -1.6141594E-18 |
| A16 | -2.8337829E-19 | -2.6340940E-19 |
| A17 | -1.1545652E-20 | 2.5753731E-21 |
| A18 | 3.4375915E-21 | -3.3853448E-22 |
| A19 | -6.1436034E-23 | 2.8048881E-22 |
| A20 | -6.7279946E-24 | -1.5330516E-23 |

Example 5

Figure 11:
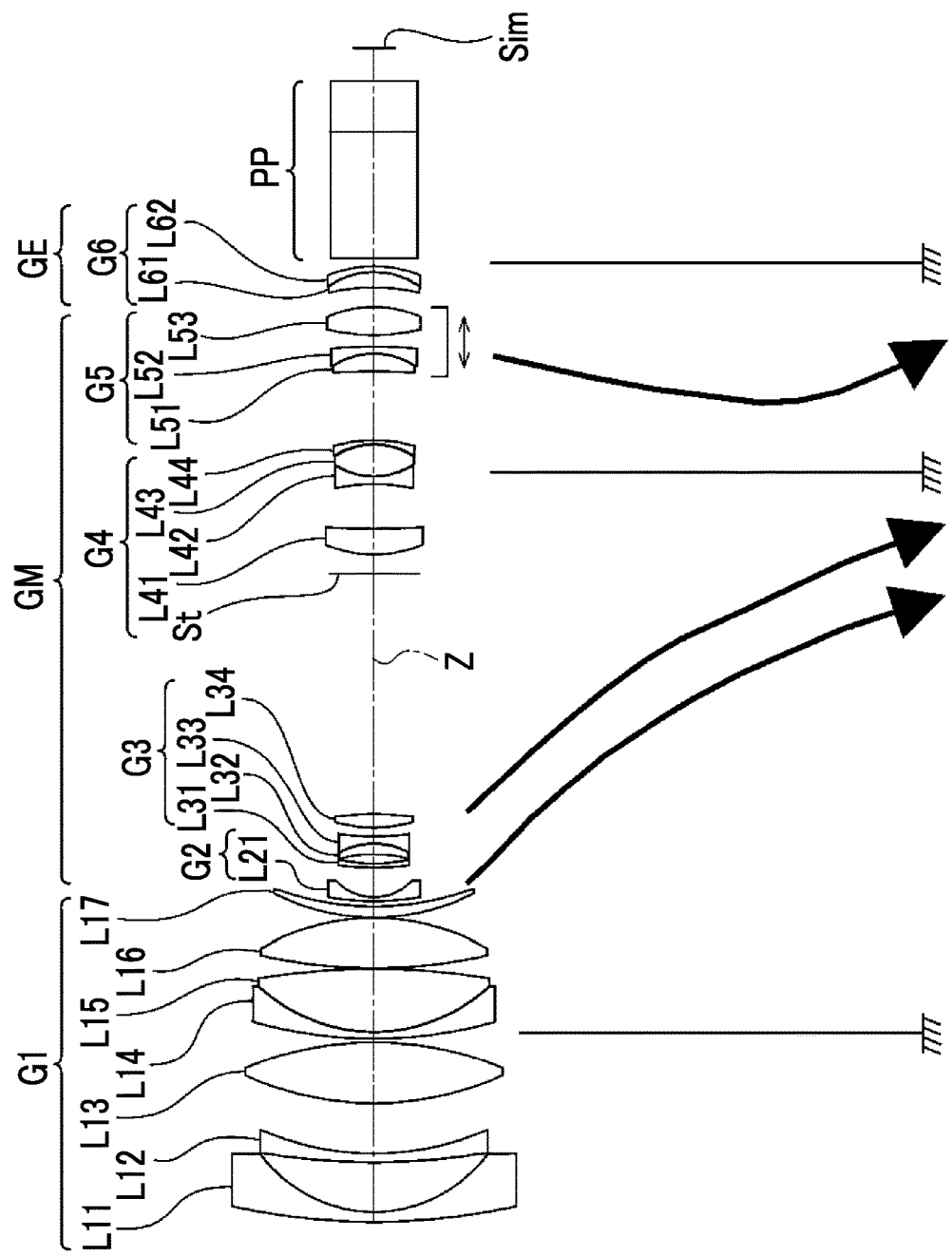
FIG. 11 is a cross-sectional view of a configuration of a zoom lens of Example 5 and a diagram illustrating movement loci thereof.

FIG. 11 shows a configuration and movement loci of the zoom lens of Example 5. The zoom lens of Example 5 consists of, in order from the object side to the image side, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and a sixth lens group G6 having a positive refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The middle group GM consists of a second lens group G2, a third lens group G3, a fourth lens group G4, and a fifth lens group G5. The final lens group GE consists of a sixth lens group G6. The focusing group consists of a fifth lens group G5.

The first lens group G1 consists of seven lenses L11 to L17 in order from the object side to the image side. The second lens group G2 consists of one lens L21. The third lens group G3 consists of four lenses L31 to L34 in order from the object side to the image side. The fourth lens group G4 consists of an aperture stop St and four lenses L41 to L44 in order from the object side to the image side. The fifth lens group G5 consists of three lenses L51 to L53 in order from the object side to the image side. The sixth lens group G6 consists of two lenses L61 and L62 in order from the object side to the image side.

Figure 12:
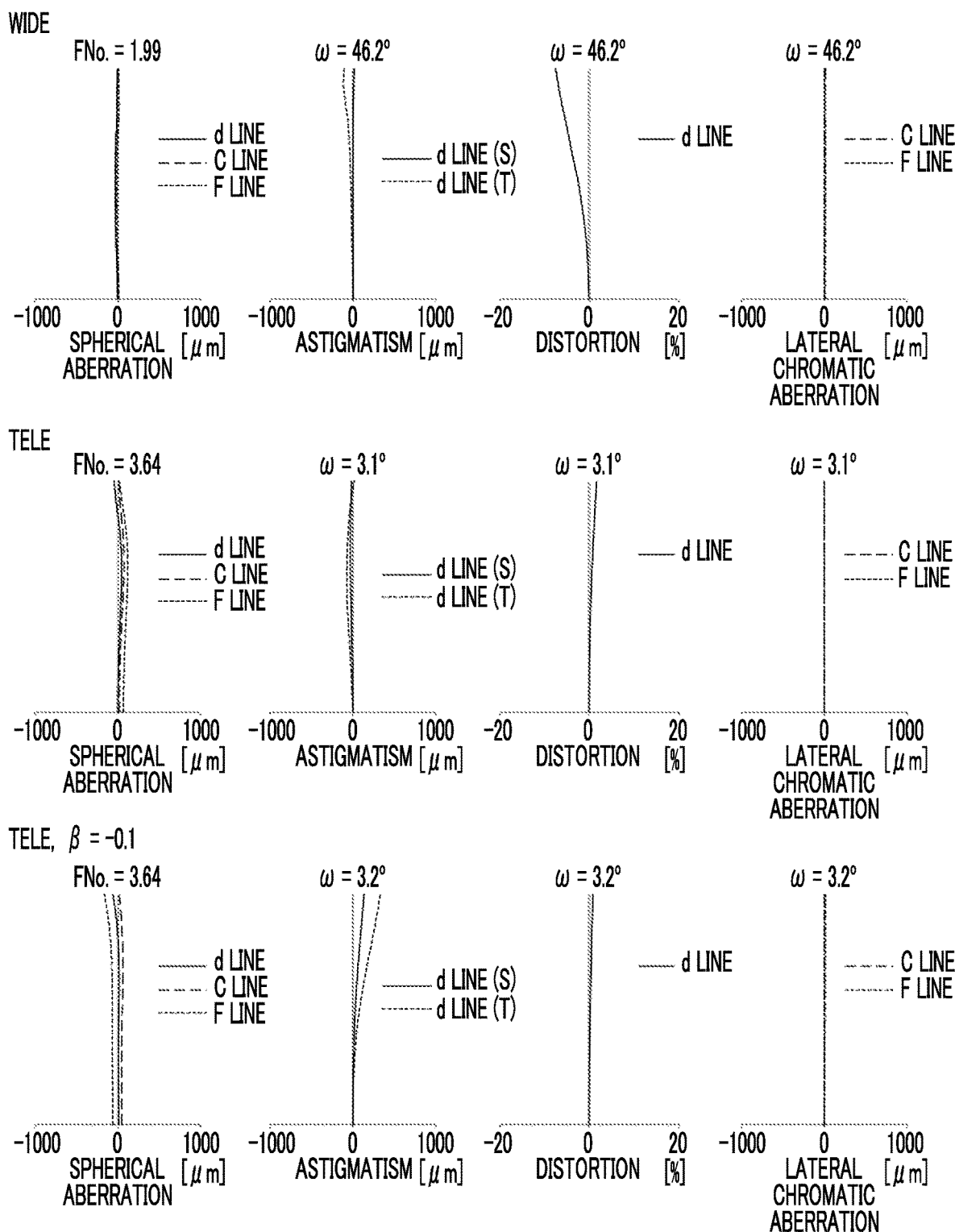
FIG. 12 is a diagram illustrating aberrations of the zoom lens of Example 5.

Regarding the zoom lens of Example 5, Table 13A and 13B show basic lens data, Table 14 shows specifications and variable surface spacings, and Table 15 shows aspherical coefficients thereof. FIG. 12 shows aberration diagrams. The object distance in a state where the lateral magnification of the zoom lens is -0.1 times is 0.7 m (meters). The table of basic lens data is divided into two tables in order to prevent one table from lengthening.

TABLE 13A

Example 5

| Sn | R | D | Nd | νd | θgF |
|---|---|---|---|---|---|
| 1 | 178.06304 | 2.600 | 1.81531 | 46.47 | 0.55766 |
| 2 | 38.33127 | 12.889 | | | |
| 3 | 190.27647 | 2.300 | 1.81416 | 46.58 | 0.55744 |
| 4 | 78.36652 | 13.037 | | | |
| 5 | 85.09215 | 15.982 | 1.51958 | 75.24 | 0.52275 |
| 6 | -90.25806 | 0.902 | | | |
| 7 | 121.04540 | 1.800 | 1.81373 | 46.63 | 0.55736 |
| 8 | 46.12381 | 16.389 | 1.43875 | 94.94 | 0.53433 |
| 9 | -188.68912 | 0.200 | | | |
| 10 | 146.03630 | 12.766 | 1.45413 | 91.43 | 0.53507 |
| 11 | -63.13576 | 0.120 | | | |
| 12 | 59.84676 | 2.873 | 1.68866 | 57.07 | 0.54316 |
| 13 | 79.03084 | DD[13] | | | |
| 14 | 71.96402 | 1.000 | 1.81568 | 46.43 | 0.55773 |
| 15 | 14.18958 | DD[15] | | | |
| 16 | 87.60076 | 1.000 | 1.90001 | 29.49 | 0.60069 |
| 17 | 47.52183 | 2.370 | | | |
| 18 | -35.87848 | 2.851 | 1.94595 | 17.98 | 0.65460 |
| 19 | -19.01129 | 1.756 | 1.79986 | 48.01 | 0.55470 |
| 20 | 66.17013 | 2.352 | | | |
| 21 | 37.91315 | 3.408 | 1.56677 | 42.48 | 0.57474 |
| 22 | -83.05240 | DD[22] | | | |

TABLE 13B

Example 5

| Sn | R | D | Nd | νd | θgF |
|---|---|---|---|---|---|
| 23 (St) | ∞ | 4.930 | | | |
| 24 | 33.71385 | 6.797 | 1.85451 | 25.15 | 0.61031 |
| 25 | 239.80635 | 11.670 | | | |
| 26 | -51.61248 | 2.000 | 1.73050 | 42.23 | 0.56983 |
| 27 | 19.99162 | 8.311 | 1.49700 | 81.54 | 0.53748 |
| 28 | -18.88672 | 0.122 | | | |
| 29 | -20.16419 | 1.000 | 1.79999 | 26.85 | 0.61163 |
| 30 | -39.77635 | DD[30] | | | |
| 31 | -295.41444 | 4.620 | 1.49700 | 81.54 | 0.53748 |
| 32 | -20.81231 | 1.883 | 1.78996 | 49.00 | 0.55280 |
| 33 | -126.63134 | 2.940 | | | |
| *34 | 49.01892 | 7.140 | 1.58313 | 59.38 | 0.54237 |
| *35 | -29.56697 | DD[35] | | | |
| 36 | -55.59908 | 4.036 | 1.59280 | 61.43 | 0.54243 |
| 37 | -21.63640 | 1.533 | 1.91800 | 30.95 | 0.59563 |
| 38 | -33.42065 | 2.000 | | | |
| 39 | ∞ | 33.000 | 1.60859 | 46.44 | 0.56664 |
| 40 | ∞ | 13.200 | 1.51633 | 64.05 | 0.53463 |
| 41 | ∞ | 8.588 | | | |

TABLE 14

Example 5

| | WIDE | TELE | TELE, β = -0.1 |
|---|---|---|---|
| Zr | 1.0 | 17.5 | 17.5 |
| f | 5.703 | 99.799 | 103.302 |
| FNo. | 1.99 | 3.64 | 3.64 |
| 2ω(°) | 92.4 | 6.2 | 6.4 |
| Ymax | 5.5 | 5.5 | 5.5 |
| DD[13] | 1.370 | 62.422 | 62.422 |
| DD[15] | 7.800 | 7.800 | 7.800 |
| DD[22] | 62.736 | 1.684 | 1.684 |
| DD[30] | 17.825 | 21.363 | 10.026 |
| DD[35] | 4.986 | 1.448 | 12.785 |

TABLE 15

Example 5

| | Sn | |
|---|---|---|
| | 34 | 35 |
| KA | 2.1145907E+00 | 8.6814397E−01 |
| A3 | 2.8969408E−06 | 3.0905930E−06 |
| A4 | −5.4058467E−06 | 5.2899622E−06 |
| A5 | −3.8758123E−07 | −1.0440889E−07 |
| A6 | −1.0576986E−08 | −2.7021128E−08 |
| A7 | 3.6632695E−09 | 2.0624664E−09 |
| A8 | −1.5439256E−10 | 2.1743261E−11 |
| A9 | −1.9583818E−11 | −7.9334754E−12 |
| A10 | 1.4492737E−12 | −9.2064268E−13 |
| A11 | −5.7369590E−14 | 4.4939933E−14 |
| A12 | −5.0097017E−15 | −1.2595989E−15 |
| A13 | 6.5715641E−16 | 2.1902274E−16 |
| A14 | −8.5429431E−18 | 1.9163365E−17 |
| A15 | 8.9395486E−19 | −1.5990920E−18 |
| A16 | −3.3057429E−19 | −2.6640015E−19 |
| A17 | −1.1399273E−20 | 3.0952884E−21 |
| A18 | 3.5090269E−21 | −2.7869147E−22 |
| A19 | −5.4560526E−23 | 2.8513073E−22 |
| A20 | −6.3040903E−24 | −1.5432742E−23 |

Example 6

Figure 13:
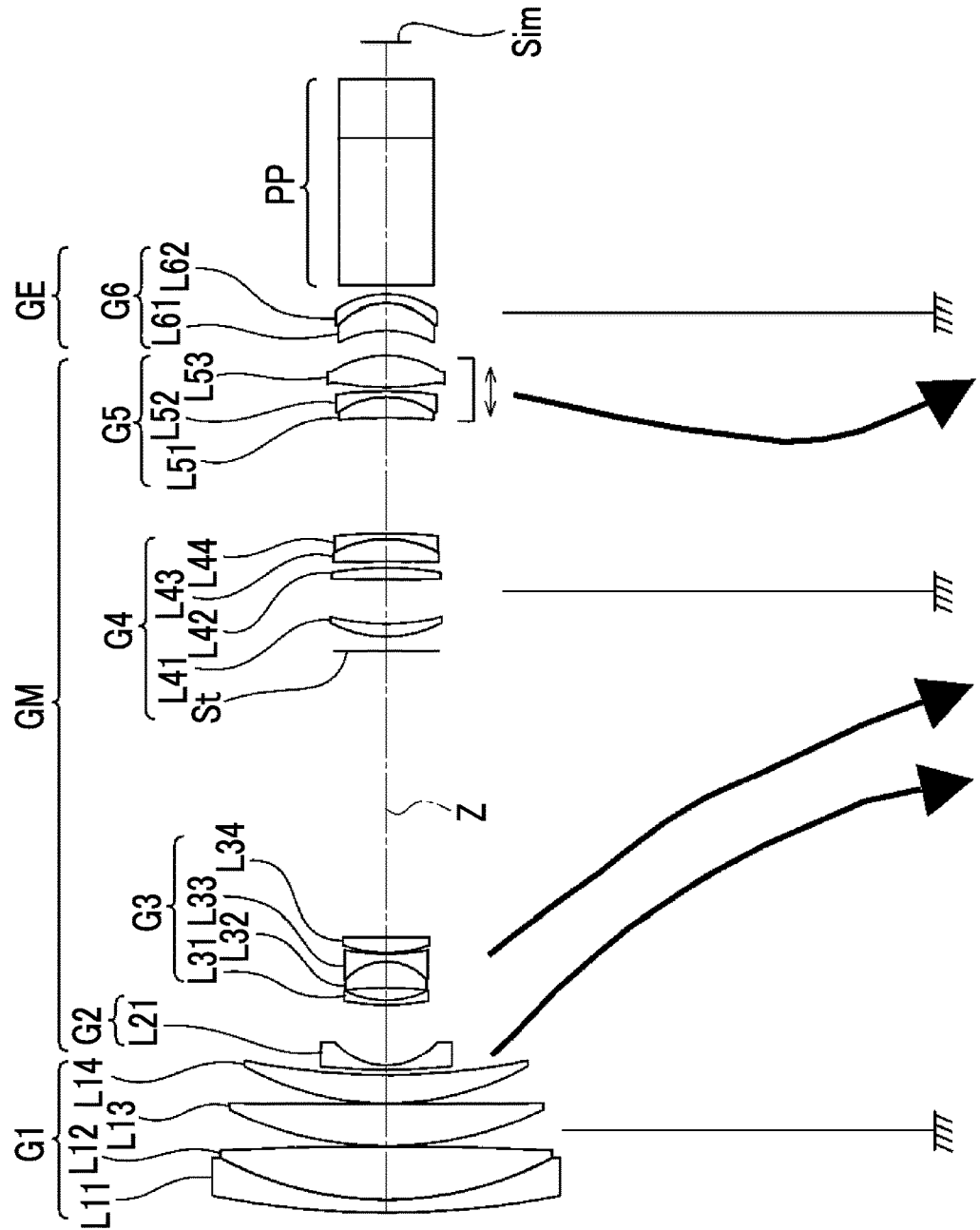
FIG. 13 is a cross-sectional view of a configuration of a zoom lens of Example 6 and a diagram illustrating movement loci thereof.

FIG. 13 shows a configuration and movement loci of the zoom lens of Example 6. The zoom lens of Example 6 consists of, in order from the object side to the image side, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and a sixth lens group G6 having a positive refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The middle group GM consists of a second lens group G2, a third lens group G3, a fourth lens group G4, and a fifth lens group G5. The final lens group GE consists of a sixth lens group G6. The focusing group consists of a fifth lens group G5.

The first lens group G1 consists of four lenses L11 to L14 in order from the object side to the image side. The second lens group G2 consists of one lens L21. The third lens group G3 consists of four lenses L31 to L34 in order from the object side to the image side. The fourth lens group G4 consists of an aperture stop St and four lenses L41 to L44 in order from the object side to the image side. The fifth lens group G5 consists of three lenses L51 to L53 in order from the object side to the image side. The sixth lens group G6 consists of two lenses L61 and L62 in order from the object side to the image side.

Figure 14:
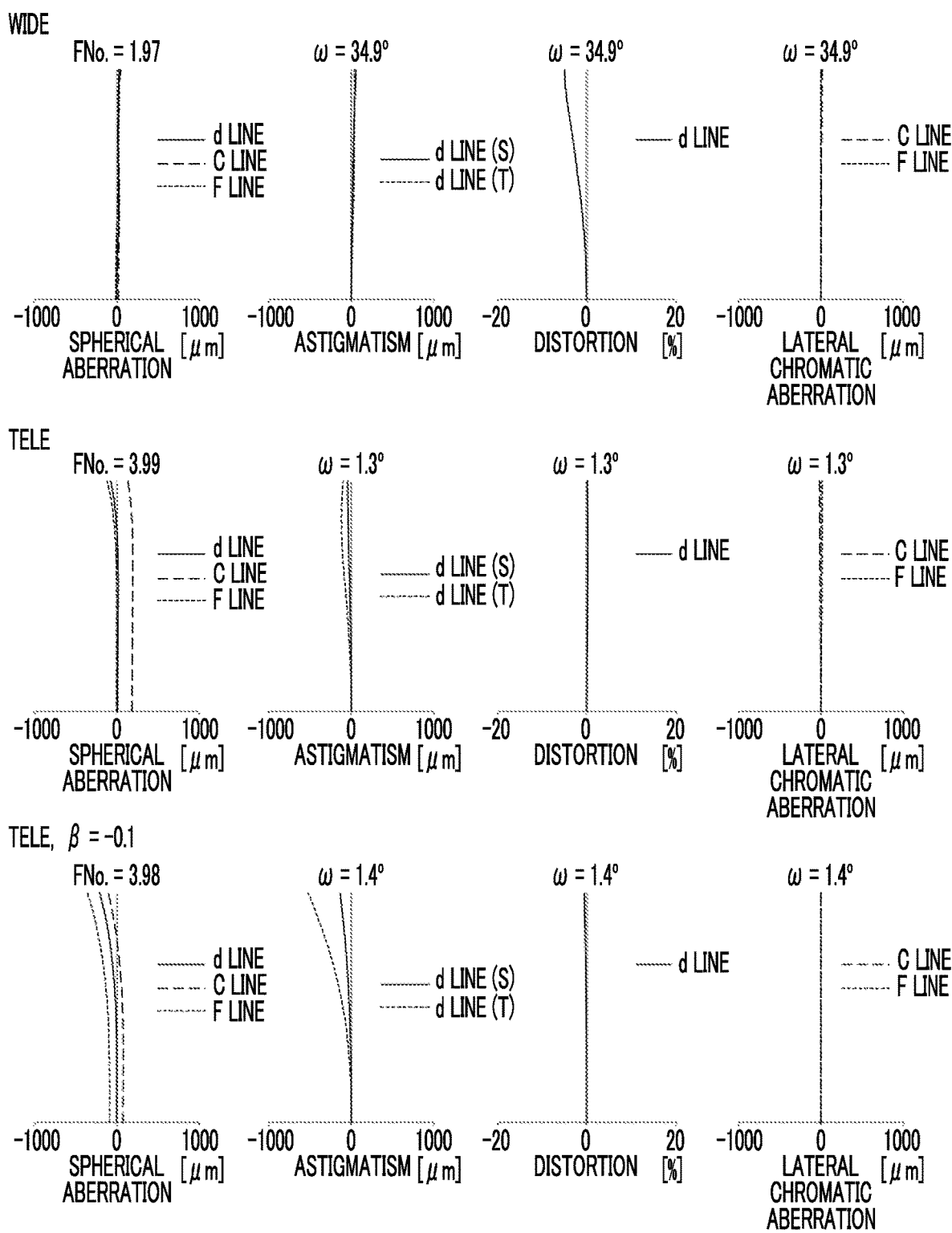
FIG. 14 is a diagram illustrating aberrations of the zoom lens of Example 6.

Regarding the zoom lens of Example 6, Table 16 shows basic lens data, Table 17 shows specifications and variable surface spacings, and Table 18 shows aspherical coefficients thereof. FIG. 14 shows aberration diagrams. The object distance in a state where the lateral magnification of the zoom lens is −0.1 times is 1.2 m (meters).

TABLE 16

Example 6

| Sn | R | D | Nd | vd | θgF |
|---|---|---|---|---|---|
| 1 | 218.03751 | 2.800 | 1.85883 | 30.00 | 0.59793 |
| 2 | 82.35139 | 0.100 | | | |
| 3 | 82.35139 | 11.899 | 1.43875 | 94.66 | 0.53402 |
| 4 | −810.40139 | 0.120 | | | |
| 5 | 85.05284 | 9.408 | 1.43875 | 94.66 | 0.53402 |
| 6 | 4067.81190 | 0.120 | | | |
| 7 | 68.60475 | 6.318 | 1.79755 | 48.25 | 0.55196 |
| 8 | 164.66272 | DD[8] | | | |
| 9 | 156.84084 | 1.000 | 1.90001 | 35.55 | 0.58238 |
| 10 | 15.96329 | DD[10] | | | |
| 11 | 54.79690 | 1.000 | 1.90001 | 25.76 | 0.61445 |
| 12 | 22.09459 | 2.802 | | | |
| 13 | −93.31855 | 5.860 | 1.94595 | 17.98 | 0.65460 |
| 14 | −12.99403 | 1.738 | 1.90001 | 24.81 | 0.61839 |
| 15 | 55.95227 | 0.300 | | | |
| 16 | 31.30356 | 3.423 | 1.80809 | 22.76 | 0.62868 |
| 17 | 15219.36934 | DD[17] | | | |
| 18(St) | ∞ | 3.192 | | | |
| 19 | 28.49299 | 2.854 | 1.51600 | 56.83 | 0.54856 |
| 20 | 53.61554 | 10.014 | | | |
| 21 | 600.06212 | 2.515 | 1.85000 | 22.50 | 0.62922 |
| 22 | −72.25099 | 1.502 | | | |
| 23 | −317.07708 | 4.924 | 1.49700 | 81.54 | 0.53748 |
| 24 | −25.27877 | 0.120 | | | |
| 25 | −25.10443 | 1.119 | 1.89672 | 38.33 | 0.57248 |
| 26 | −125.31384 | DD[26] | | | |
| 27 | −113.32813 | 4.620 | 1.49700 | 81.54 | 0.53748 |
| 28 | −19.28239 | 1.272 | 1.90001 | 35.89 | 0.58142 |
| 29 | −91.98459 | 0.831 | | | |
| *30 | 51.70764 | 7.140 | 1.58313 | 59.38 | 0.54237 |
| *31 | −23.54073 | DD[31] | | | |
| 32 | −24.34499 | 6.010 | 1.61397 | 54.31 | 0.54948 |
| 33 | −15.29387 | 2.000 | 1.91800 | 36.20 | 0.58005 |
| 34 | −21.33217 | 2.000 | | | |
| 35 | ∞ | 33.000 | 1.60859 | 46.44 | 0.56664 |
| 36 | ∞ | 13.200 | 1.51633 | 64.05 | 0.53463 |
| 37 | ∞ | 8.348 | | | |

TABLE 17

Example 6

| | WIDE | TELE | TELE, β = −0.1 |
|---|---|---|---|
| Zr | 1.0 | 28.9 | 28.9 |
| f | 8.297 | 239.779 | 231.260 |
| FNo. | 1.97 | 3.99 | 3.98 |
| 2ω(°) | 69.8 | 2.6 | 2.8 |
| Ymax | 5.5 | 5.5 | 5.5 |
| DD[8] | 1.200 | 63.222 | 63.222 |
| DD[10] | 13.630 | 12.039 | 12.039 |
| DD[17] | 64.014 | 3.582 | 3.582 |
| DD[26] | 26.087 | 30.033 | 9.553 |
| DD[31] | 5.546 | 1.600 | 22.080 |

TABLE 18

Example 6

| | Sn | |
|---|---|---|
| | 30 | 31 |
| KA | 2.1145907E+00 | 8.6814397E−01 |
| A3 | 2.8679714E−06 | 3.0905930E−06 |
| A4 | −9.9354539E−06 | 7.5334020E−06 |
| A5 | −2.9828074E−07 | −1.0562405E−07 |
| A6 | 1.6562631E−08 | −1.7834517E−08 |
| A7 | −3.0475176E−09 | −3.4343064E−10 |
| A8 | 3.1137152E−10 | 2.7523691E−10 |
| A9 | −5.2054796E−12 | −6.1290805E−12 |

TABLE 18-continued

Example 6

| | Sn | |
|---|---|---|
| | 30 | 31 |
| A10 | −1.0801801E−12 | −6.9780011E−13 |
| A11 | −9.1341561E−14 | −1.2389148E−13 |
| A12 | 6.4852724E−16 | 6.7999676E−16 |
| A13 | 3.8886727E−16 | 1.2882728E−16 |
| A14 | −5.7486312E−17 | −1.8964054E−17 |
| A15 | 2.9063359E−18 | 1.1764786E−18 |
| A16 | −3.1334846E−19 | 1.6094970E−19 |
| A17 | −3.1367935E−21 | 1.5306119E−20 |
| A18 | 5.4719620E−21 | −2.2293124E−21 |
| A19 | 1.8111697E−22 | 1.9846868E−22 |
| A20 | −4.0907977E−23 | −1.6260417E−23 |

Example 7

Figure 15:
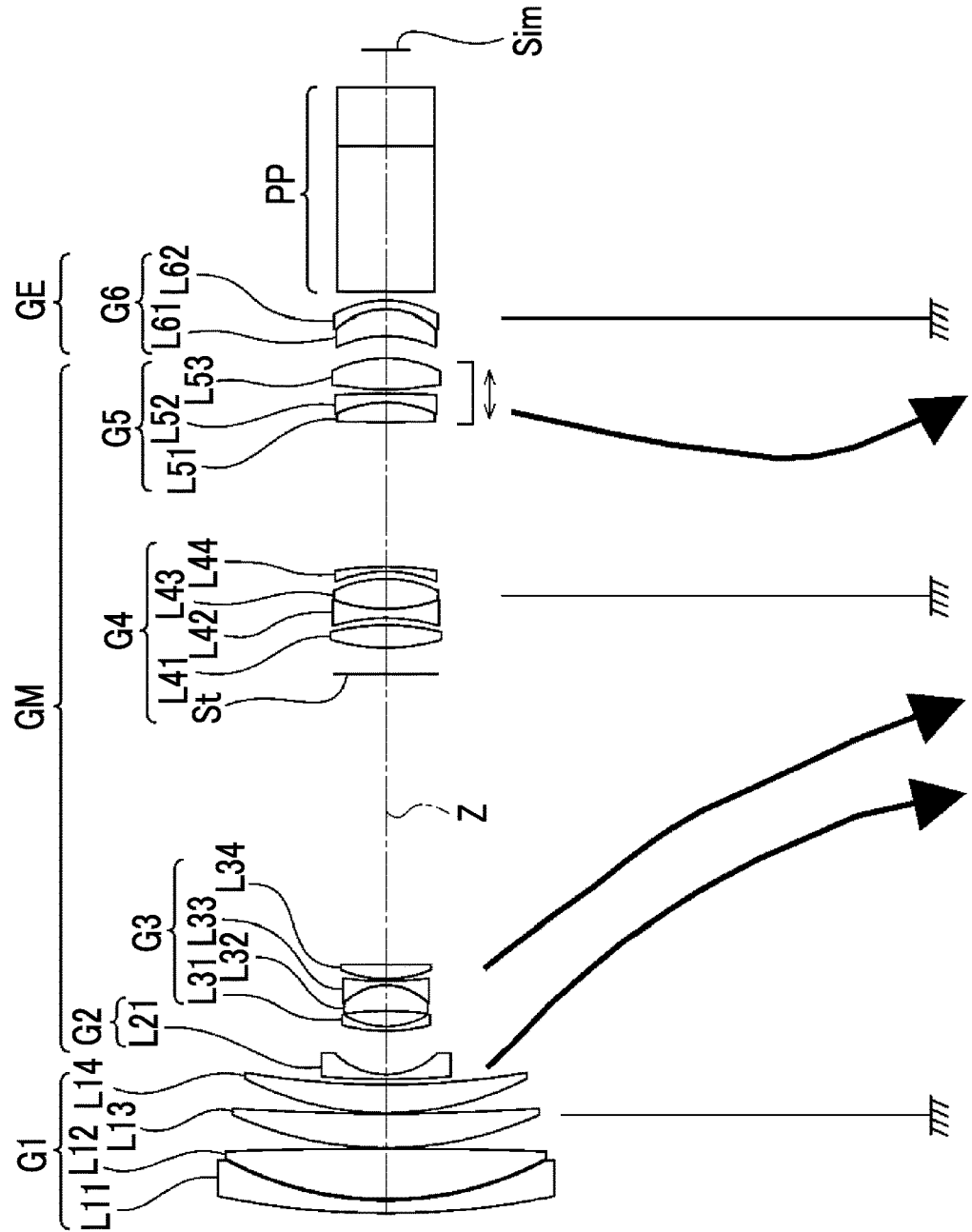
FIG. 15 is a cross-sectional view of a configuration of a zoom lens of Example 7 and a diagram illustrating movement loci thereof.

FIG. 15 shows a configuration and movement loci of the zoom lens of Example 7. The zoom lens of Example 7 consists of, in order from the object side to the image side, a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and a sixth lens group G6 having a positive refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The middle group GM consists of a second lens group G2, a third lens group G3, a fourth lens group G4, and a fifth lens group G5. The final lens group GE consists of a sixth lens group G6. The focusing group consists of a fifth lens group G5.

The first lens group G1 consists of four lenses L11 to L14 in order from the object side to the image side. The second lens group G2 consists of one lens L21. The third lens group G3 consists of four lenses L31 to L34 in order from the object side to the image side. The fourth lens group G4 consists of an aperture stop St and four lenses L41 to L44 in order from the object side to the image side. The fifth lens group G5 consists of three lenses L51 to L53 in order from the object side to the image side. The sixth lens group G6 consists of two lenses L61 and L62 in order from the object side to the image side.

Figure 16:
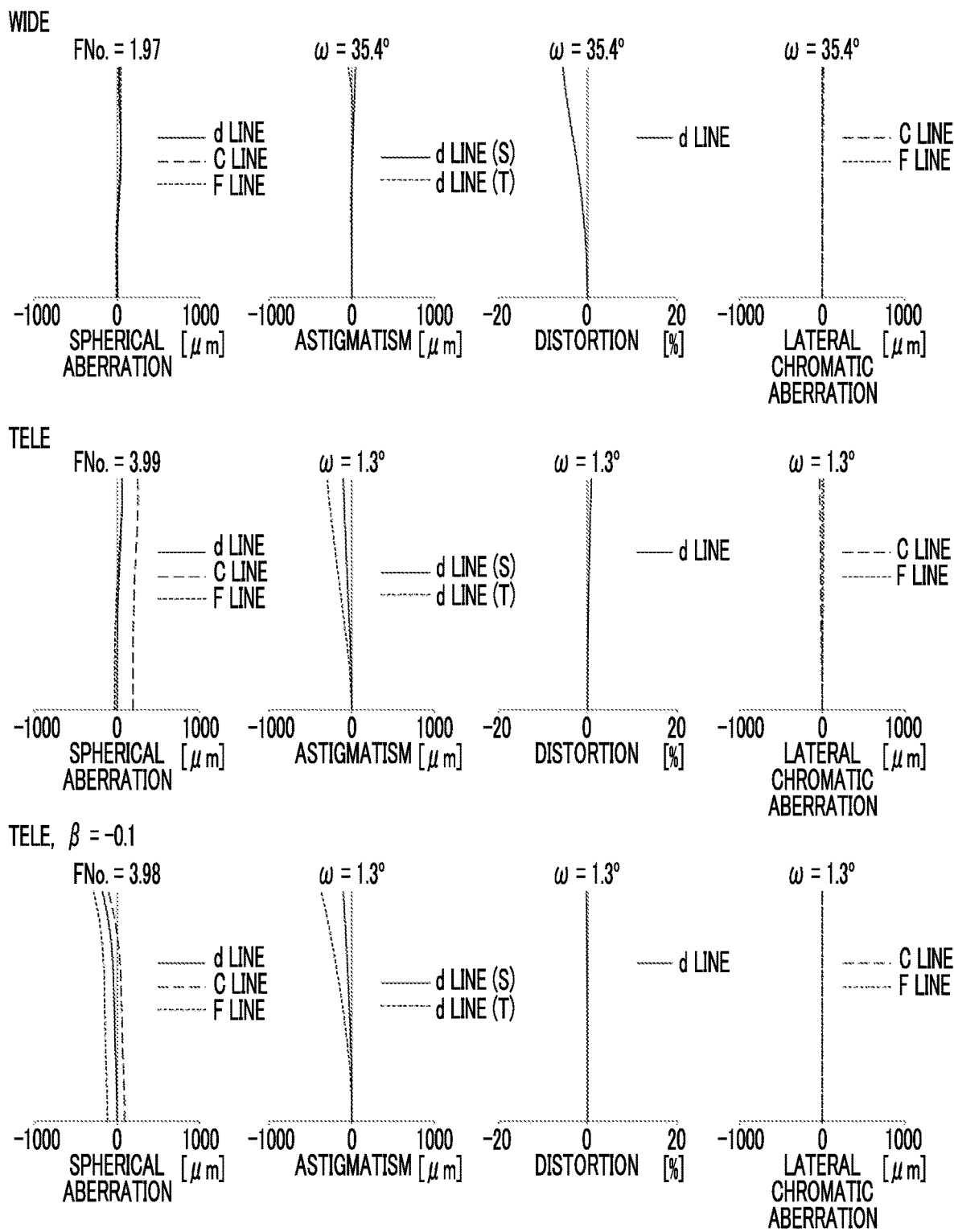
FIG. 16 is a diagram illustrating aberrations of the zoom lens of Example 7.

Regarding the zoom lens of Example 7, Table 19 shows basic lens data, Table 20 shows specifications and variable surface spacings, and Table 21 shows aspherical coefficients thereof. FIG. 16 shows aberration diagrams. The object distance in a state where the lateral magnification of the zoom lens is −0.1 times is 1.3 m (meters).

TABLE 19

Example 7

| Sn | R | D | Nd | vd | θgF |
|---|---|---|---|---|---|
| 1 | 201.81525 | 2.800 | 1.85883 | 30.00 | 0.59793 |
| 2 | 80.38342 | 0.404 | | | |
| 3 | 80.38342 | 11.388 | 1.43875 | 94.66 | 0.53402 |
| 4 | −998.59165 | 0.120 | | | |
| 5 | 88.43534 | 7.750 | 1.53398 | 77.38 | 0.54050 |

TABLE 19-continued

Example 7

| Sn | R | D | Nd | vd | θgF |
|---|---|---|---|---|---|
| 6 | 559.19601 | 0.120 | | | |
| 7 | 72.86754 | 6.435 | 1.75215 | 52.79 | 0.54709 |
| 8 | 202.75220 | DD[8] | | | |
| 9 | 209.50442 | 1.000 | 1.91401 | 35.50 | 0.58215 |
| 10 | 17.16774 | DD[10] | | | |
| 11 | 41.66685 | 1.000 | 1.89999 | 21.45 | 0.63517 |
| 12 | 19.40524 | 3.490 | | | |
| 13 | −79.77365 | 5.783 | 1.94595 | 17.98 | 0.65460 |
| 14 | −14.03268 | 1.023 | 1.89997 | 34.37 | 0.58578 |
| 15 | 87.42456 | 0.446 | | | |
| 16 | 28.61201 | 3.207 | 1.55925 | 48.52 | 0.56270 |
| 17 | 2121.51382 | DD[17] | | | |
| 18(St) | ∞ | 5.905 | | | |
| 19 | 47.29026 | 5.009 | 1.88075 | 21.63 | 0.63373 |
| 20 | −58.69602 | 1.685 | | | |
| 21 | −43.03722 | 2.000 | 1.80155 | 25.20 | 0.61694 |
| 22 | 36.19003 | 6.866 | 1.49700 | 81.54 | 0.53748 |
| 23 | −28.37946 | 1.611 | | | |
| 24 | −31.88883 | 1.011 | 1.79976 | 48.02 | 0.55232 |
| 25 | −85.66722 | DD[25] | | | |
| 26 | 304.68086 | 4.506 | 1.49700 | 81.54 | 0.53748 |
| 27 | −27.30314 | 1.987 | 1.89102 | 36.29 | 0.58053 |
| 28 | −201.98498 | 0.895 | | | |
| *29 | 55.50131 | 7.135 | 1.58313 | 59.38 | 0.54237 |
| *30 | −28.54981 | DD[30] | | | |
| 31 | −28.55498 | 5.909 | 1.61706 | 36.29 | 0.58795 |
| 32 | −17.93097 | 2.000 | 1.90944 | 26.36 | 0.61152 |
| 33 | −24.83134 | 2.000 | | | |
| 34 | ∞ | 33.000 | 1.60859 | 46.44 | 0.56664 |
| 35 | ∞ | 13.200 | 1.51633 | 64.05 | 0.53463 |
| 36 | ∞ | 8.429 | | | |

TABLE 20

Example 7

| | WIDE | TELE | TELE, β = −0.1 |
|---|---|---|---|
| Zr | 1.0 | 29.0 | 29.0 |
| f | 8.212 | 238.147 | 238.048 |
| FNo. | 1.97 | 3.99 | 3.98 |
| 2ω(°) | 70.8 | 2.6 | 2.6 |
| Ymax | 5.5 | 5.5 | 5.5 |
| DD[8] | 1.224 | 64.158 | 64.158 |
| DD[10] | 10.000 | 8.916 | 8.916 |
| DD[17] | 65.491 | 3.640 | 3.640 |
| DD[25] | 32.743 | 35.614 | 14.646 |
| DD[30] | 4.901 | 2.030 | 22.998 |

TABLE 21

Example 7

| | Sn | |
|---|---|---|
| | 29 | 30 |
| KA | 2.1145907E+00 | 8.6814397E−01 |
| A3 | 2.8679714E−06 | 3.0905930E−06 |
| A4 | −6.6468821E−06 | 4.6682570E−06 |
| A5 | −5.6203964E−07 | −3.2785454E−07 |
| A6 | 1.1694320E−08 | 8.5117117E−09 |
| A7 | 3.0733374E−10 | −1.3210949E−09 |
| A8 | 3.6873481E−11 | 6.0539607E−11 |
| A9 | −2.1274713E−11 | −1.0622385E−11 |
| A10 | 6.0673083E−13 | −3.9781130E−13 |
| A11 | −7.5210374E−14 | 4.7178548E−14 |
| A12 | 8.8812438E−16 | −1.7169717E−15 |
| A13 | 5.4876776E−16 | 1.0724061E−16 |
| A14 | −2.0502418E−17 | 9.2916351E−18 |
| A15 | 8.2884732E−19 | −1.0913078E−18 |

TABLE 21-continued

Example 7

| Sn | 29 | 30 |
|---|---|---|
| A16 | −3.2317164E−19 | −1.3982210E−19 |
| A17 | −9.9871289E−21 | −2.3364846E−21 |
| A18 | 2.5398564E−21 | −9.3493105E−22 |
| A19 | 3.1834326E−23 | 2.3354419E−22 |
| A20 | −9.8286706E−24 | −1.0233125E−23 |

Example 8

Figure 17:
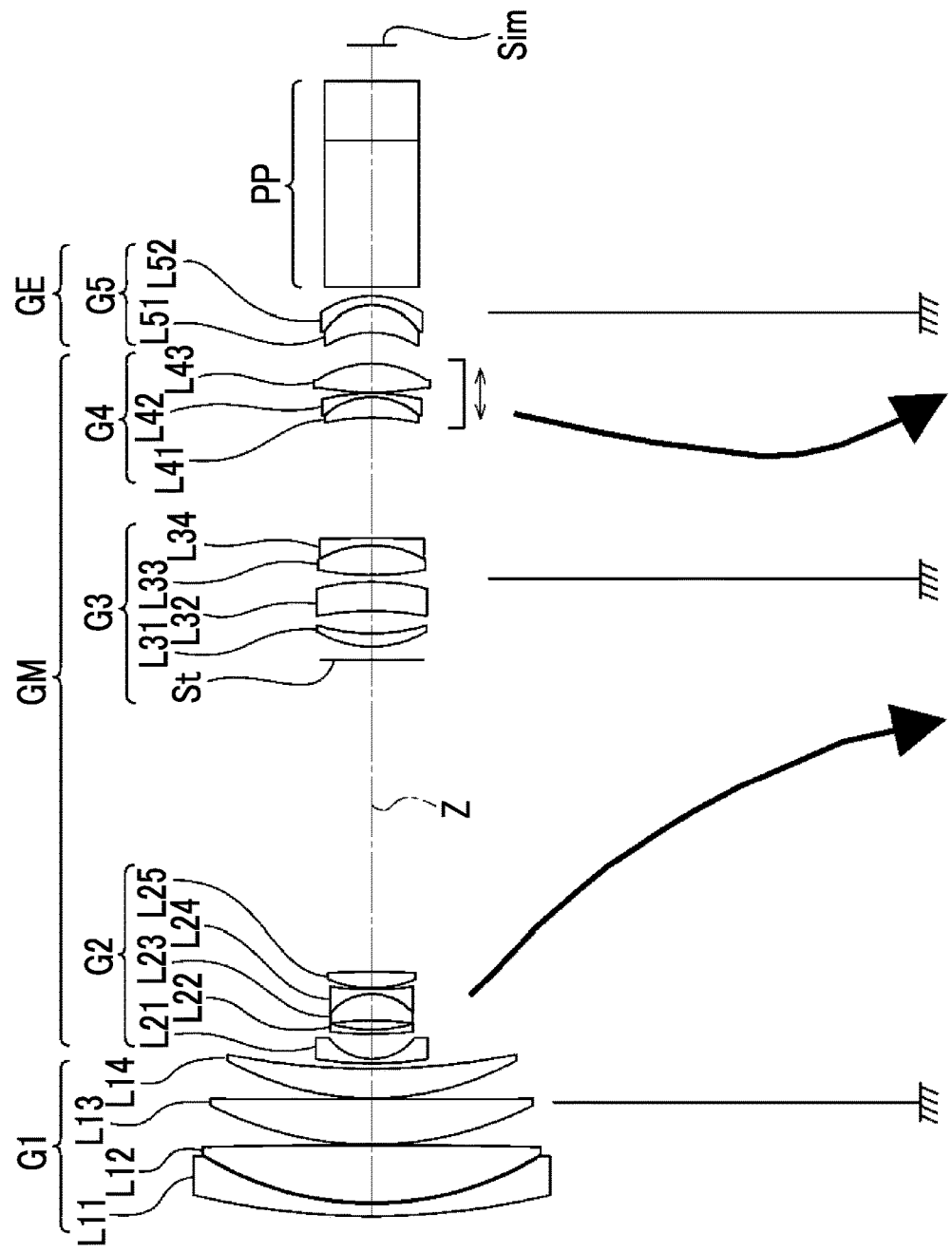
FIG. 17 is a cross-sectional view of a configuration of a zoom lens of Example 8 and a diagram illustrating movement loci thereof.

FIG. 17 shows a configuration and movement loci of the zoom lens of Example 8. Further, FIG. 18 shows a configuration and a luminous flux in each state of the zoom lens of Example 8. Since the illustration method of FIG. 18 is the same as that of FIG. 2, repeated description will not be given. The zoom lens shown in Example 8 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The middle group GM consists of a second lens group G2, a third lens group G3, and a fourth lens group G4. The final lens group GE consists of a fifth lens group G5. The focusing group consists of a fourth lens group G4.

The first lens group G1 consists of four lenses L11 to L14 in order from the object side to the image side. The second lens group G2 consists of five lenses L21 to L25 in order from the object side to the image side. The third lens group G3 consists of an aperture stop St and four lenses L31 to L34 in order from the object side to the image side. The fourth lens group G4 consists of three lenses L41 to L43 in order from the object side to the image side. The fifth lens group G5 consists of two lenses L51 and L52 in order from the object side to the image side.

Figure 19:
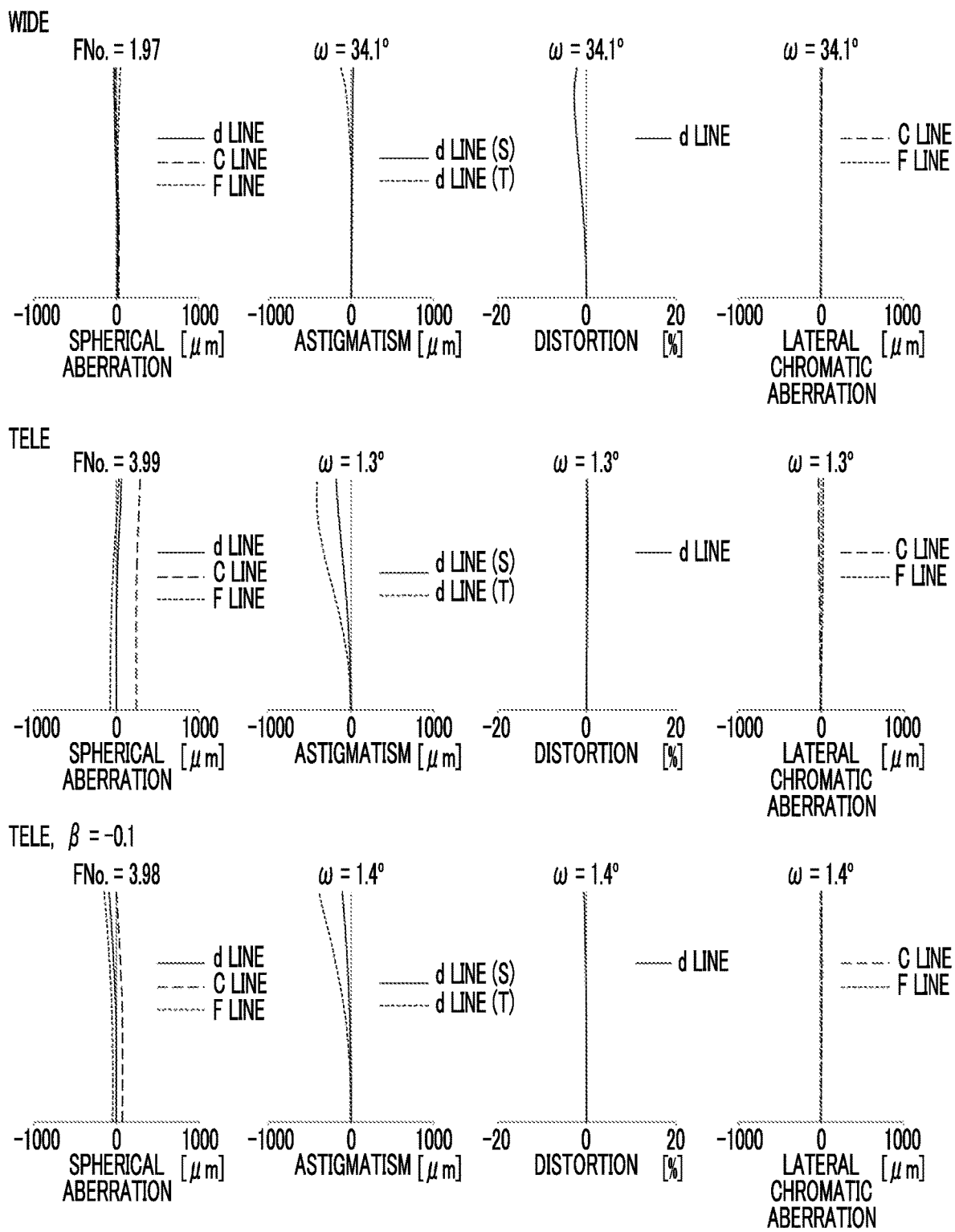
FIG. 19 is a diagram illustrating aberrations of the zoom lens of Example 8.

Regarding the zoom lens of Example 8, Table 22 shows basic lens data, Table 23 shows specifications and variable surface spacings, and Table 24 shows aspherical coefficients thereof. FIG. 19 shows aberration diagrams. The object distance in a state where the lateral magnification of the zoom lens is −0.1 times is 1.1 m (meters).

TABLE 22

Example 8

| Sn | R | D | Nd | vd | θgF |
|---|---|---|---|---|---|
| 1 | 180.52702 | 2.700 | 1.85883 | 30.00 | 0.59793 |
| 2 | 75.60409 | 0.347 | | | |
| 3 | 75.60409 | 12.886 | 1.43875 | 94.66 | 0.53402 |
| 4 | −1625.87395 | 0.120 | | | |
| 5 | 83.20667 | 10.234 | 1.43875 | 94.66 | 0.53402 |
| 6 | 17969.20412 | 0.120 | | | |
| 7 | 69.64537 | 6.645 | 1.78728 | 49.27 | 0.55034 |
| 8 | 173.67962 | DD[8] | | | |
| 9 | 86.03681 | 1.000 | 1.90043 | 37.37 | 0.57668 |
| 10 | 12.67966 | 5.735 | | | |
| 11 | 120.66104 | 1.000 | 1.90001 | 30.83 | 0.59650 |

TABLE 22-continued

Example 8

| Sn | R | D | Nd | vd | θgF |
|---|---|---|---|---|---|
| 12 | 36.72647 | 1.930 | | | |
| 13 | −83.85220 | 6.010 | 1.92001 | 21.55 | 0.63539 |
| 14 | −12.80262 | 1.010 | 1.90043 | 37.37 | 0.57668 |
| 15 | 77.38733 | 0.300 | | | |
| 16 | 27.11552 | 3.674 | 1.51635 | 53.18 | 0.55517 |
| 17 | −177.62287 | DD[17] | | | |
| 18(St) | ∞ | 3.000 | | | |
| 19 | 25.41443 | 2.952 | 1.51800 | 55.43 | 0.55103 |
| 20 | 45.76584 | 5.054 | | | |
| 21 | −69.48798 | 6.500 | 1.64003 | 35.04 | 0.59095 |
| 22 | −51.45286 | 1.500 | | | |
| 23 | 66.41325 | 6.689 | 1.56417 | 42.97 | 0.57131 |
| 24 | −25.16082 | 0.000 | | | |
| 25 | −25.23224 | 1.548 | 1.85105 | 42.89 | 0.56186 |
| 26 | −495.35003 | DD[26] | | | |
| 27 | −50.94483 | 4.620 | 1.49700 | 81.54 | 0.53748 |
| 28 | −16.36385 | 0.820 | 1.89301 | 36.75 | 0.57917 |
| 29 | −51.08547 | 0.120 | | | |
| *30 | 55.13028 | 6.563 | 1.58313 | 59.38 | 0.54237 |
| *31 | −22.06401 | DD[31] | | | |
| 32 | −20.47717 | 6.010 | 1.79521 | 48.23 | 0.55438 |
| 33 | −13.21835 | 1.975 | 1.91801 | 36.20 | 0.58006 |
| 34 | −20.86495 | 2.000 | | | |
| 35 | ∞ | 33.000 | 1.60859 | 46.44 | 0.56664 |
| 36 | ∞ | 13.200 | 1.51633 | 64.05 | 0.53463 |
| 37 | ∞ | 8.128 | | | |

TABLE 23

Example 8

| | WIDE | TELE | TELE, β = −0.1 |
|---|---|---|---|
| Zr | 1.0 | 28.9 | 28.9 |
| f | 8.299 | 239.829 | 228.846 |
| FNo. | 1.97 | 3.99 | 3.98 |
| 2ω(°) | 68.2 | 2.6 | 2.8 |
| Ymax | 5.5 | 5.5 | 5.5 |
| DD[8] | 1.200 | 62.527 | 62.527 |
| DD[17] | 69.730 | 8.403 | 8.403 |
| DD[26] | 27.187 | 32.392 | 12.737 |
| DD[31] | 6.905 | 1.700 | 21.355 |

TABLE 24

Example 8

| Sn | 30 | 31 |
|---|---|---|
| KA | 2.1145907E+00 | 8.6814397E−01 |
| A3 | 2.8679714E−06 | 3.0905930E−06 |
| A4 | −1.0014355E−05 | 8.8952142E−06 |
| A5 | −1.8606076E−07 | −8.1523859E−09 |
| A6 | 1.9750408E−08 | −1.8533851E−08 |
| A7 | −2.9672690E−09 | 9.5003652E−11 |
| A8 | 3.0776368E−10 | 3.0709727E−10 |
| A9 | −2.5281232E−12 | −5.4421958E−12 |
| A10 | −1.2322890E−12 | −6.8318477E−13 |
| A11 | −7.5667211E−14 | −1.2655837E−13 |
| A12 | 3.3601637E−15 | 6.4181553E−16 |
| A13 | 4.5335876E−16 | 7.4783260E−17 |
| A14 | −5.8180512E−17 | −1.1772316E−17 |
| A15 | 4.0154831E−18 | 2.0440751E−18 |
| A16 | −4.0160201E−19 | 1.5425702E−19 |
| A17 | −6.1673272E−21 | 2.1713445E−20 |
| A18 | 5.0595939E−21 | −2.1854787E−21 |
| A19 | 1.9022547E−22 | 1.8546186E−22 |
| A20 | −3.6468643E−23 | −1.8480360E−23 |

Example 9

Figure 20:
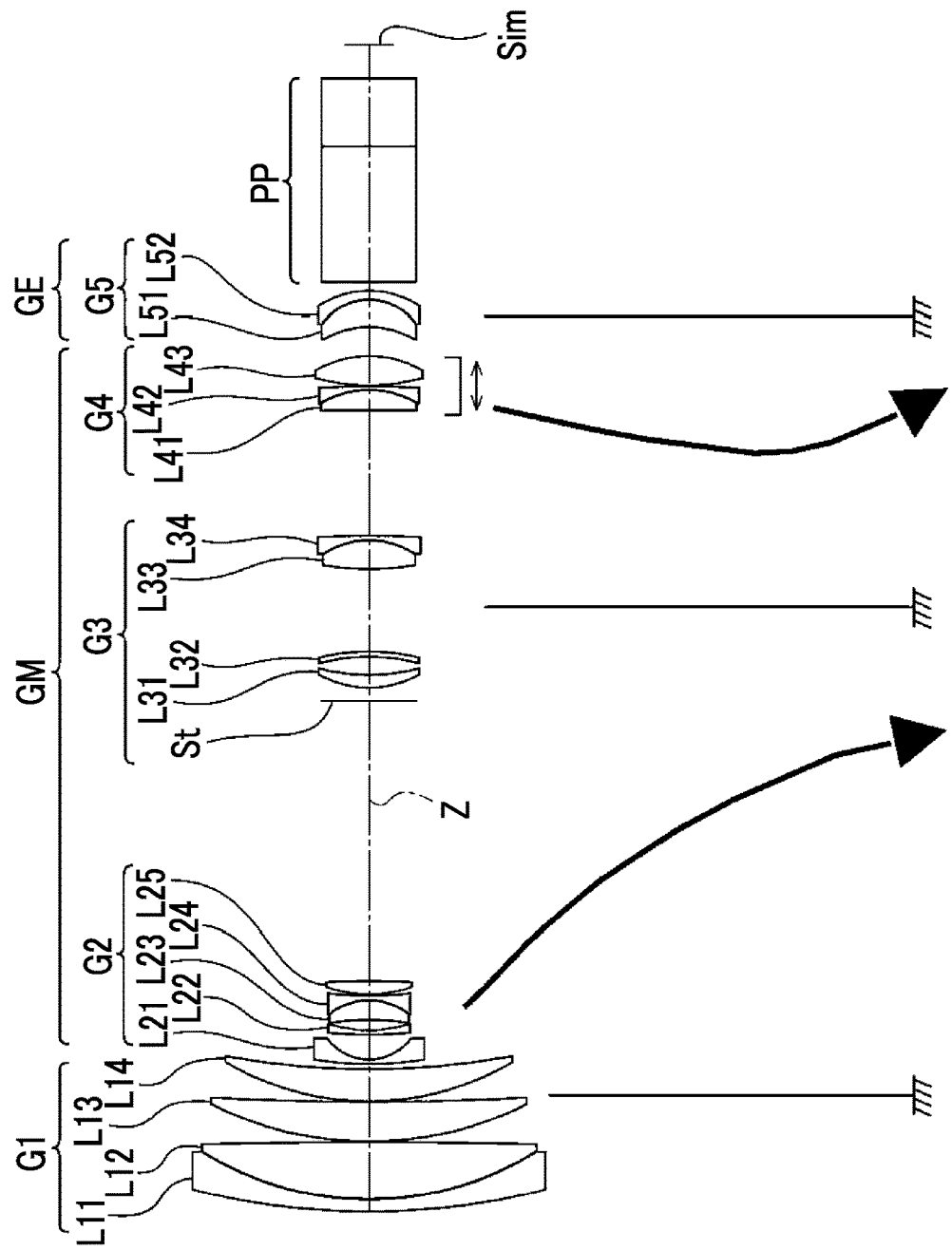
FIG. 20 is a cross-sectional view of a configuration of a zoom lens of Example 9 and a diagram illustrating movement loci thereof.

FIG. 20 shows a configuration and movement loci of the zoom lens of Example 9. The zoom lens shown in Example 9 consists of, in order from the object side to the image side, a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The middle group GM consists of a second lens group G2, a third lens group G3, and a fourth lens group G4. The final lens group GE consists of a fifth lens group G5. The focusing group consists of a fourth lens group G4.

The first lens group G1 consists of four lenses L11 to L14 in order from the object side to the image side. The second lens group G2 consists of five lenses L21 to L25 in order from the object side to the image side. The third lens group G3 consists of an aperture stop St and four lenses L31 to L34 in order from the object side to the image side. The fourth lens group G4 consists of three lenses L41 to L43 in order from the object side to the image side. The fifth lens group G5 consists of two lenses L51 and L52 in order from the object side to the image side.

Regarding the zoom lens of Example 9, Table 25 shows basic lens data, Table 26 shows specifications and variable surface spacings, and Table 27 shows aspherical coefficients thereof. FIG. 21 shows aberration diagrams. The object distance in a state where the lateral magnification of the zoom lens is −0.1 times is 1.1 m (meters).

TABLE 25

Example 9

| Sn | R | D | Nd | vd | θgF |
|---|---|---|---|---|---|
| 1 | 171.47932 | 2.700 | 1.85883 | 30.00 | 0.59793 |
| 2 | 74.98998 | 0.128 | | | |
| 3 | 74.98998 | 12.900 | 1.43875 | 94.66 | 0.53402 |
| 4 | −1573.94945 | 0.120 | | | |
| 5 | 83.57470 | 8.976 | 1.43875 | 94.66 | 0.53402 |
| 6 | 670.31321 | 0.120 | | | |
| 7 | 67.30085 | 7.223 | 1.76382 | 51.62 | 0.54695 |
| 8 | 184.80463 | DD[8] | | | |
| 9 | 82.03240 | 1.000 | 1.90043 | 37.37 | 0.57668 |
| 10 | 12.54236 | 5.609 | | | |
| 11 | 101.38070 | 1.000 | 1.90000 | 38.00 | 0.57547 |
| 12 | 31.61135 | 2.363 | | | |
| 13 | −62.63329 | 4.420 | 1.92001 | 21.55 | 0.63539 |
| 14 | −15.21172 | 1.010 | 1.90043 | 37.37 | 0.57668 |
| 15 | 97.28165 | 0.300 | | | |
| 16 | 30.64022 | 3.014 | 1.65002 | 36.11 | 0.58756 |
| 17 | −182.91450 | DD[17] | | | |
| 18(St) | ∞ | 3.000 | | | |
| 19 | 24.70003 | 2.879 | 1.58000 | 46.58 | 0.56587 |
| 20 | 47.11560 | 4.105 | | | |
| 21 | −44.20205 | 1.200 | 1.51600 | 64.38 | 0.53517 |
| 22 | −47.81037 | 18.631 | | | |
| 23 | 60.88251 | 6.548 | 1.58437 | 39.56 | 0.57745 |
| 24 | −20.01319 | 1.000 | 1.90001 | 38.00 | 0.57333 |
| 25 | −231.05045 | DD[25] | | | |
| 26 | −950.99885 | 4.620 | 1.49700 | 81.54 | 0.53748 |
| 27 | −22.23395 | 0.820 | 1.89391 | 38.61 | 0.57396 |
| 28 | −191.47152 | 0.120 | | | |
| *29 | 40.91838 | 6.875 | 1.58313 | 59.38 | 0.54237 |
| *30 | −23.51121 | DD[30] | | | |
| 31 | −21.97169 | 6.010 | 1.80001 | 44.99 | 0.56142 |

TABLE 25-continued

Example 9

| Sn | R | D | Nd | vd | θgF |
|---|---|---|---|---|---|
| 32 | −13.97396 | 2.000 | 1.91801 | 36.20 | 0.58006 |
| 33 | −22.23108 | 2.000 | | | |
| 34 | ∞ | 30.500 | 1.54814 | 45.78 | 0.56859 |
| 35 | ∞ | 15.550 | 1.51633 | 64.05 | 0.53463 |
| 36 | ∞ | 7.550 | | | |

TABLE 26

Example 9

| | WIDE | TELE | TELE, β = −0.1 |
|---|---|---|---|
| Zr | 1.0 | 28.9 | 28.9 |
| f | 8.296 | 239.746 | 246.424 |
| Bf | 7.549 | 7.549 | −17.093 |
| FNo. | 1.97 | 4.00 | 3.98 |
| 2ω(°) | 68.8 | 2.6 | 3.2 |
| Ymax | 5.5 | 5.5 | 5.5 |
| DD[8] | 1.200 | 62.369 | 62.369 |
| DD[17] | 63.022 | 1.853 | 1.853 |
| DD[25] | 28.269 | 32.719 | 12.433 |
| DD[30] | 6.436 | 1.986 | 22.272 |

TABLE 27

Example 9

| | Sn | |
|---|---|---|
| | 29 | 30 |
| KA | 2.1145907E+00 | 8.6814397E−01 |
| A3 | 2.8679714E−06 | 3.0905930E−06 |
| A4 | −1.0957880E−05 | 1.0953787E−05 |
| A5 | −3.5613063E−07 | −1.7256675E−07 |
| A6 | 1.5451303E−08 | −2.9712050E−08 |
| A7 | −1.3602114E−09 | 9.4957359E−10 |
| A8 | 2.2619701E−10 | 3.9493946E−10 |
| A9 | −3.3814537E−12 | −8.6662136E−12 |
| A10 | −9.6751377E−13 | −7.2103910E−13 |
| A11 | −7.1121196E−14 | −1.3787605E−13 |
| A12 | 3.1402888E−15 | 4.4294181E−16 |
| A13 | 2.7900935E−16 | −7.1682146E−17 |
| A14 | −4.5998577E−17 | 1.6861877E−18 |
| A15 | 3.8812183E−18 | 2.0815345E−18 |
| A16 | −4.7477895E−19 | 1.2507395E−19 |
| A17 | −5.0396738E−21 | 2.0018291E−20 |
| A18 | 4.6986660E−21 | −2.1284843E−21 |
| A19 | 2.3874212E−22 | 1.8869983E−22 |
| A20 | −3.6998650E−23 | −1.8212769E−23 |

Tables 28 and 29 show corresponding values of Conditional Expressions (1) to (16) of the zoom lenses of Examples 1 to 9.

TABLE 28

| Expression Number | | Example 1 | Example 2 | Example 3 | Example 4 | Example 5 |
|---|---|---|---|---|---|---|
| (1) | DF/ft | 0.051 | 0.063 | 0.066 | 0.098 | 0.114 |
| (2) | DV/fw | 8.728 | 8.047 | 5.409 | 10.713 | 10.706 |
| (3) | $(1-\beta F^2) \times \beta Rt^2$ | 1.925 | 1.589 | 1.605 | 1.007 | 0.885 |
| (4) | βMnw | −0.206 | −0.237 | −0.287 | −0.252 | −0.253 |
| (5) | βMnt | −7.766 | −9.304 | −3.376 | −4.921 | −5.053 |
| (6) | |fMn1/fE| | 0.062 | 0.053 | 0.060 | 0.027 | 0.059 |
| (7) | |fF/fE| | 0.186 | 0.155 | 0.144 | 0.052 | 0.114 |
| (8) | TTL/ft | 0.853 | 0.950 | 1.533 | 2.890 | 2.887 |
| (9) | DV/{Ymax × log(ft/fw)} | 8.123 | 8.177 | 8.015 | 8.939 | 8.930 |
| (10) | |DF/fF| | 0.402 | 0.429 | 0.257 | 0.233 | 0.266 |
| (11) | fMVw/f1 | −0.089 | −0.117 | −0.103 | −0.339 | −0.330 |
| (12) | βMVt | −4.364 | −6.446 | −1.514 | −4.921 | −5.053 |
| (13) | βE | 1.390 | 1.261 | 1.294 | 1.005 | 0.941 |
| (14) | 1/βMS | −0.196 | 0.053 | 0.497 | −0.127 | 0.048 |
| (15) | {βFw/(fF × γ) − 1/(βRw × fRw) − (1/De)} × Ymax | 0.027 | 0.007 | 0.013 | 0.039 | 0.026 |
| (16) | Nd1n | 1.994 | 1.859 | 1.922 | 1.900 | 1.815 |

TABLE 29

| Expression Number | | Example 6 | Example 7 | Example 8 | Example 9 |
|---|---|---|---|---|---|
| (1) | DF/ft | 0.086 | 0.088 | 0.082 | 0.085 |
| (2) | DV/fw | 7.474 | 7.662 | 7.387 | 7.374 |
| (3) | $(1 - \beta Ft^2) \times \beta Rt^2$ | 1.075 | 1.091 | 1.099 | 1.151 |
| (4) | βMnw | −0.197 | −0.193 | −0.280 | −0.272 |
| (5) | βMnt | −6.622 | −6.239 | −10.239 | −9.413 |
| (6) | |fMn1/fE| | 0.044 | 0.037 | 0.034 | 0.031 |
| (7) | |fF/fE| | 0.098 | 0.079 | 0.114 | 0.093 |
| (8) | TTL/ft | 1.026 | 1.035 | 1.028 | 1.031 |
| (9) | DV/{Ymax × log(ft/fw)} | 7.726 | 7.832 | 7.641 | 7.613 |
| (10) | DF/fF| | 0.462 | 0.481 | 0.451 | 0.522 |
| (11) | fMVw/f1 | −0.143 | −0.141 | −0.151 | −0.150 |
| (12) | βMVt | −6.622 | −6.239 | −10.089 | −9.413 |
| (13) | βE | 1.055 | 1.048 | 1.074 | 1.074 |
| (14) | 1/βMS | −0.480 | −0.205 | −0.675 | −0.140 |
| (15) | {βFw/(fF × γ) −1/(βRw × fRw) − (1/De)} × Ymax | 0.045 | 0.043 | 0.047 | 0.080 |
| (16) | Nd1n | 1.859 | 1.859 | 1.859 | 1.859 |

The zoom lenses of Examples 1 to 9 have a maximum zoom magnification of 10 times or more, and more specifically, 13 times or more, thereby achieving an increase in magnification. The zoom lenses of Examples 1 to 9 are configured to have a small size while achieving an increase in magnification, and various aberrations are satisfactorily corrected to realize high optical performance.

Figure 22:
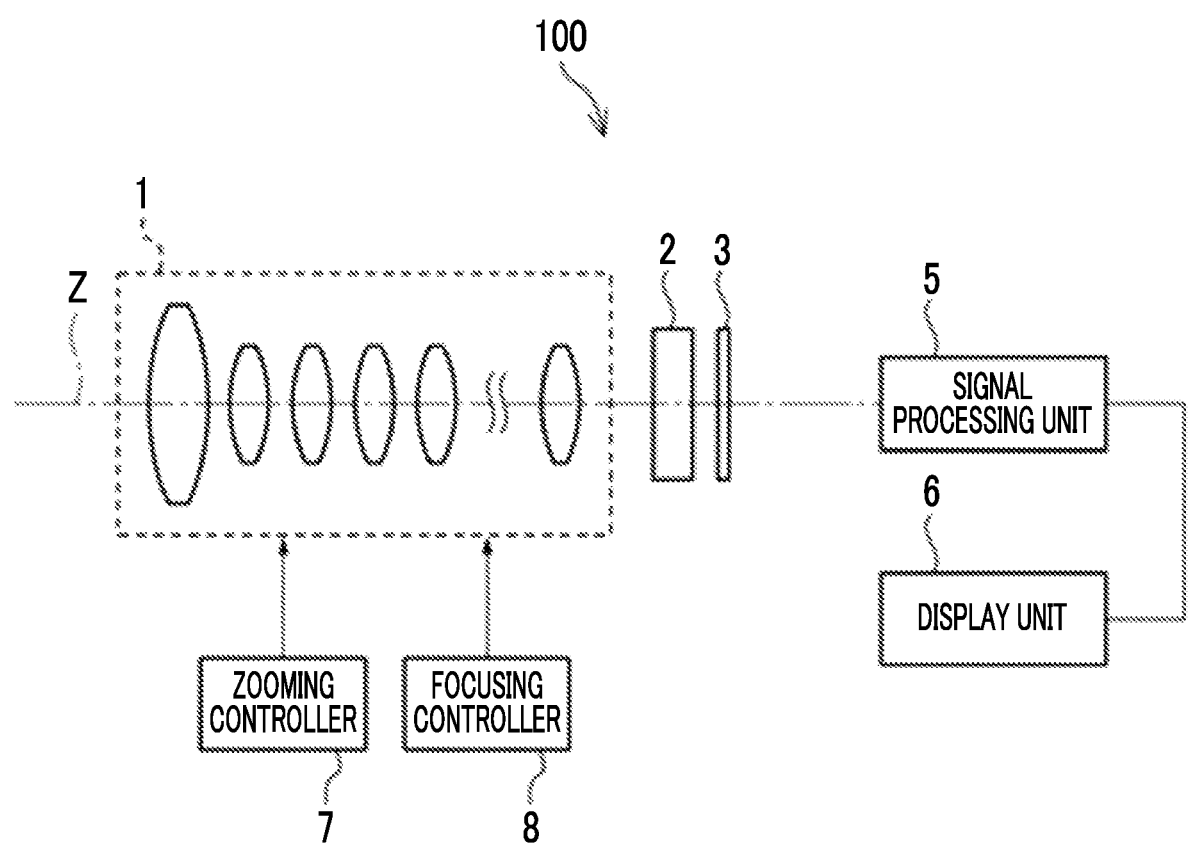
FIG. 22 is a diagram illustrating a schematic configuration of an imaging apparatus according to an embodiment.

Next, an imaging apparatus according to an embodiment of the present disclosure will be described. FIG. 22 shows a schematic configuration diagram of an imaging apparatus 100 using the zoom lens 1 according to the embodiment of the present disclosure as an example of the imaging apparatus according to the embodiment of the present disclosure. Examples of the imaging apparatus 100 include a broadcast camera, a movie camera, a digital camera, a video camera, a surveillance camera, and the like.

The imaging apparatus 100 includes a zoom lens 1, a filter 2 disposed on the image side of the zoom lens 1, and an imaging element 3 disposed on the image side of the filter 2. It should be noted that FIG. 22 schematically shows a plurality of lenses included in the zoom lens 1.

The imaging element 3 converts an optical image formed by the zoom lens 1 into an electric signal. As the imaging element 3, for example, a charge coupled device (CCD) or a complementary metal oxide semiconductor (CMOS) or the like can be used. The imaging element 3 is disposed such that the imaging surface thereof coincides with the image plane of the zoom lens 1.

The imaging apparatus 100 also comprises a signal processing unit 5 that calculates and processes an output signal from the imaging element 3, a display unit 6 that displays an image formed by the signal processing unit 5, a zooming controller 7 that controls zooming of the zoom lens 1, and a focusing controller 8 that controls focusing of the zoom lens 1. Although FIG. 22 shows only one imaging element 3, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the numerical examples, and different values may be used therefor.

What is claimed is:

1. A zoom lens consisting of, in order from an object side to an image side: a first lens group that has a positive refractive power; a middle group that consists of three or four lens groups in which a spacing between adjacent lens groups changes during zooming; and a final lens group,
   wherein a spacing between the first lens group and the middle group changes, and a spacing between the middle group and the final lens group changes during zooming,
   wherein a focusing group that moves during focusing is disposed in the middle group, and
   a difference in an optical axis direction between a position of the focusing group in a state in which an infinite distance object is in focus at a telephoto end and a position of the focusing group in a state in which a lateral magnification of the zoom lens at the telephoto end is-0.1 times is DF,
   a focal length of the zoom lens in a state in which the infinite distance object is in focus at the telephoto end is ft, Conditional Expression (1) is satisfied, which is represented by $$0.04 < DF/ft < 0.4 \quad (1),$$

a difference in the optical axis direction between a position of each lens group in the middle group in a state in which the infinite distance object is in focus at a wide angle end and a position thereof in a state in which the infinite distance object is in focus at the telephoto end is set as an amount of zooming movement,
the amount of zooming movement of a lens group, of which the amount of zooming movement is maximum, among the lens groups in the middle group is DV,
a focal length of the zoom lens in a state in which the infinite distance object is in focus at the wide angle end is fw,
Conditional Expression (2a) is satisfied, which is represented by $$5.409 \le DV/fw < 18 \quad (2a),$$

a lateral magnification of the focusing group in a state in which the infinite distance object is in focus at the telephoto end is βFt,
a combined lateral magnification of all lenses closer to the image side than the focusing group in a state in which the infinite distance object is in focus at the telephoto end is βRt,
Conditional Expression (3a) is satisfied, which is represented by $$1.075 \le (1-\beta Ft^2) \times \beta Rt^2 < 5 \quad (3a),$$

a focal length of the focusing group is fF,
a focal length of the final lens group is fE, and
Conditional Expression (7) is satisfied, which is represented by $$0.04 < |fF/fE| < 0.4 \quad (7).$$

2. The zoom lens according to claim 1,
wherein the middle group includes one or more negative movable lens groups among the three or four lens groups, which is a lens group that has a negative refractive power and moves during zooming, and
in a case where a plurality of the negative movable lens groups are disposed consecutively in the middle group:
a combined lateral magnification of the plurality of the negative movable lens groups disposed consecutively in a state in which the infinite distance object is in focus at a wide angle end is βMnw, and
a combined lateral magnification of the plurality of negative movable lens groups disposed consecutively in a state in which the infinite distance object is in focus at the telephoto end is βMnt,
in a case where the plurality of negative movable lens groups are not disposed consecutively in the middle group:
a lateral magnification of any one of the negative movable lens groups in a state in which the infinite distance object is in focus at the wide angle end is βMnw, and
a lateral magnification of any one of the negative movable lens groups in a state in which the infinite distance object is in focus at the telephoto end is βMnt, and
Conditional Expressions (4) and (5) are satisfied, which are represented by $$-0.5 < \beta Mnw < -0.05 \quad (4), \text{ and}$$

$$-24 < \beta Mnt < -2 \quad (5).$$

3. The zoom lens according to claim 1, wherein
a sum of a back focal length of the zoom lens at an air conversion distance and a distance on an optical axis from a lens surface closest to the object side in the first lens group to a lens surface closest to the image side in the final lens group in a state in which the infinite distance object is in focus at the telephoto end is TTL, and
Conditional Expression (8-2) is satisfied, which is represented by $$0.5 < TTL/ft < 1.2 \quad (8-2).$$

4. The zoom lens according to claim 1, wherein the first lens group remains stationary with respect to an image plane during zooming.

5. The zoom lens according to claim 1, wherein the first lens group includes at least two positive lenses.

6. The zoom lens according to claim 1, wherein
a maximum image height is Ymax, and
Conditional Expression (9-2) is satisfied, which is represented by $$6 < DV/\{Y\max \times \log(ft/fw)\} < 10 \quad (9-2).$$

7. The zoom lens according to claim 1, wherein Conditional Expression (10) is satisfied, which is represented by $$0.1 < |DF/fF| < 1 \quad (10).$$

8. The zoom lens according to claim 1, wherein the focusing group is disposed closest to the image side in the middle group.

9. The zoom lens according to claim 1, wherein a lens group that moves during zooming is set as a movable lens group, and a movable lens group closest to the object side among movable lens groups in the middle group is set as a leading movable lens group,
a combined focal length of a movable lens group line in a state in which the infinite distance object is in focus at a wide angle end is fMVw, in a case where the middle group includes the movable lens group line, the movable lens group line being a plurality of movable lens groups that include the leading movable lens group and are disposed consecutively,
a focal length of the leading movable lens group is fMVw, in a case where the middle group does not include the movable lens group line,
a focal length of the first lens group is f1, and
Conditional Expression (11) is satisfied, which is represented by $$-0.4 < fMVw/f1 < -0.03 \quad (11).$$

10. The zoom lens according to claim 1, wherein a lens group that moves during zooming is set as a movable lens group, and a movable lens group closest to the object side among movable lens groups in the middle group is set as a leading movable lens group,
a combined lateral magnification of a movable lens group line in a state in which the infinite distance object is in focus at the telephoto end is βMVt, in a case where the middle group includes the movable lens group line, the movable lens group line being a plurality of movable lens groups that include the leading movable lens group and are disposed consecutively, and
a lateral magnification of the leading movable lens group in a state in which the infinite distance object is in focus at the telephoto end is βMVt, in a case where the middle group does not include the movable lens group line, Conditional Expression (12) is satisfied, which is represented by $$-20<\beta MVt<-1.1 \tag{12}$$

11. The zoom lens according to claim 1,
wherein the middle group includes one stationary lens group which is a lens group remaining stationary with respect to an image plane during zooming,
a lateral magnification of the final lens group in a state in which the infinite distance object is in focus at the telephoto end is BE, and
a lateral magnification of the stationary lens group closest to the image side among the stationary lens groups in the middle group in a state in which the infinite distance object is in focus at the telephoto end is BMS,
Conditional Expressions (13) and (14) are satisfied, which are represented by $$1<\beta E<2 \tag{13, and}$$

$$-1.8<1/\beta MS<1.4 \tag{14}$$

12. The zoom lens according to claim 1, wherein
a lateral magnification of the focusing group in a state in which the infinite distance object is in focus at a wide angle end is βFw,
a combined lateral magnification of all lenses closer to the image side than the focusing group in a state in which the infinite distance object is in focus at the wide angle end is βRw, $$\gamma=(1-\beta Fw^2)\times\beta Rw^2,$$

a combined focal length of all lenses closer to the image side than the focusing group in a state in which the infinite distance object is in focus at the wide angle end is fRw,
a distance from an exit pupil position to an image plane in a state in which the infinite distance object is in focus at the wide angle end is De,
a sign of De is positive in a case where the exit pupil position is closer to the object side than the image plane, and is negative in a case where the exit pupil position is closer to the image side than the image plane, and
a maximum image height is Ymax,
Conditional Expression (15-1) is satisfied, which is represented by $$-0.075<\{\beta Fw/(fF\times\gamma)-1/(\beta Rw\times fRw)-(1/De)\}\times Y\text{max}<0.075 \tag{15-1}$$

13. The zoom lens according to claim 1, wherein Conditional Expression (1-1) is satisfied, which is represented by $$0.05<DF/ft<0.2 \tag{1-1}$$

14. An imaging apparatus comprising:
the zoom lens according to claim 1; and
an imaging element that converts an optical image formed by the zoom lens into an electric signal.

15. The zoom lens according to claim 1,
wherein the middle group includes one negative movable lens group, which is a lens group that has a negative refractive power and moves during zooming,
a focal length of the negative movable lens group that has a strongest refractive power among the one negative movable lens groups in the middle group is fMn1, and
Conditional Expression (6) is satisfied, which is represented by $$0.02<|fMn1/fE|<0.2 \tag{6}$$

16. The zoom lens according to claim 1,
wherein the middle group consists of, in order from the object side to the image side, a lens group that has a positive refractive power and moves during zooming, a lens group that has a negative refractive power and moves during zooming, a lens group that has a positive refractive power and remains stationary with respect to an image plane during zooming, and a lens group that has a positive refractive power and moves during zooming, and
the final lens group consists of a lens group that has a negative refractive power and remains stationary with respect to the image plane during zooming.

17. The zoom lens according to claim 1,
wherein the middle group consists of, in order from the object side to the image side, a lens group that has a negative refractive power and moves during zooming, a lens group that has a negative refractive power and moves during zooming, a lens group that has a positive refractive power and remains stationary with respect to an image plane during zooming, and a lens group that has a positive refractive power and moves during zooming, and
the final lens group consists of a lens group that has a positive refractive power and remains stationary with respect to the image plane during zooming.

18. The zoom lens according to claim 1,
wherein the middle group consists of, in order from the object side to the image side, a lens group that has a negative refractive power and moves during zooming, a lens group that has a positive refractive power and remains stationary with respect to an image plane during zooming, and a lens group that has a positive refractive power and moves during zooming, and
the final lens group consists of a lens group that has a positive refractive power and remains stationary with respect to the image plane during zooming.

19. A zoom lens consisting of, in order from an object side to an image side: a first lens group that has a positive refractive power; a middle group that consists of three or four lens groups in which a spacing between adjacent lens groups changes during zooming; and a final lens group,
wherein a spacing between the first lens group and the middle group changes, and a spacing between the middle group and the final lens group changes during zooming,
wherein a focusing group that moves during focusing is disposed in the middle group, and
a difference in an optical axis direction between a position of the focusing group in a state in which an infinite distance object is in focus at a telephoto end and a position of the focusing group in a state in which a lateral magnification of the zoom lens at the telephoto end is −0.1 times is DF,
a focal length of the zoom lens in a state in which the infinite distance object is in focus at the telephoto end is ft,
Conditional Expression (1) is satisfied, which is represented by $$0.04<DF/ft<0.4 \tag{1}$$

wherein a difference in the optical axis direction between a position of each lens group in the middle group in a state in which the infinite distance object is in focus at a wide angle end and a position thereof in a state in which the infinite distance object is in focus at the telephoto end is set as an amount of zooming movement, the amount of zooming movement of a lens group, of which the amount of zooming movement is maximum, among the lens groups in the middle group is DV, a focal length of the zoom lens in a state in which the infinite distance object is in focus at the wide angle end is fw, Conditional Expression (2b) is satisfied, which is represented by $$7.374 \leq DV/fw < 18 \tag{2b},$$

a lateral magnification of the focusing group in a state in which the infinite distance object is in focus at the telephoto end is $\beta Ft$, a combined lateral magnification of all lenses closer to the image side than the focusing group in a state in which the infinite distance object is in focus at the telephoto end is $\beta Rt$, and Conditional Expression (3a) is satisfied, which is represented by $$1.075 \leq (1-\beta Ft^2) \times \beta Rt^2 < 5 \tag{3a}.$$

20. The zoom lens according to claim 19, wherein a focal length of the focusing group is fF, a focal length of the final lens group is fE, and Conditional Expression (7) is satisfied, which is represented by $$0.04 < |fF/fE| < 0.4 \tag{7}.$$

* * * * *